United States Patent
Hokoi

(10) Patent No.: US 9,066,001 B2
(45) Date of Patent: Jun. 23, 2015

(54) FOCUS ADJUSTING DEVICE AND FOCUS ADJUSTING PROGRAM WITH DISTRIBUTION DETECTION OF FOCALIZED AND UNFOCUSED STATE

(75) Inventor: Hayato Hokoi, Sakura (JP)

(73) Assignee: NIKON CORPORATION, Tokyo (JP)

( * ) Notice: Subject to any disclaimer, the term of this patent is extended or adjusted under 35 U.S.C. 154(b) by 109 days.

(21) Appl. No.: 13/578,927

(22) PCT Filed: Feb. 15, 2011

(86) PCT No.: PCT/JP2011/053156
§ 371 (c)(1),
(2), (4) Date: Aug. 14, 2012

(87) PCT Pub. No.: WO2011/099626
PCT Pub. Date: Aug. 18, 2011

(65) Prior Publication Data
US 2013/0016275 A1    Jan. 17, 2013

(30) Foreign Application Priority Data
Feb. 15, 2010    (JP) ................. 2010-030481

(51) Int. Cl.
*H04N 5/232* (2006.01)
*G02B 7/36* (2006.01)
*G02B 7/28* (2006.01)
*G02B 7/38* (2006.01)
*G03B 13/36* (2006.01)
*G03B 3/10* (2006.01)

(52) U.S. Cl.
CPC .............. *H04N 5/23212* (2013.01); *G02B 7/36* (2013.01); *G02B 7/28* (2013.01); *G02B 7/38* (2013.01); *G03B 13/36* (2013.01); *G03B 3/10* (2013.01)

(58) Field of Classification Search
None
See application file for complete search history.

(56) References Cited

U.S. PATENT DOCUMENTS

| 6,654,053 | B1 | 11/2003 | Hwang | |
| 2006/0078217 | A1* | 4/2006 | Poon et al. | 382/255 |
| 2007/0116375 | A1* | 5/2007 | Utsugi et al. | 382/264 |
| 2009/0066818 | A1* | 3/2009 | Lim et al. | 348/252 |
| 2009/0102963 | A1* | 4/2009 | Yeo et al. | 348/349 |
| 2010/0128144 | A1* | 5/2010 | Tay | 348/229.1 |

(Continued)

FOREIGN PATENT DOCUMENTS

| CN | A-1172264 | 2/1998 |
| CN | A-101335900 | 12/2008 |

(Continued)

OTHER PUBLICATIONS

Office Action dated Dec. 30, 2013 issued in Chinese Patent Application No. 201180015740.7 (with English Translation).

(Continued)

*Primary Examiner* — Justin P Misleh
(74) *Attorney, Agent, or Firm* — Oliff PLC

(57) ABSTRACT

A focus adjusting device which includes an edge detection unit that detects edges of a subject image for each color component forming an image including the subject image; a distribution detection unit that detects distributions of a focalized state and an unfocused state of the image based on the edges detected by the edge detection unit; and a control unit that moves a lens based on the distributions detected by the distribution detection unit, wherein the subject image is incident from an optical system having the lens, the control unit moves the lens, and thus the subject image is focused on.

14 Claims, 39 Drawing Sheets

(56) References Cited

U.S. PATENT DOCUMENTS

| | | | |
|---|---|---|---|
| 2010/0231732 A1* | 9/2010 | Baxansky et al. | 348/208.4 |
| 2011/0199534 A1* | 8/2011 | Kawai | 348/345 |
| 2011/0273610 A1* | 11/2011 | Tay | 348/345 |
| 2012/0113316 A1* | 5/2012 | Ueta et al. | 348/349 |

FOREIGN PATENT DOCUMENTS

| | | |
|---|---|---|
| EP | 2 175 656 A1 | 4/2010 |
| JP | S63-094212 A | 4/1988 |
| JP | H03-204277 A | 9/1991 |
| JP | A-5-45574 | 2/1993 |
| JP | 2002-214513 A | 7/2002 |
| JP | A-2003-262783 | 9/2003 |
| JP | A-2007-139894 | 6/2007 |

OTHER PUBLICATIONS

International Search Report issued in International Patent Application No. PCT/JP2011/053156 dated Mar. 29, 2011 (with translation).
Written Opinion issued in International Patent Application No. PCT/JP2011/053156 dated Mar. 29, 2011 (with translation).
May 7, 2014 Office Action issued in Chinese Patent Application No. 201180015740.7 (with English Translation).
Sep. 30, 2014 Office Action issued in Japanese Patent Application No. 2011-026263.

* cited by examiner

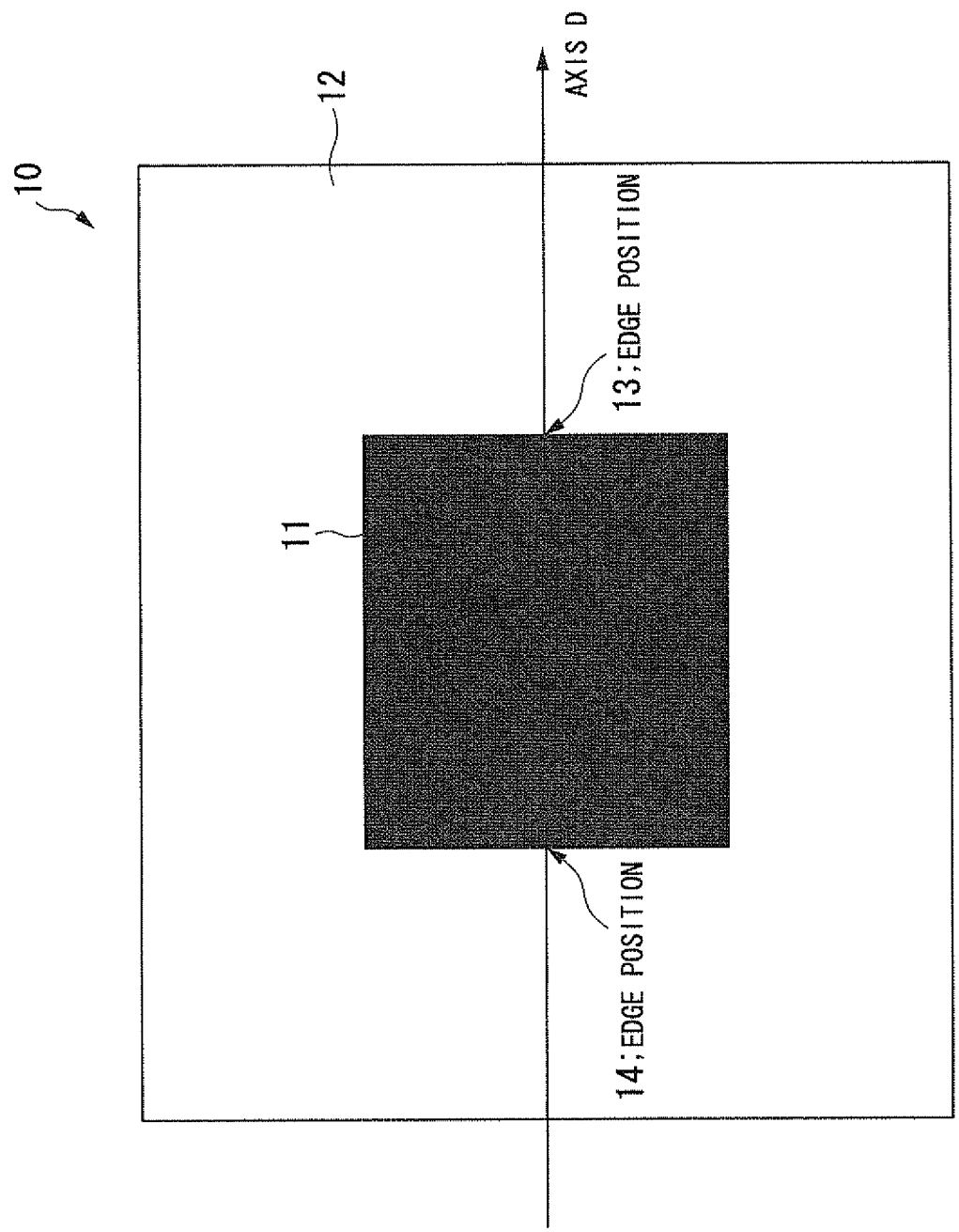

LSF IN FOCALIZED STATE (Gch)

LSF IN UNFOCUSED (SMALL BLUR) STATE (Gch)

LSF IN UNFOCUSED (LARGE BLUR) STATE (Gch)

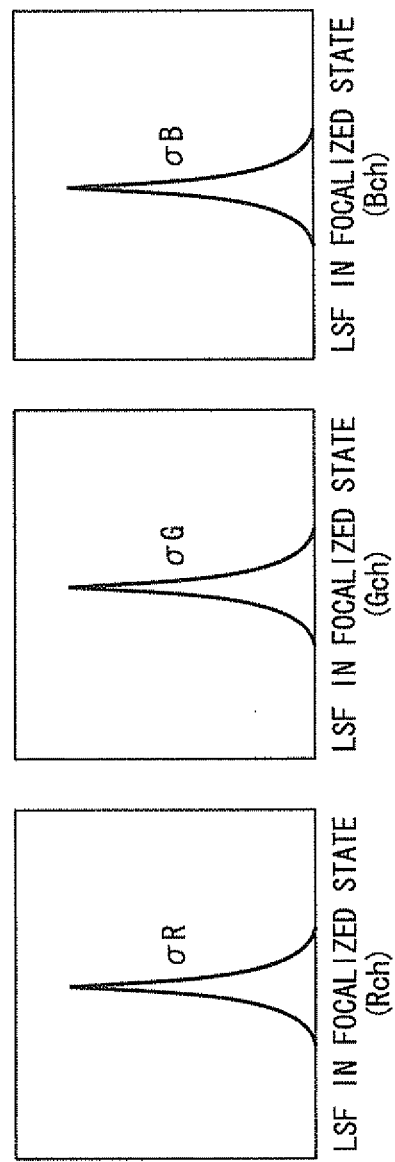

FIG. 24

| LENS POSITION | EVALUATION VALUE | NUMBER OF STEPS IN FRONT FOCUS | NUMBER OF STEPS IN BACK FOCUS |
|---|---|---|---|
| 1 | 1 | 23 | 32 |
| 1 | 4 | 25 | 34 |
| 1 | 10 | ⋮ | ⋮ |
| 1 | ⋮ | ⋮ | ⋮ |
| 10 | 1 | ⋮ | ⋮ |
| 10 | 5 | ⋮ | ⋮ |
| 40 | ⋮ | ⋮ | ⋮ |
| 40 | ⋮ | ⋮ | ⋮ |
| ⋮ | ⋮ | ⋮ | ⋮ |

FOCUS ADJUSTING DEVICE AND FOCUS ADJUSTING PROGRAM WITH DISTRIBUTION DETECTION OF FOCALIZED AND UNFOCUSED STATE

TECHNICAL FIELD

The present invention relates to a focus adjusting device which adjusts focus by applying chromatic aberration, and a focus adjusting program.

Priority is claimed on Japanese Patent Application No. 2010-030481, filed Feb. 15, 2010, the content of which is incorporated herein by reference.

BACKGROUND ART Background Art

A video camera which applies chromatic aberration to focus a subject image obtained through a lens is known (refer to Patent Document 1).

However, the video camera disclosed in Patent Document 1 can rapidly focus on a subject image which has previously been focused on, but cannot rapidly focus on a subject image which has not previously been focused on. That is to say, there is a problem in that the video camera disclosed in Patent Document 1 cannot rapidly focus on a subject image.

CITATION LIST

Patent Document

[Patent Document 1] Japanese Unexamined Patent Application, First Publication No. H5-45574

SUMMARY OF INVENTION

Technical Problem

An object of the present invention is to provide a focus adjusting device and a focus adjusting program enabling a subject image to be rapidly focused on by applying chromatic aberration.

Solution to Problem

A focus adjusting device according to an aspect of the present invention includes an edge detection unit that detects edges of a subject image for each color component forming an image including the subject image; a distribution detection unit that detects distributions of a focalized state and an unfocused state of the image based on the edges detected by the edge detection unit; and a control unit that moves a lens based on the distributions detected by the distribution detection unit. The subject image is incident from an optical system having the lens. In addition, the control unit moves the lens and thus the subject image is focused on.

The focus adjusting device may be configured as follows: the distribution detection unit detects the distributions based on a gradient of a color component amount of the edges detected by the edge detection unit.

The focus adjusting device may be configured as follows: the distribution detection unit detects a direction index indicating focalization on a close point side or a distant point side with respect to a subject, and a defocus amount, based on a ratio of or a difference between color component amounts of the edges detected by the edge detection unit.

The focus adjusting device may be configured as follows: the distribution detection unit detects the defocus amount based on a distance between peaks of the ratios of or the difference between the color component amounts of the edges detected by the edge detection unit.

The focus adjusting device may be configured as follows: the distribution detection unit detects a direction index indicating focalization on a close point side or a distant point side with respect to a subject, and a defocus amount, based on a line spread function corresponding to the edges detected by the edge detection unit.

The focus adjusting device may be configured as follows: the distribution detection unit detects the defocus amount, based on a standard deviation or a full width at half maximum of the line spread function corresponding to the edges detected by the edge detection unit.

The focus adjusting device may be configured as follows: the distribution detection unit selects a high-ranking edge in descending order of a color component amount from the edges detected by the edge detection unit, and detects the distributions of a focalized state and an unfocused state of the image based on the selected edge.

The focus adjusting device may be configured as follows: the distribution detection unit selects a high-ranking edge in descending order of a contrast of the color component from the edges detected by the edge detection unit, and detects the distributions of a focalized state and an unfocused state of the image based on the selected edge.

The focus adjusting device may be configured as follows: when edges of which the contrasts of the color component are the same and edges of which a signal to noise ratios are different are mixed, the distribution detection unit selects a high-ranking edge in descending order of the signal to noise ratio of the color component, and detects the distributions of a focalized state and an unfocused state of the image based on the selected edge.

The focus adjusting device may be configured as follows: when edges of which the signal to noise ratios are different are mixed, the distribution detection unit selects at least one edge which has a relatively low signal to noise ratio and a relatively high contrast and an edge which has a relatively high signal to noise ratio and a relatively low contrast, and detects the distributions of a focalized state and an unfocused state of the image based on the selected edge.

The focus adjusting device may be configured as follows: the distribution detection unit selects edges which include two or more primary colors and have a color component varying with the same phase from the edges detected by the edge detection unit, and detects the distributions of a focalized state and an unfocused state of the image based on the selected edges.

The focus adjusting device may be configured as follows: the distribution detection unit selects an edge including a green component when the edges include two primary colors.

The focus adjusting device may be configured as follows: the distribution detection unit selects an edge which has a flat color component at a predefined width or more from the edges detected by the edge detection unit, and detects the distributions of a focalized state and an unfocused state of the image based on the selected edge.

The focus adjusting device may be configured as follows: the distribution detection unit selects an edge having a length or more defined according to a signal to noise ratio of the color component from edges for each color component detected by the edge detection unit, and detects the distributions of a focalized state and an unfocused state of the image based on the selected edge.

A focus adjusting device related to an aspect of the present invention includes an edge detection unit that detects edges of a subject image for each color component forming an image including the subject image; a distribution detection unit that calculates a line spread function of the edges detected by the edge detection unit; and a control unit that moves a lens based on the line spread function. The subject image is incident from an optical system having the lens. In addition, the control unit moving the lens and thus the subject image is focused on.

A computer related to an aspect of the present invention is a computer executing a focus adjusting program. The focus adjusting program includes a step of detecting edges of a subject image for each color component forming an image including the subject image which is incident from an optical system having a lens for performing focus adjustment; a step of detecting distributions of a focalized state and an unfocused state of the image based on the edges; and a step of moving the lens so as to focus on the subject image based on the distributions.

A computer related to an aspect of the present invention is a computer executing a focus adjusting program. The focus adjusting program includes a step of detecting edges of a subject image for each color component forming an image including the subject image which is incident from an optical system having a lens for performing focus adjustment; a step of calculating a line spread function of the edges; and a step of moving the lens so as to focus on the subject image based on the line spread function.

Advantageous Effects of Invention

The focus adjusting device and the focus adjusting program related to the present invention achieve an effect that a subject image can be rapidly focused on.

BRIEF DESCRIPTION OF DRAWINGS

FIG. 7 is a diagram illustrating an example of the captured image.

FIG. 12A is a diagram illustrating an LSF in a focalized state for each color channel (R, G, and B).

FIG. 24 is a diagram illustrating an example of the "defocus-driving pulse table".

FIG. 34C shows a case of an edge formed by the R channel and the B channel varying with the same phase.

DESCRIPTION OF EMBODIMENTS

First Embodiment

Figure 1:
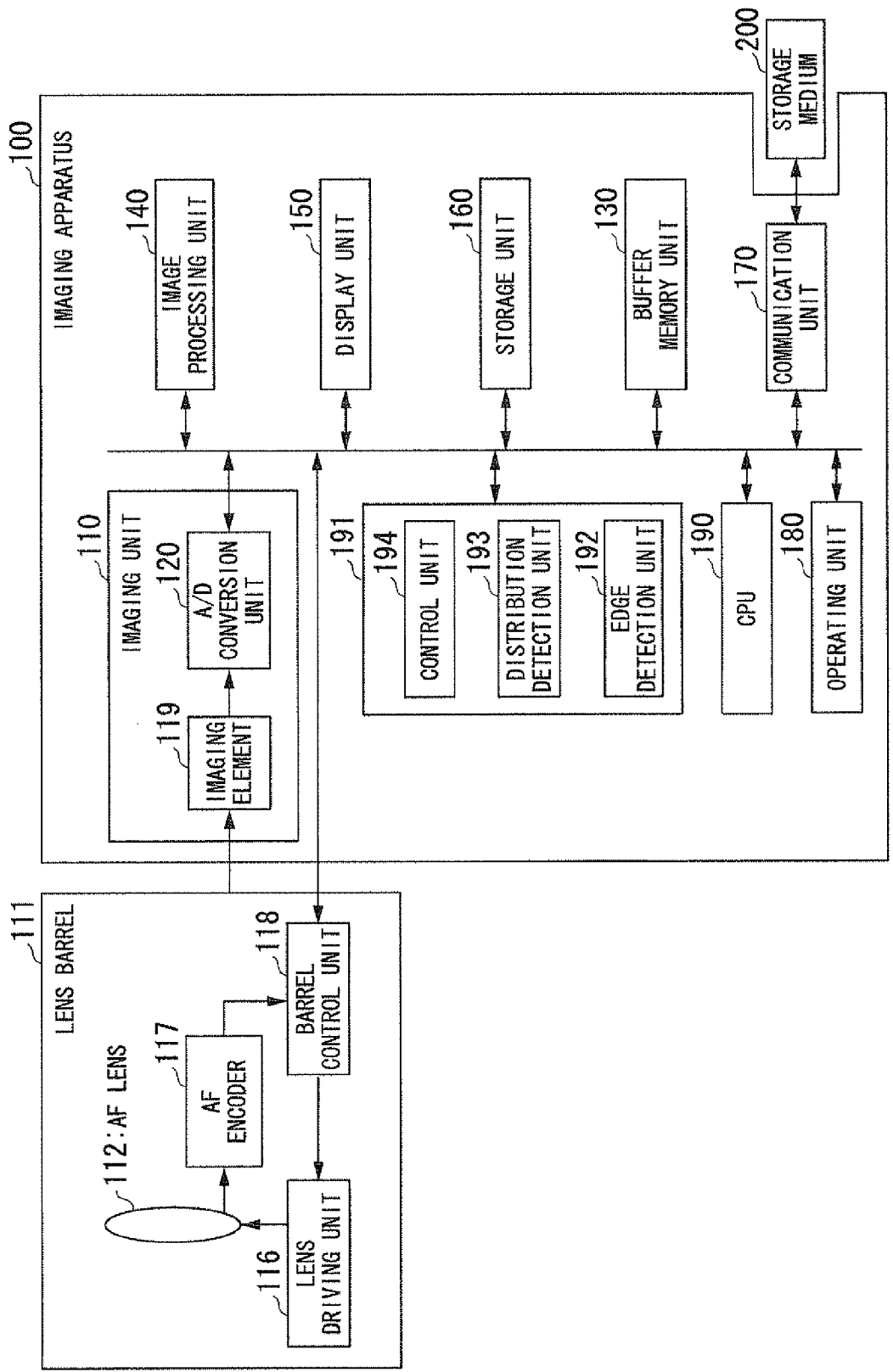
FIG. 1 is a block diagram illustrating configurations of an imaging apparatus 100 having a lens barrel 111 and a focus adjusting device 191 and a storage medium 200.

The first embodiment of the present invention will be described in detail with respect to the drawings. FIG. 1 is a block diagram illustrating configurations of an imaging apparatus 100 including a lens barrel 111 and a focus adjusting device 191 and a storage medium 200. The imaging apparatus 100 captures a subject image which is incident from the lens barrel 111 and stores the obtained image in the storage medium 200 as a still image or a moving image.

First, a configuration of the lens barrel 111 will be described. The lens barrel 111 includes a focus adjusting lens (hereinafter, referred to as an "AF (Auto Focus) lens") 112, a lens driving unit 116, an AF encoder 117, and a barrel control unit 118. In addition, the lens barrel 111 may be connected to the imaging apparatus 100 so as to be attachable and detachable, or may be integrally formed with the imaging apparatus 100.

The AF lens 112 is driven by the lens driving unit 116. The AF lens 112 guides a subject image to a light receiving surface (photoelectric conversion surface) of an imaging element 119 of an imaging unit 110 described later.

The AF encoder 117 detects a movement of the AF lens 112, and outputs a signal corresponding to a movement amount of the AF lens 112 to the barrel control unit 118. Here, the signal corresponding to a movement amount of the AF lens 112 may be, for example, a sine (sin) wave signal of which a phase varies according to a movement amount of the AF lens 112.

The barrel control unit 118 controls the lens driving unit 116 in response to a driving control signal input from the focus adjusting device 191, described later, of the imaging apparatus 100. Here, the driving control signal is a control signal for driving the AF lens 112 in the optical axis direction. The barrel control unit 118 changes, for example, the number of steps of a pulse voltage which is output to the lens driving unit 116, in response to the driving control signal.

In addition, the barrel control unit 118 outputs a position (focus position) of the AF lens 112 in the lens barrel 111 to the focus adjusting device 191 described later, based on the signal corresponding to a movement amount of the AF lens 112. Here, the barrel control unit 118 may calculate a movement amount (position) of the AF lens 112 in the lens barrel 111, for example, by adding up the signal according to a movement amount of the AF lens 112 in the movement direction.

The lens driving unit 116 drives the AF lens 112 under the control of the barrel control unit 118. In addition, the lens driving unit 116 moves the AF lens 112 in the optical axis direction inside the lens barrel 111.

Next, a configuration of the imaging apparatus 100 will be described. The imaging apparatus 100 includes an imaging unit 110, an image processing unit 140, a display unit 150, a buffer memory unit 130, an operation unit 180, a storage unit 160, a CPU 190, a communication unit 170, and the focus adjusting device 191.

The imaging unit 110 includes an imaging element 119 and an A/D (Analog/Digital) conversion unit 120. The imaging unit 110 is controlled by the CPU 190 depending on set imaging conditions (for example, a diaphragm value, an exposure value, and the like).

The imaging element 119 has a photoelectric conversion surface. The imaging element 119 converts an optical image formed on the photoelectric conversion surface by the lens barrel 111 (optical system) into an electric signal which is output to the A/D conversion unit 120. The imaging element 119 may be made of, for example, CMOS (Complementary Metal Oxide Semiconductor). Further, the imaging element 119 may convert an optical image into an electric signal in a portion of the region of the photoelectric conversion surface (cutting).

In addition, the imaging element 119 stores an image which is obtained when a photographing instruction is received via the operating unit 180, in the storage medium 200 via the A/D conversion unit 120. On the other hand, the imaging element 119 outputs images which are continuously obtained to the focus adjusting device 191 and the display unit 150 as through-the-lens images via the A/D conversion unit 120, in a state where an imaging instruction is not received via the operating unit 180.

The A/D conversion unit 120 digitalizes the electric signal converted by the imaging element 119. In addition, the A/D conversion unit 120 outputs the image which is a digital signal to the buffer memory unit 130.

The operating unit 180 includes, for example, a power switch, a shutter button, multiple selectors (cross keys), or other operation keys. The operating unit 180 receives an operation input of a user through an operation of the user. In addition, the operating unit 180 outputs a signal corresponding to the operation input to the CPU 190.

The image processing unit 140 performs an image process for the images which are temporarily stored in the buffer memory unit 130, by referring to image processing conditions stored in the storage unit 160. The images having undergone the image process are stored in the storage medium 200 via the communication unit 170.

An image obtained by the imaging unit 110, an operation screen, and the like are displayed. An example of the display unit 150 may include a liquid crystal display.

The buffer memory unit 130 temporarily stores an image captured by the imaging unit 110.

A determination condition which is referred to by the CPU 190 at the time of determination of a scene is stored. In addition, the storage unit 160 stores an imaging condition correlated with each scene which is determined through the scene determination.

The CPU 190 controls the imaging unit 110 depending on the set imaging conditions (for example, a diaphragm value, exposure value, and the like). In addition, the CPU 190 enables the image processing unit 140 to perform an image process for an image as a still screen or a moving image, based on the "signal corresponding to an operation input" which is input from the operating unit 180.

The communication unit 170 is connected to the storage medium 200 which is detachable such as a card memory. The communication unit 170 performs recording, reading, or deletion of information (image data and the like) for the storage medium 200.

The storage medium 200 is a storage unit which is attachable to and detachable from the imaging apparatus 100, and stores information (image data and the like). In addition, the storage medium 200 may be integrally formed with the imaging apparatus 100.

Next, the focus adjusting device 191 will be described. The focus adjusting device 191 detects edges of the subject image from an image generated based on the electric signal output by the imaging element 119. In addition, the focus adjusting device 191 analyzes color deviation due to axial chromatic aberration which occurs in the detected edges. Here, the axial chromatic aberration is a characteristic that the focal length of the lens differs depending on a wavelength (color) of incident light.

The focus adjusting device 191 detects a defocus (focus deviation) feature amount based on the analysis result of the color deviation. In addition, the focus adjusting device 191 generates a driving control signal so as to focus a subject image based on the detected defocus feature amount, and outputs the driving control signal to the barrel control unit 118 of the lens barrel 111 (focus drive).

Here, the defocus feature amount includes a direction index, a defocus amount, a movement amount (hereinafter, referred to as a "focus shift amount") necessary for focus adjusting of the AF lens 112, and history thereof. In addition, the direction index is an index indicating focalization on a close point side of a subject (hereinafter, referred to as "front focus"), and focalization on a distant point side of the subject (hereinafter, referred to as "back focus"). Further, the focus shift amount increases as a deviation amount becomes larger. Furthermore, the focus shift amount may be expressed by, for example, the number of steps of a pulse voltage which is output to the lens driving unit 116 by the barrel control unit 118 in response to a driving control signal.

As evaluation values for detecting the direction index and the deviation amount, there are three, Edge Difference (hereinafter, referred to as "Ed"), a deviation amount reference value (Width of Subtraction, hereinafter, referred to as "Wd"), and a line spread function (hereinafter, referred to as an "LSF").

Figure 2:
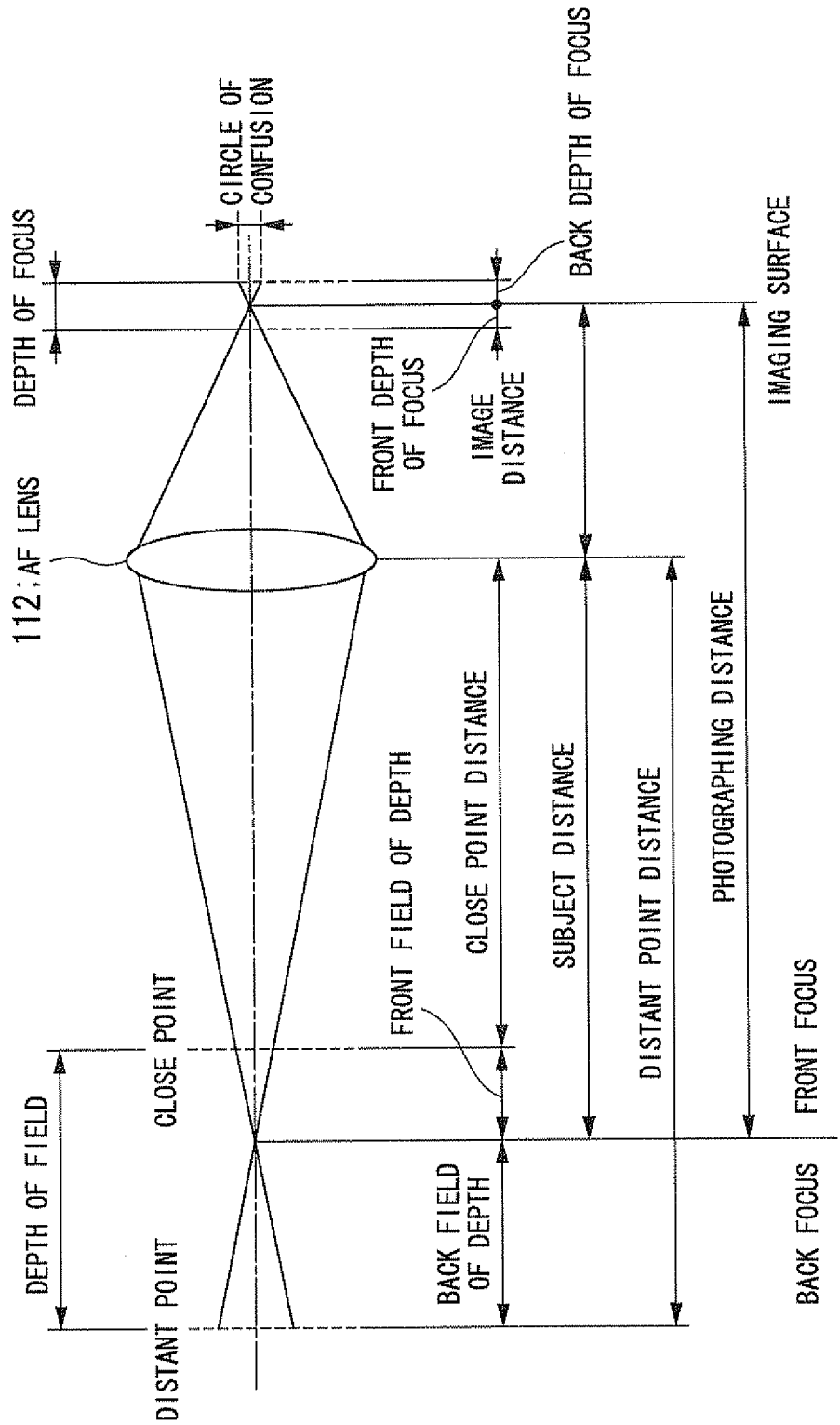
FIG. 2 is a diagram illustrating a relationship between a subject at a position separated from an AF lens 112 by a subject distance, the AF lens 112, an imaging surface of an imaging element 119, and the circle of confusion.

First, the Ed which is one of the evaluation values will be described. FIG. 2 is a diagram illustrating a relationship between a subject at a position separated from the AF lens 112 by a subject distance, the AF lens 112, an imaging surface (in FIG. 2, shown as "IMAGING SURFACE") of the imaging element 119, and the circle of confusion. The AF lens 112 collects light incident from the subject so as to form a subject image on the photoelectric conversion surface (imaging surface) of the imaging element 119. Here, the circle of confusion is formed on the imaging surface of the imaging element 119 due to dot images included in the subject image.

Figure 3:
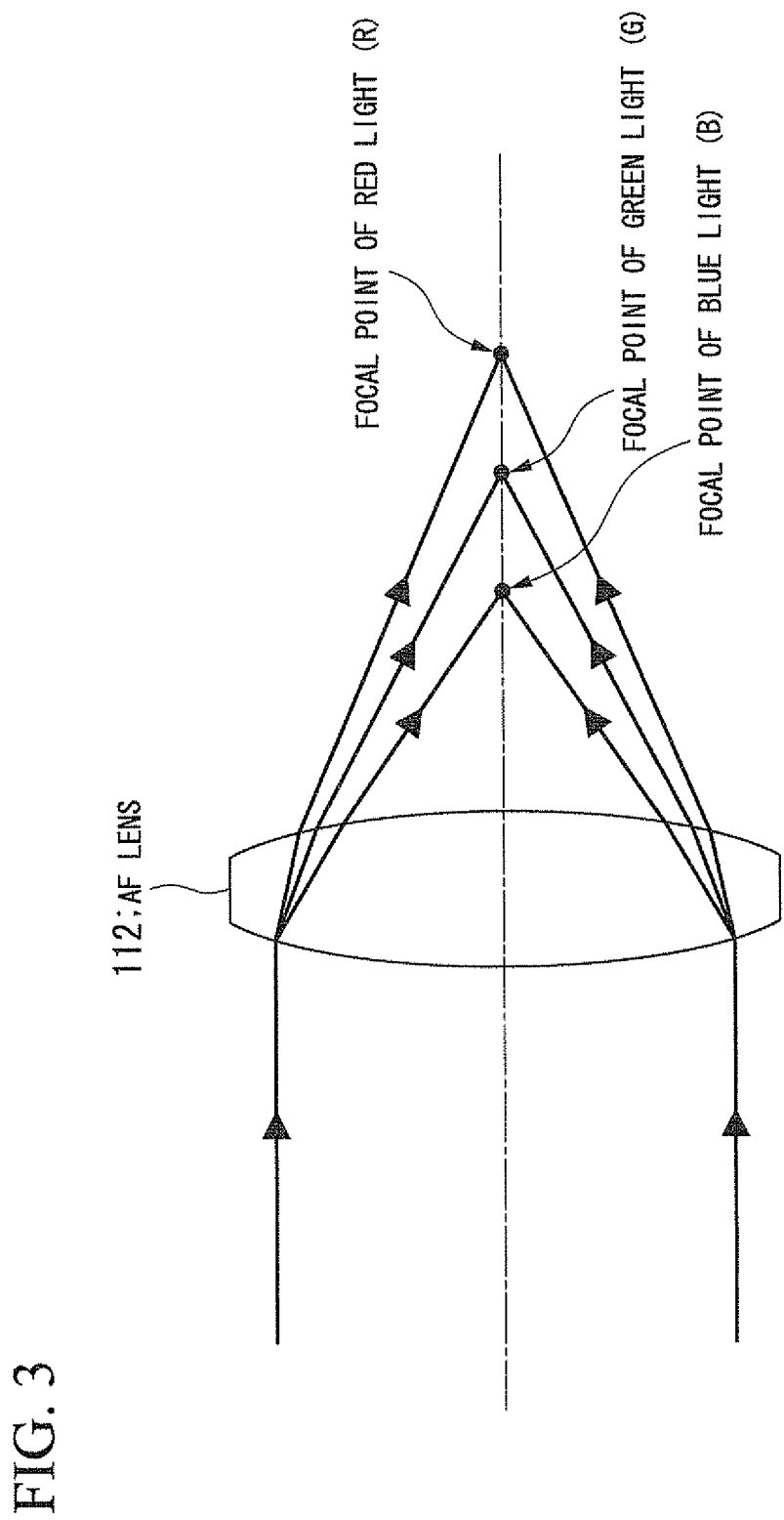
FIG. 3 is a diagram illustrating a positional relationship on the optical axis among a focal point of red light, a focal point of green light, and a focal point of blue light, incident to the AF lens 112.
Figure 4:
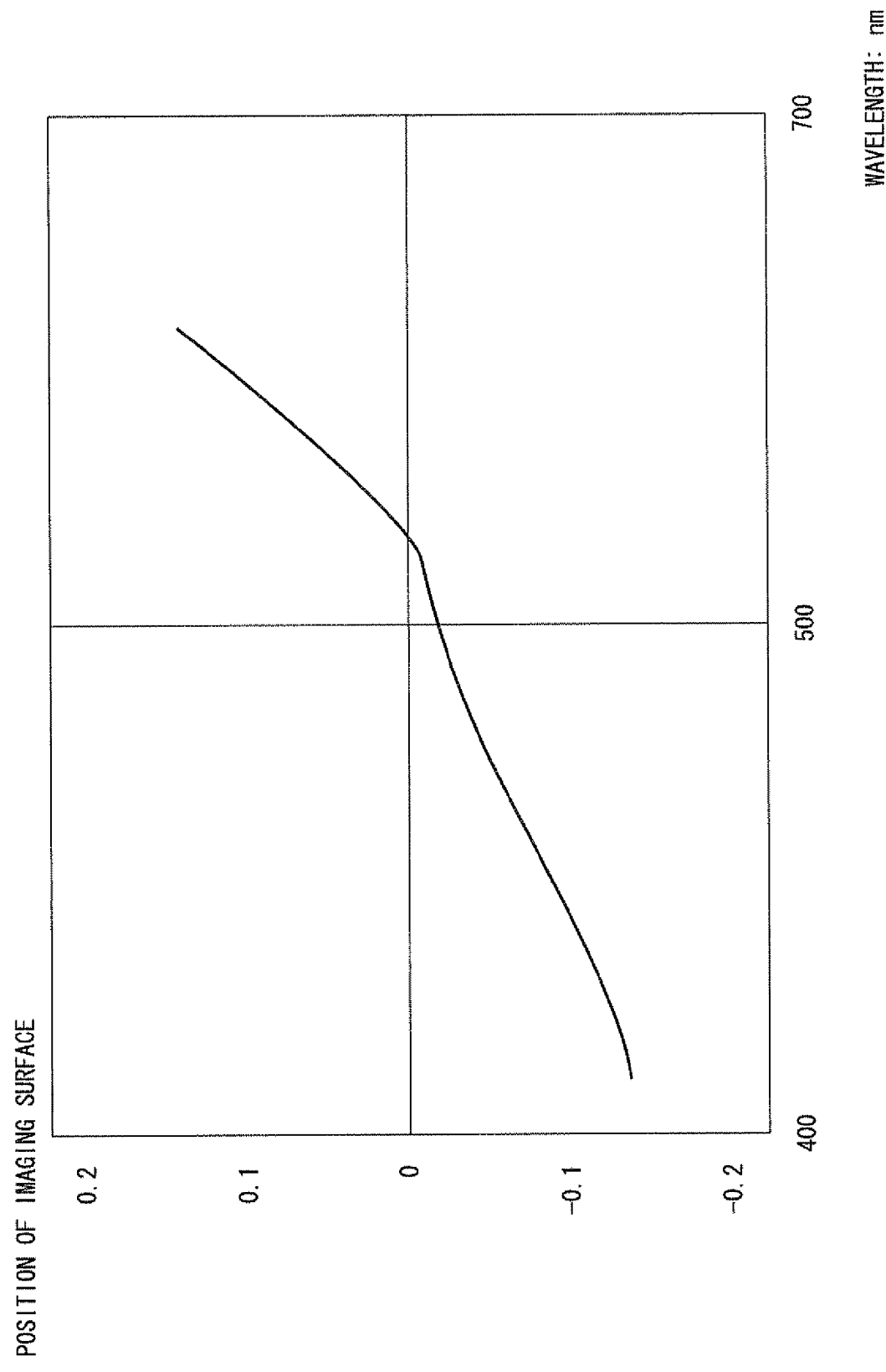
FIG. 4 is a diagram illustrating a relationship between a wavelength of light incident to the AF lens 112 and a position of the imaging surface on the optical axis.

FIG. 3 shows a positional relationship on the optical axis among a focal point of red light (hereinafter, referred to as an "R channel" or "R"), a focal point of green light (hereinafter, referred to as a "G channel" or "G"), and a focal point of blue light (hereinafter, referred to as a "B channel" or "B"), incident to the AF lens 112. In addition, FIG. 3 shows that positions (image forming surfaces) of images formed by the light beams differ from each other depending on the wavelengths of the light beams. The reason why the image forming surfaces differ depending on the wavelengths of the light beams is that, for example, refractive indices of lenses differ depending on the wavelengths of the light beams. In addition, the refractive index of a lens is a characteristic unique to the lens and may be different for each lens. Hereinafter, as shown in FIG. 3, a description will be made assuming that the focal point of the R channel is located at a position which is farthest from the AF lens 112, and the focal point of the B channel is located at a position closest to the AF lens 112, FIG. 4 is a diagram illustrating a relationship between a wavelength of light incident to the AF lens 112 and a position of the imaging surface on the optical axis. Here, the transverse axis indicates a wavelength of light incident to the AF lens 112. In addition, the longitudinal axis indicates a position of the imaging surface, and indicates a position which becomes distant from the AF lens 112 as a value becomes larger. As such, the position of the imaging surface becomes distant from the AF lens 112 as the wavelength of incident light becomes longer.

Generally, the AF lens 112 is optically designed such that color deviation on the image forming surface (imaging surface) in a focalized state is the minimum. For this reason, the color deviation becomes greater in an unfocused state than in a focalized state. In addition, it is known that the color deviation varies depending on the lens position (focus position, zoom position) and other factors. In addition, the circle of confusion increases in the radius as a defocus (focus blur) amount becomes larger. Further, arrangements of colors of the circle of confusion vary depending on the lens position (focus position).

Figure 5A:
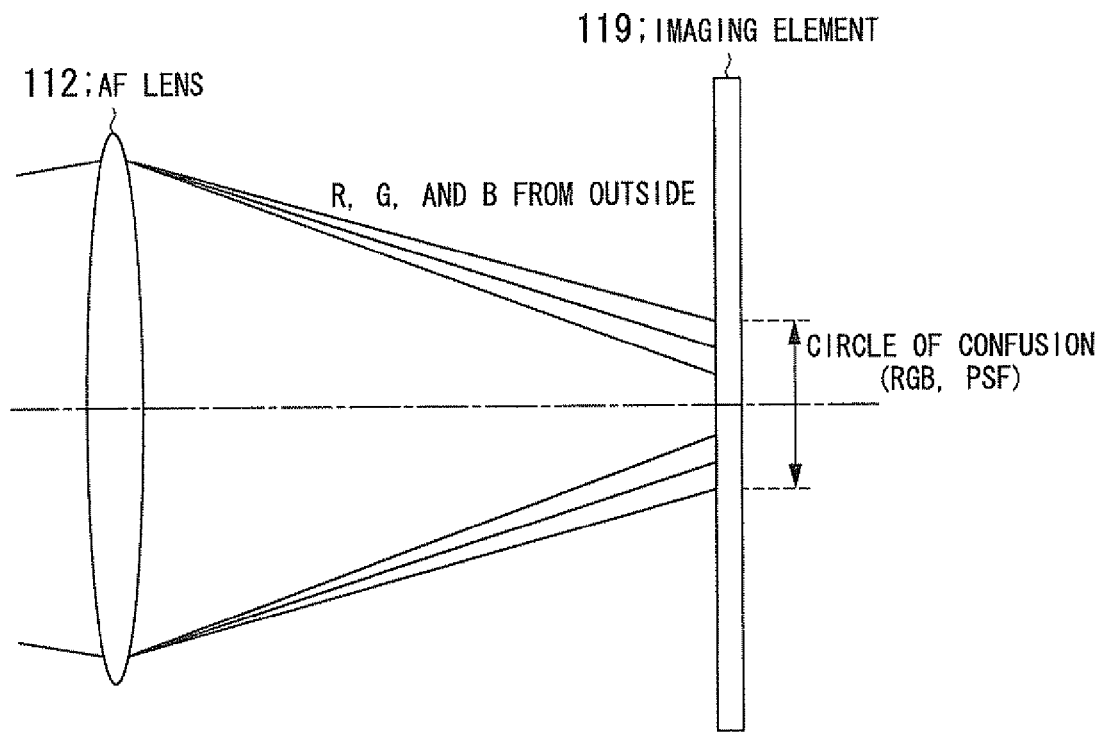
FIG. 5A is a diagram illustrating a relationship between the AF lens 112, the imaging surface of the imaging element 119, and the circle of confusion in a front focus state.
Figure 5B:
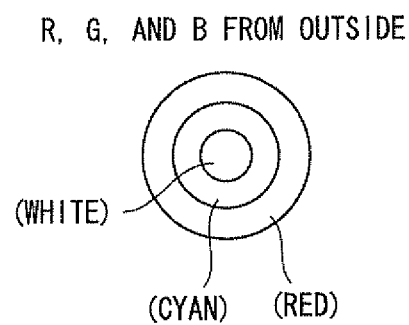
FIG. 5B is a diagram illustrating the circle of confusion in a front focus state, formed on the imaging surface.
Figure 5C:
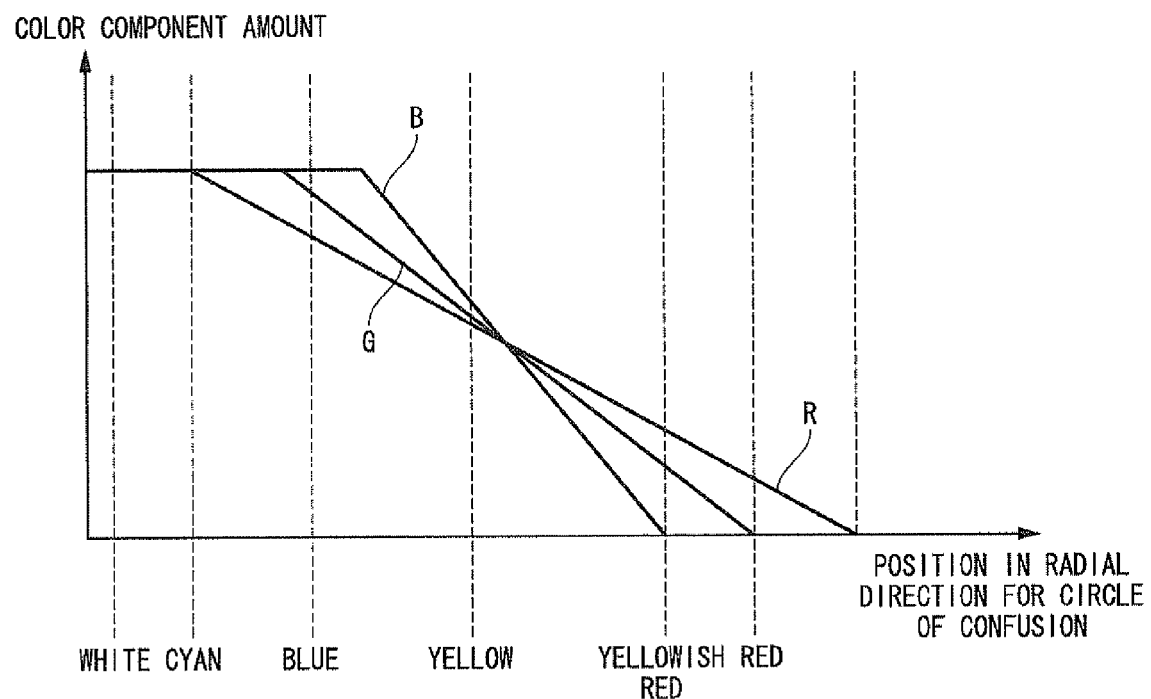
FIG. 5C is a diagram illustrating a relationship between a position in the radial direction toward the outer circumference from the center of the circle of confusion in a front focus state and a color component amount.

FIGS. 5A, 5B and 5C show the circle of confusion in a front focus state. FIG. 5A shows a relationship between the AF lens 112, the imaging surface of the imaging element 119, and the circle of confusion. The light incident to the AF lens 112 is refracted (dispersed) in an order of R, G, and B from the outside, is guided to the imaging surface of the imaging element 119, and then forms the circle of confusion. In addition, the circle of confusion may be expressed by a dot spread function (hereinafter, referred to as a "PSF").

FIG. 5B shows the circle of confusion formed on the imaging surface. The circle of confusion in a front focus state has an order of R, G, and B from the outside due to the axial chromatic aberration and is thus formed in the following order: red, cyan, and white.

FIG. 5C shows a relationship between a position in the radial direction toward the outer circumference from the center of the circle of confusion and a color component amount (color intensity) using a view (hereinafter, referred to as a "grayscale cross-sectional view") where the longitudinal axis expresses the color component amount. In relation to a gradient (slope) of the color component amount in the radial direction toward the outer circumference from the center of the circle of confusion, a gradient of R is smoothest and a gradient of B is steepest in a front focus state as shown in FIG. 5C. For this reason, the circle of confusion in a front focus is formed in order of white, cyan, blue, yellow, yellowish red, and red in the radial direction toward the outer circumference from the center.

Figure 6A:
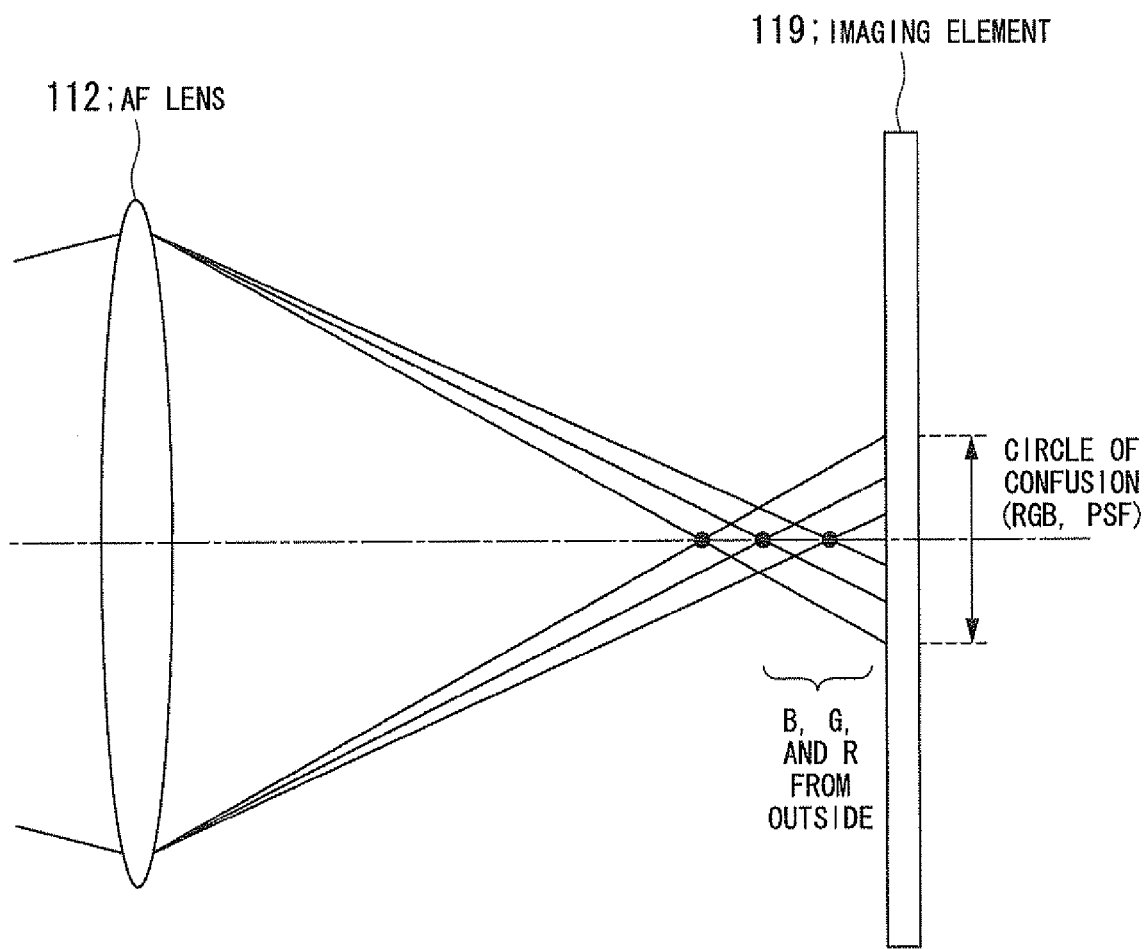
FIG. 6A is a diagram illustrating a relationship between the AF lens 112, the imaging surface of the imaging element 119, and the circle of confusion in a back focus state.
Figure 6B:
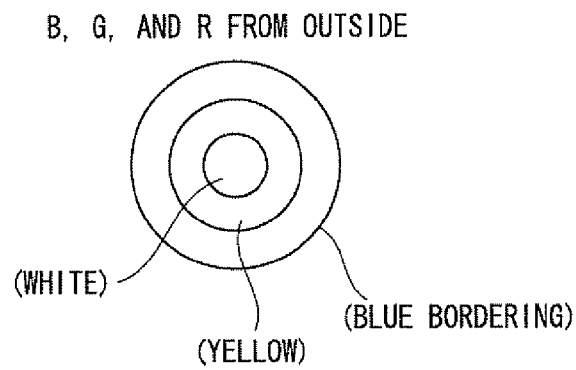
FIG. 6B is a diagram illustrating the circle of confusion in a back focus state, formed on the imaging surface.

FIGS. 6A and 6B show the circle of confusion in a back focus state. FIG. 6A shows a relationship between the AF lens 112, the imaging surface of the imaging element 119, and the circle of confusion. The light incident to the AF lens 112 is refracted (dispersed) in an order of B, G, and R from the outside between the focal point on the optical axis and the imaging element 119 due to the axial chromatic aberration, is guided to the imaging surface of the imaging element 119, and then forms the circle of confusion on the imaging surface.

FIG. 6B shows the circle of confusion formed on the imaging surface. The circle of confusion in a back focus state has an order of B, G, and R from the outer circumference due to the axial chromatic aberration, and is thus formed in order of white, yellow, and blue (bordering) in the radial direction toward the outer circumference from the center.

As such, the formation of the colors in the circle of confusion is different depending on a focalized state and an unfocused state, due to the axial chromatic aberration. As a result, the focus adjusting device 191 (refer to FIG. 1) can detect a focalized state and an unfocused state based on the formation of the colors in the circle of confusion.

FIG. 7 shows an example of the captured image. Here, a state where a black and white edge chart is imaged will be described as an example. In addition, for simplicity of description, the description will be made without consideration of chromatic aberration of magnification and lens flare, but, even if they are not considered, the spirit of the present invention does not vary.

The image 10 (black and white edge chart) formed on the imaging unit 110 includes a black region 11 and a white region 12. In addition, the black region 11 is rectangle, is located at the center of the white region 12. Here, an axis crossing both the black region 11 and the white region 12 in the horizontal direction is set as an axis D. Further, the axis D is an axis perpendicular to a boundary (knife edge) between the black region 11 and the white region 12. At the axis D, a boundary where the color is changed from white to black is set as an edge position 14. Similarly, at the axis D, a boundary where the color is changed from black to white is set as an edge position 13. In addition, a position at the axis D may be expressed with the pixel units.

Figure 8A:
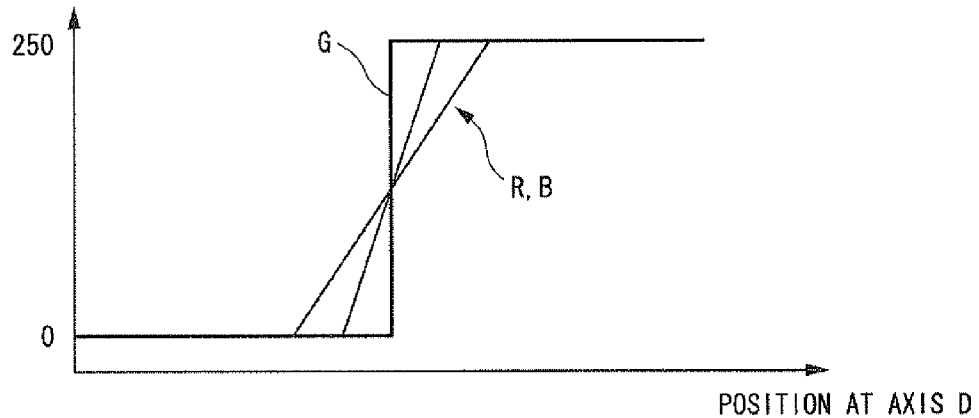
FIG. 8A is a diagram illustrating a color component amount in the vicinity of an edge position 13 and is a grayscale cross-sectional view in a focalized state with a G channel.
Figure 8B:
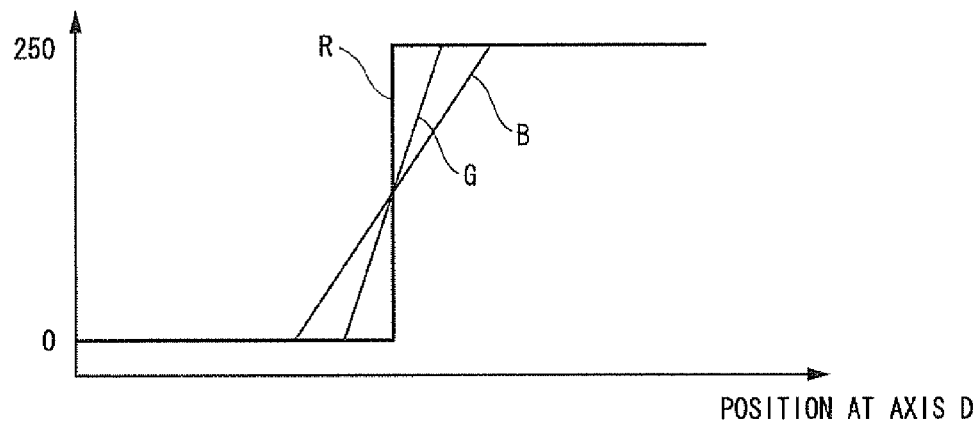
FIG. 8B is a diagram illustrating a color component amount in the vicinity of the edge position 13 and is a grayscale cross-sectional view in a focalized state with an R channel.
Figure 8C:
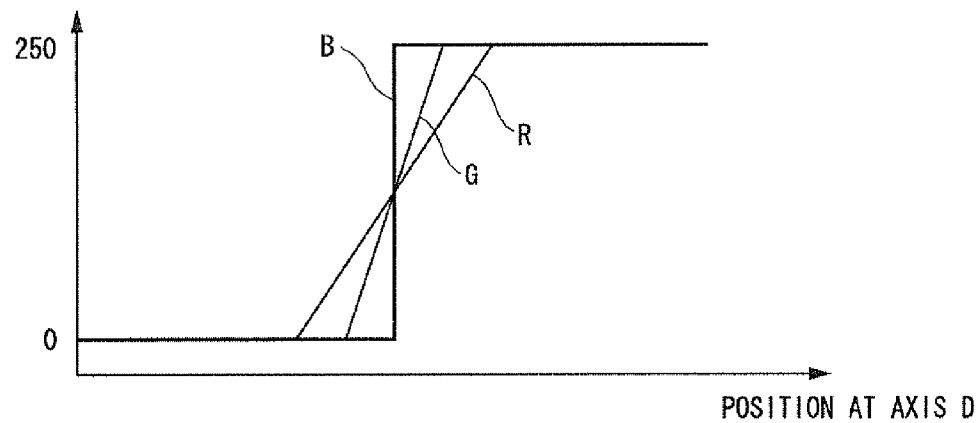
FIG. 8C is a diagram illustrating a color component amount in the vicinity of the edge position 13 and is a grayscale cross-sectional view in a focalized state with a B channel.

FIGS. 8A, 8B and 8C show a color component amount in the vicinity of the edge position 13 (refer to FIG. 7) using grayscale cross-sectional views. Here, the longitudinal axis indicates a color component amount for each of R, G, and B (color channels). In addition, the transverse axis indicates a position (refer to FIG. 7) at the axis D. In addition, the color component amount of each color channel is expressed by values "0 to 250" (8 bits). The larger the value of the color component amount of each color channel, the deeper the color. In addition, a color component amount of each color channel may be expressed by values "0 to 255" (8 bits).

In addition, a color at a "position at the axis D" where all of the color component amounts of R, G, and B are the value "250" is white. On the other hand, a color at a "position at the axis D" where all of the color component amounts of R, G, and B are the value "0" is black.

FIG. 8A is a grayscale cross-sectional view in a focalized (focus) state on the G channel. In this state, the R channel is in a front focus state, and the B channel is in a back focus state. Thereby, the white region 12 side at the edge position 13 becomes green. On the other hand, the black region 11 side at the edge position 13 becomes magenta.

In addition, FIG. 8B is a grayscale cross-sectional view in a focalized state on an R channel. In this state, the G channel is in a back focus state, and a gradient (slope) of the G channel is steeper than a gradient of the B channel. In addition, FIG. 8C is a grayscale cross-sectional view in a focalized state on a B channel. In this state, the G channel is in a front focus state, and the gradient (slope) of the G channel is steeper than the gradient of the R channel.

As such, the gradient in the grayscale cross-sectional view is different for each color. Therefore, even if a subject image is focused with any color channel, the focus adjusting device 191 (refer to FIG. 1) calculates evaluation values from the gradients of the color channels in the grayscale cross-sectional view. As such, the focus adjusting device 191 can detect a focalized state and an unfocused state.

Figure 9A:
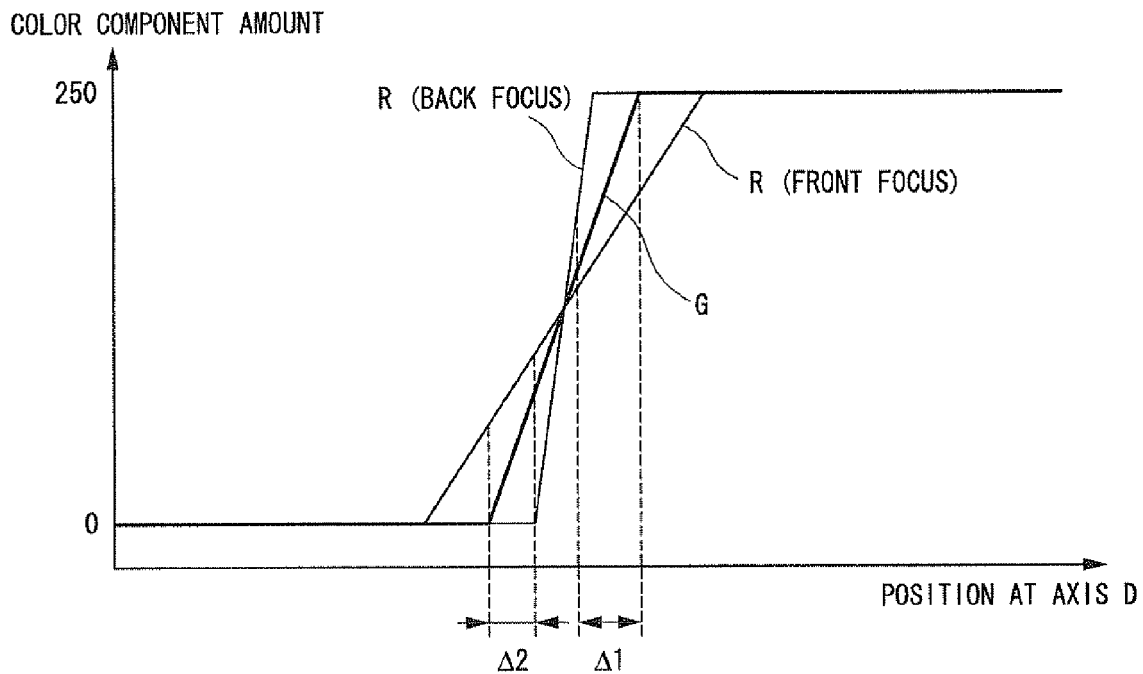
FIG. 9A is a diagram illustrating a color component amount in the vicinity of the edge position 13, and shows a relationship between an edge of the R channel in a front focus state, an edge of the R channel in a back focus state, and an edge of the G channel in a focalized state.
Figure 9B:
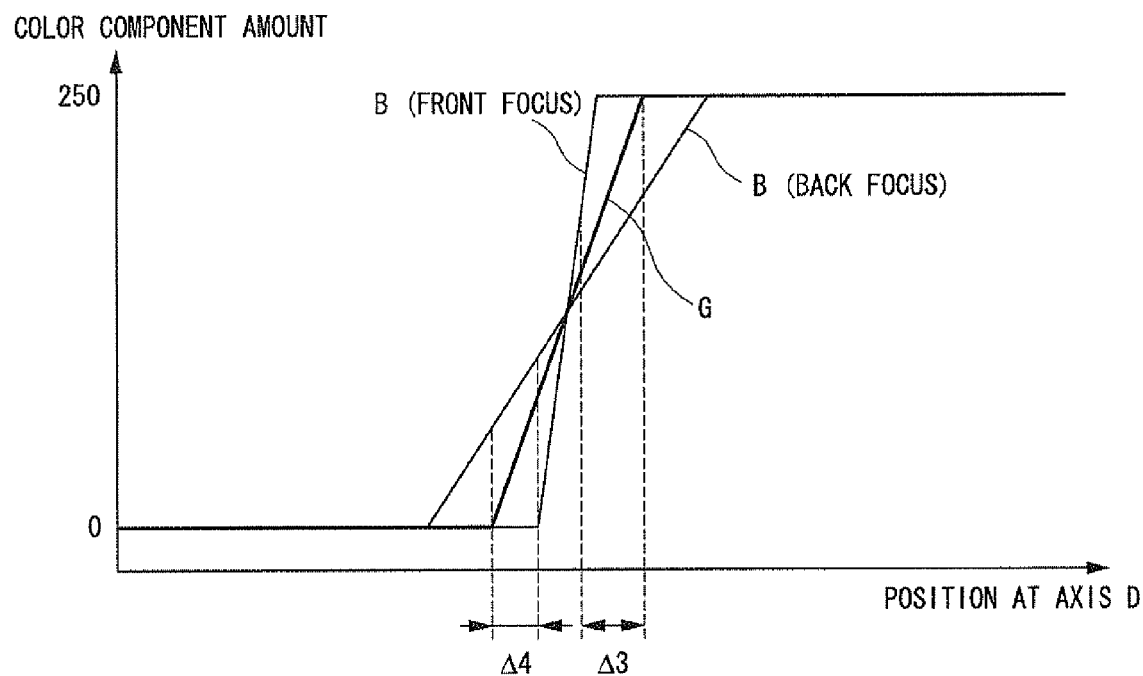
FIG. 9B is a diagram illustrating a color component amount in the vicinity of the edge position 13, and shows a relationship between an edge of the B channel in a front focus state, an edge of the B channel in a back focus state, and an edge of the G channel in a focalized state.

Next, a procedure of calculating the evaluation value Ed will be described. FIGS. 9A and 9B show a color component amount in the vicinity of the edge position 13 (refer to FIG. 7) using the grayscale cross-sectional view. Here, the longitudinal axis indicates the color component amount for each of R, G, and B (color channel). In addition, the transverse axis indicates a position (refer to FIG. 7) at the axis D. The human eye has high sensitivity for the G channel, and, thus, here, a case where a subject image is focused (focused) using the G channel will be described as an example.

FIG. 9A shows a relationship between an edge of the R channel in a front focus state, an edge of the R channel in a back focus state, and an edge of the G channel in a focalized state. In addition, a gradient (slope) of the R channel in a front focus state is smoother than a gradient of the G channel in a focalized state. On the other hand, the gradient (slope) of the R channel in a back focus state is steeper than the gradient of the G channel in a focalized state. Hereinafter, in FIG. 9A, a section which is located on the right of an intersection of lines indicating color component amounts of the R channel and the G channel and where the line indicating the G channel is inclined is set as a section "$\Delta 1$". In addition, a section which is located on the left of the intersection of the lines indicating color component amounts and where the line indicating the G channel is inclined is set as a section "$\Delta 2$". The length of the sections may be expressed by the number of pixels.

Whether the edge of the R channel is in a front focus state or a back focus state according to a comparison result of an Ed (hereinafter, referred to as "EdRG") based on the color component amount of the R channel and the color component amount of the G channel and a threshold value is detected (determined) as follows.

$$EdRG=(\Sigma(R/G))/(\Delta 1)>1 \qquad \text{Expression 1}$$

$$EdRG=(\Sigma(R/G))/(\Delta 1)<1 \qquad \text{Expression 2}$$

Here, the value "1" in Expressions 1 and 2 is a threshold value. In addition, ($\Sigma(R/G)$) in Expressions 1 and 2 is a sum total which is obtained by adding values over the section "$\Delta 1$", the values being obtained by dividing the color component amount of the R channel by the color component amount of the G channel at the same position in an image. In addition, a value obtained by dividing the sum total by the length of the section "$\Delta 1$" is the "EdRG". Further, if Expression 1 is satisfied, the EdRG indicates that the edge of the R channel is in a back focus state. On the other hand, if Expression 2 is satisfied, the EdRG indicates that the edge of the R channel is in a front focus state (direction index). In addition, a difference between the EdRG and the threshold value "1" indicates the defocus amount.

In addition, front focus and back focus may be detected using the "ratio" of the color component amounts in the same manner as Expressions 1 and 2 with respect to the section "$\Delta 2$". On the other hand, the SN ratio (Signal to Noise ratio) between the color component amount and noise is small in a section where the color component amount is small such as the section "$\Delta 2$". Therefore, in this case, instead of using the "ratio" of the color component amounts, detecting front focus and back focus by using a "difference" in the color component amounts is advantageous in detecting a localized state.

$$EdRG=(\Sigma(G-R))/(\Delta 2)>0 \qquad \text{Expression 3}$$

$$EdRG=(\Sigma(G-R))/(\Delta 2)<0 \qquad \text{Expression 4}$$

Here, the value "0" in Expressions 3 and 4 is a threshold value. In addition, ($\Sigma(G-R)$) in Expressions 3 and 4 is a sum total which is obtained by adding values over the section "$\Delta 2$", the values being obtained by subtracting a color component amount of the G channel at the same position in an image from a color component amount of the R channel. In addition, a value obtained by dividing the sum total by the length of the section "$\Delta 2$" is the "EdRG". If Expression 3 is satisfied, the EdRG indicates that the edge of the R channel is in a back focus state. On the other hand, if Expression 4 is satisfied, the EdRG indicates that the edge of the R channel is a front focus state (direction index). A difference between the EdRG and the threshold value "0" indicates a defocus amount.

Similarly, FIG. 9B shows a relationship between an edge of the B channel in a front focus state, an edge of the B channel in a back focus state, and an edge of the G channel in a focalized state. In addition, a gradient (slope) of the B channel in a front focus state is smoother than a gradient of the G channel in a focalized state. On the other hand, the gradient (slope) of the B channel in a back focus state is steeper than the gradient of the G channel in a focalized state. Hereinafter, in FIG. 9B, a section which is located on the right of an intersection of lines indicating color component amounts of the B channel and the G channel and where the line indicating the G channel is inclined is set as a section "$\Delta 3$". In addition, a section which is located on the left of the intersection of the lines indicating color component amounts and where the line indicating the G channel is inclined is set as a section "$\Delta 4$".

Whether the edge of the B channel is in a front focus state or a back focus state according to a comparison result of an Ed (hereinafter, referred to as "EdBG") based on a color component amount of the B channel and a color component amount of the G channel and a preset threshold value is detected as follows.

$$EdBG=(\Sigma(B/G))/(\Delta 3)>1 \qquad \text{Expression 5}$$

$$EdBG=(\Sigma(B/G))/(\Delta 3)<1 \qquad \text{Expression 6}$$

Here, the value "1" in Expressions 5 and 6 is a threshold value. In addition, ($\Sigma(B/G)$) in Expressions 5 and 6 is a sum total which is obtained by adding values over the section "$\Delta 3$", the values being obtained by dividing the color component amount of the B channel by the color component amount of the G channel at the same position in an image. In addition, a value obtained by dividing the sum total by the length of the section "$\Delta 3$" is the "EdBG". Further, if Expression 5 is satisfied, the EdBG indicates that the edge of the B channel is in a back focus state. On the other hand, if Expression 6 is satisfied, the EdBG indicates that the edge of the B channel is in a front focus state (direction index). In addition, a difference between the EdBG and the threshold value "1" indicates a defocus amount.

Front focus and back focus may be detected using a "ratio" of the color component amounts in the same manner as Expressions 5 and 6 with respect to the section "$\Delta 4$". On the other hand, the SN ratio between a color component amount and noise is small in a section where the color component amount is small such as the section "$\Delta 4$". Therefore, in this case, instead of using the "ratio" of the color component amounts, detecting front focus and back focus by using a "difference" in the color component amounts is advantageous in detecting a focalized state.

$$EdBG=(\Sigma(G-B))/(\Delta 4)>0 \qquad \text{Expression 7}$$

$$EdBG=(\Sigma(G-B))/(\Delta 4)<0 \qquad \text{Expression 8}$$

The value "0" in Expressions 7 and 8 is a threshold value. In addition, ($\Sigma(G-B)$) in Expressions 7 and 8 is a sum total which is obtained by adding values over the section "$\Delta 4$", the values being obtained by subtracting the color component amount of the G channel at the same position in an image from the color component amount of the B channel. In addition, a value obtained by dividing the sum total by the length of the section "$\Delta 4$" is the "EdRG". If Expression 7 is satisfied, the EdBG indicates that the edge of the B channel is in a back focus state. On the other hand, if Expression 8 is satisfied, the EdBG indicates that the edge of the B channel is in a front focus state (direction index). A difference between the EdBG and the threshold value "0" indicates a defocus amount.

As such, the focus adjusting device 191 (refer to FIG. 1) can detect a focalized state and an unfocused state based on the evaluation value Ed. In addition, the focus adjusting device 191 may detect front focus and back focus using the "ratio" of the color component amounts with respect to the section where the color component amount is small. Further, the focus adjusting device 191 may detect front focus and back focus using a "difference" in the color component amounts with respect to the section where the color component amount is large. Although the subject image is focused with the G channel in the above description, the focus adjusting device 191 may detect (determine) a front focus state and a back focus state by focusing on the subject image with the R channel or the B channel.

Figure 10A:
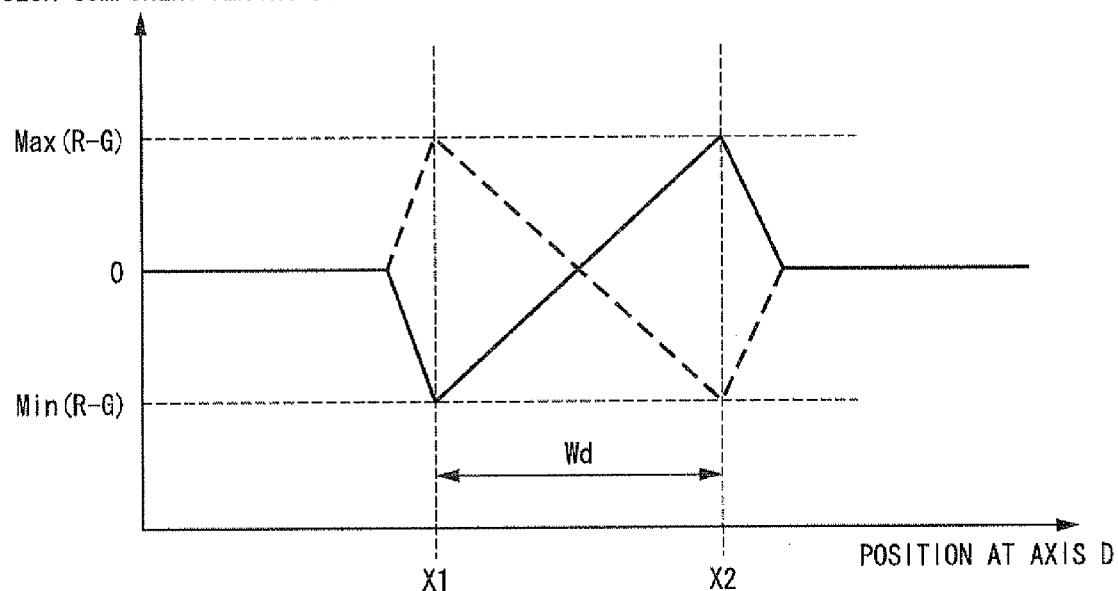
FIG. 10A is a diagram illustrating a "color component amount difference" in the vicinity of the edge position 13, and shows a relationship between a position at an axis D and a difference between a color component amount of the R channel and a color component amount of the G channel.
Figure 10B:
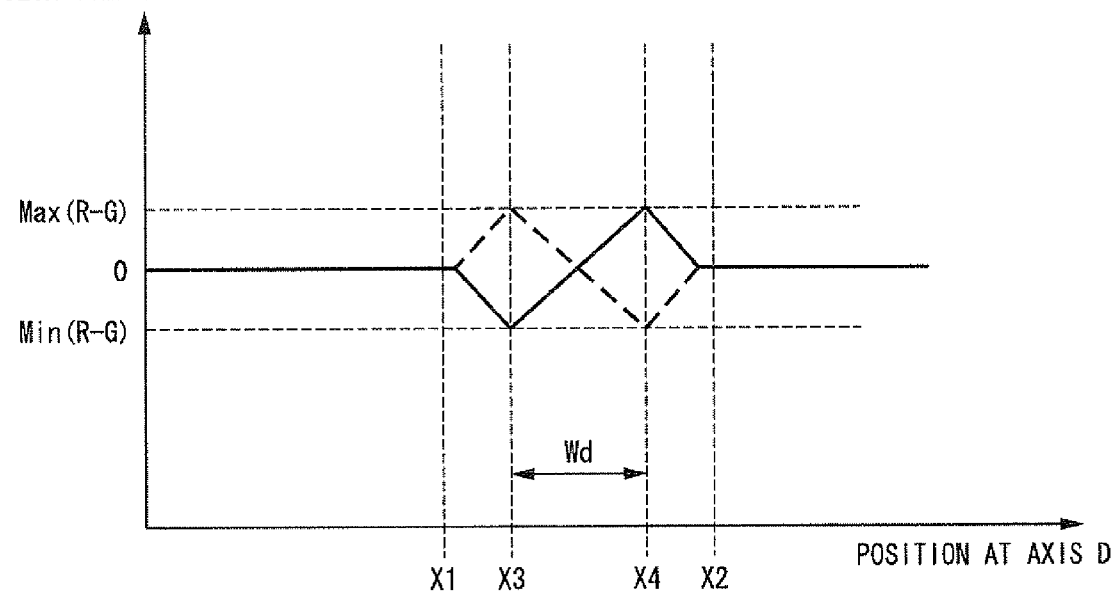
FIG. 10B is a diagram illustrating a "color component amount difference" in the vicinity of the edge position 13, and shows a waveform in a case of being close to a focalized state as compared with FIG. 10A.

Next, the Wd which is one of the evaluation values will be described. FIGS. 10A and 10B shows a "color component amount difference" in the vicinity of the edge position 13 (refer to FIG. 7). FIG. 10A shows a relationship between a position at an axis D and a difference between the color component amount of the R channel and the color component amount of the G channel. Here, the longitudinal axis indicates the color component amount difference (=R−G) where the color component amount of G is subtracted from the color component amount of R. In addition, the transverse axis indicates a position (refer to FIG. 7) at the axis D. Further, the longitudinal axis may indicate the ratio (=R/G) of a color component amount of R to the color component amount of G instead of the color component amount difference.

In addition, in FIGS. 10A and 10B, the solid line indicates a relationship between a color component amount difference (=R−G) in a case where the R channel is in a "back focus state" and a position at the axis D. The broken line indicates a relationship between the color component amount difference (=R−G) in a case where the R channel is in a "front focus state" and a position at the axis D.

The Wd is a value (defocus amount reference value) indicating a defocus amount. As shown in FIG. 10A, the Wd is indicated by a distance between peaks of the waveform of the color component amount difference. The Wd is expressed as in Expression 9 using positions X1 and X2 at the axis D.

$$Wd=|X2-X1| \quad \text{Expression 9}$$

The positions X1 and X2 are positions where the waveform of the color component amount difference (color component amount ratio) shows peaks in FIG. 10A. In addition, the intersection of the solid line and the broken line corresponds to the intersection of the lines of the respective channels in FIG. 9A.

First, in a case where the color component amount difference shows the maximum value "max(R−G)" at the position X2 in FIG. 10A, and the color component amount difference shows the minimum value "min(R−G)" at the position X1 (in a case of showing the waveform of the solid line), the polarity (positive and negative) of the waveform indicates that the R channel is in a back focus state (direction index). This is because, in a case where the R channel is in a back focus state, as shown in FIG. 9A, the color component amount of the R channel is equal to or more than the color component amount of the G channel on the right side of FIG. 9A, and the color component amount of the R channel is equal to or less than the color component amount of the G channel on the left side of FIG. 9A.

On the other hand, in a case where the color component amount difference shows the maximum value "max(R−G)" at the position X1 in FIG. 10A, and the color component amount difference shows the minimum value "min(R−G)" at the position X2 (in a case of showing the waveform of the broken line), the polarity (positive and negative) of the waveform indicates that the R channel is in a front focus state (direction index). This is because, in a case where the R channel is in a front focus state, as shown in FIG. 9A, the color component amount of the R channel is equal to or less than the color component amount of the G channel on the right side of FIG. 9A, and the color component amount of the R channel is equal to or more than the color component amount of the G channel on the left side of FIG. 9A.

FIG. 10B shows a waveform in a case of being close to a localized state as compared with FIG. 10A. The closer to a focalized state, the smaller the value of the Wd. In addition, a difference between the maximum value "max(R−G)" of the color component amount difference and the minimum value "min(R−G)" of the color component amount difference may vary depending on the "blur degree".

As such, the focus adjusting device 191 (refer to FIG. 1) can detect a focalized state and an unfocused state based on the evaluation value Wd. In addition, the focus adjusting device 191 can detect a front focus state and a back focus state based on a polarity of the color component amount difference.

Next, the LSF which is one of the evaluation values will be described. First, as one of indices for evaluating a lens performance, there is an MTF (Modulation Transfer Function). The MTF expresses to what extent a contrast of a subject can be faithfully reproduced as spatial frequency characteristics.

Generally, the MTF of a system is a product of the MTF of the image forming system (optical system) and the MTF of a sensor (imaging element). The focus adjusting device can detect (determine) a focalized state based on the MTF of the system. For example, the focus adjusting device may detect a focalized state by evaluating an MTF of an edge of a subject image. In addition, the focus adjusting device may detect a focalized state in further consideration of image processing procedures (for example, response characteristics of a circuit, demosaic, noise reduction, edge enhancement, and the like) performed in a stage subsequent to the image forming system and the sensor system.

In a case where light incident to the optical system is incoherent, it is known that the MTF and the LSF are reversible via the Fourier transform, In addition, the LSF can be easily calculated from edges included in an image (for example, refer to an "ISO12233" specification).

For example, the LSF may be calculated by differentiating an ESF (Edge Spread Function). In addition, the LSF may be calculated based on a difference between pixel values (for example, color component amounts) of adjacent pixels. In addition, the MTF may be calculated by performing a discrete Fourier transform (DFT) for the LSF.

The focus adjusting device 191 may detect (determine) a focalized state based on the LSF as an evaluation value in addition to the above-described Ed and Wd. For example, the focus adjusting device 191 may detect a focalized state and an unfocused state (front focus or back focus) as follows based on a "profile (data) of the LSF for each color channel" which is created in advance according to the well-known image processing procedures.

Figure 11A:
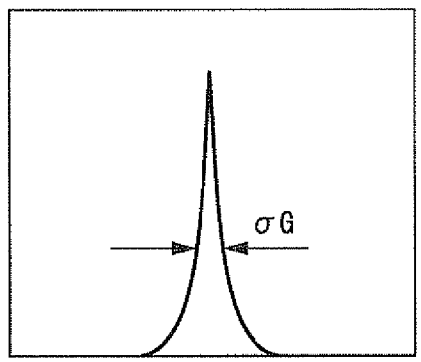
FIG. 11A is a diagram illustrating an LSF in a focalized state in the G channel.
Figure 11B:
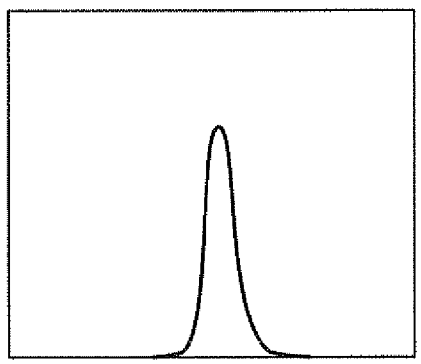
FIG. 11B is a diagram illustrating an LSF in an unfocused (small blur) state in the G channel.
Figure 11C:
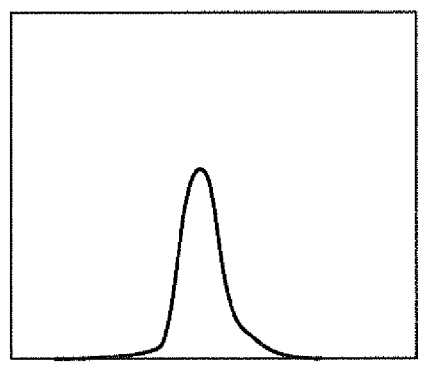
FIG. 11C is a diagram illustrating an LSF in an unfocused (large blur) state in the G channel.

FIGS. 11A, 11B and 11C show an LSF of the G channel according to a "blur degree" in a localized state. Here, the LSF is expressed by a standard deviation $\sigma$ (statistics) which is one of feature amounts of the LSF. In addition, the LSF may be expressed by a full width at half maximum or a peak value which is one of feature amounts of the LSF.

FIG. 11A shows the LSF in a focalized state. FIG. 11B shows the LSF in an unfocused (small blur) state. FIG. 11C shows the LSF in an unfocused (large blur) state in the G channel. From the figures, it is shown that the larger the "blur degree" in a focalized state, the greater the standard deviation a.

Figure 12B:
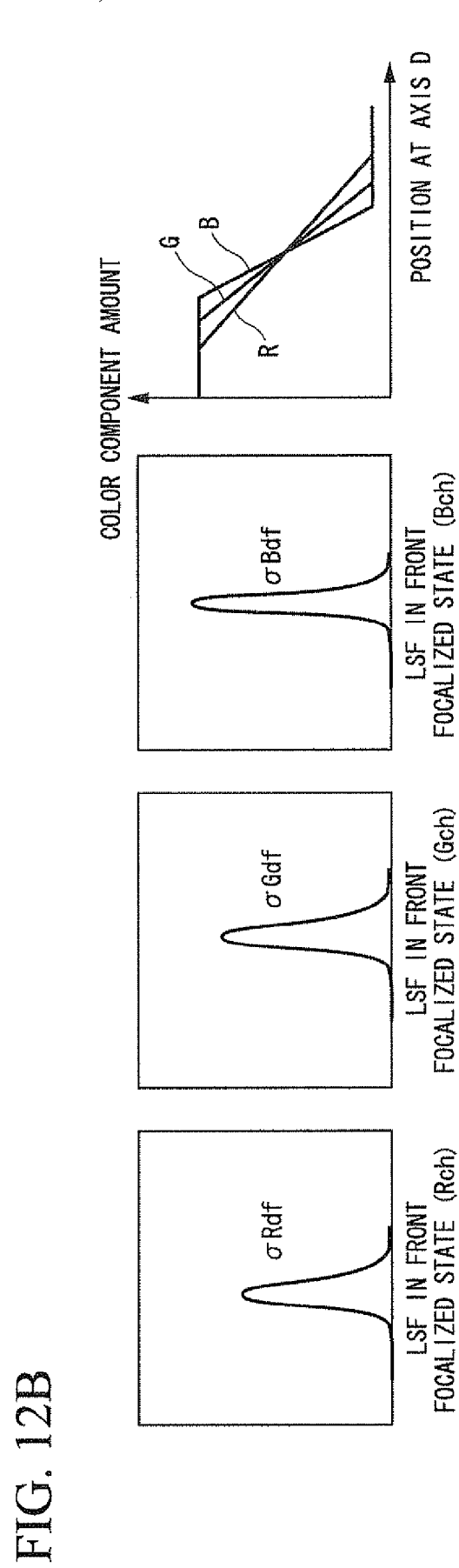
FIG. 12B is a diagram illustrating an LSF in a front focus state for each color channel (R, G, and B).
Figure 12C:
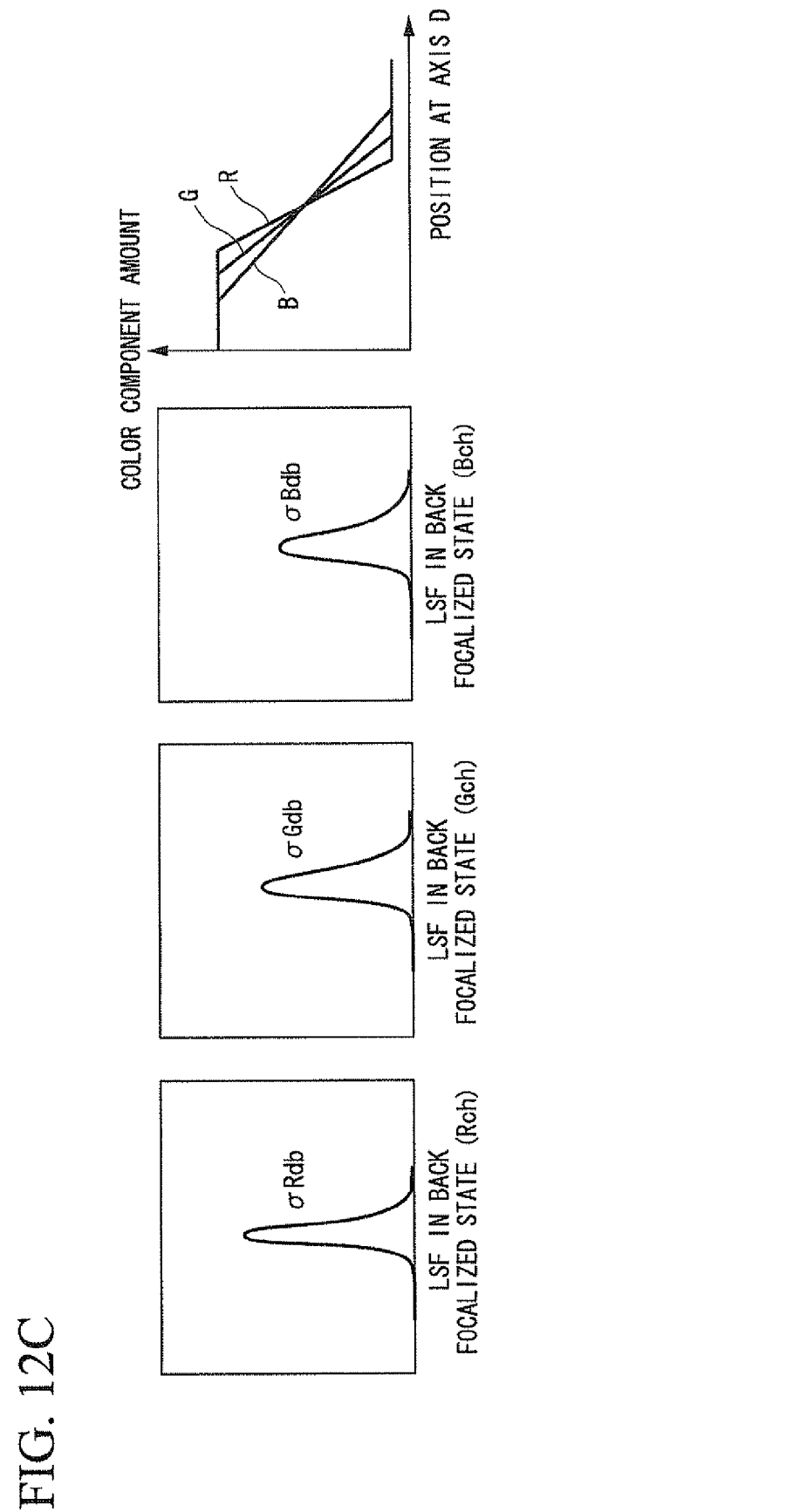
FIG. 12C is a diagram illustrating an LSF in a back focus state for each color channel (R, G, and B).

FIGS. 12A, 12B and 12C show a "blur degree" and an LSF for each color in a focalized state. FIG. 12A shows an LSF in a focalized state for each color (R, G, and B).

In addition, the magnitude correlation for each color channel of the standard deviation σ may be different as characteristics unique to a lens. In the following, a description will be made assuming that, in a standard deviation "σR" of the LSF of the R channel in a focalized state, a standard deviation "σG" of the LSF of the G channel in a focalized state, and a standard deviation "σB" of the LSF of the B channel in a localized state, there is a magnitude correlation of "σR>σG>σB".

FIG. 12B shows the LSF in a front focus state for each color (R, G, and B). In addition, a relationship between a position at the axis D and a color component amount in a front focus state is shown on the rightmost part of FIG. 12B. In the figure of the rightmost part of FIG. 12B, unlike in FIGS. 8A, 8B and 8C, a case where the G channel is also in a front focus state is shown, and thus all of gradients of R, G, and B are smooth. In addition, in the figure of the rightmost part of FIG. 12B, in relation to a gradient (slope) of a color component amount at the edge in a front focus state, it is shown that the gradient of R is the smoothest, and the gradient of B is the steepest.

As such, since the gradient of R is the smoothest and the gradient of B is the steepest in a front focus state, in a standard deviation "σRdf" of the LSF of the R channel, a standard deviation "σGdf" of the LSF of the G channel, and a standard deviation "σBdf" of the LSF of the B channel, in a front focus state, there is a magnitude correlation of "σRdf>σGdf>σBdf". More specifically, there is a magnitude correlation of "σRdf>K1·σGdf" and "σBdf<K2·σGdf". Here, "K1=σR/G" and "K2=σB/G".

FIG. 12C shows the LSF in a back focus state for each color (R, G, and B). In addition, a relationship between a position at the axis D and a color component amount in a front focus state is shown on the rightmost part of FIG. 12C. In the figure of the rightmost part of FIG. 12C, unlike in FIGS. 8A, 8B and 8C, a case where the G channel is also in a back focus state is shown, and thus all of gradients of R, G, and B are smooth. In addition, in the figure of the rightmost part of FIG. 12C, in relation to a gradient (slope) of a color component amount at the edge in a back focus state, it is shown that the gradient of B is the smoothest, and the gradient of R is the steepest.

As such, since the gradient of B is the smoothest and the gradient of R is the steepest in a back focus state, in a standard deviation "σRdb" of the LSF of the R channel, a standard deviation "σGdb" of the LSF of the G channel, and a standard deviation "σBdb" of the LSF of the B channel, in a back focus state, there is a magnitude correlation of "σBdb>σGdb>σRdb". More specifically, there is a magnitude correlation of "σRdb<K1·σGdb" and "σBdb>K2·σGdb". Here, "K1=σR/G" and "K2=σB/G".

Figure 13:
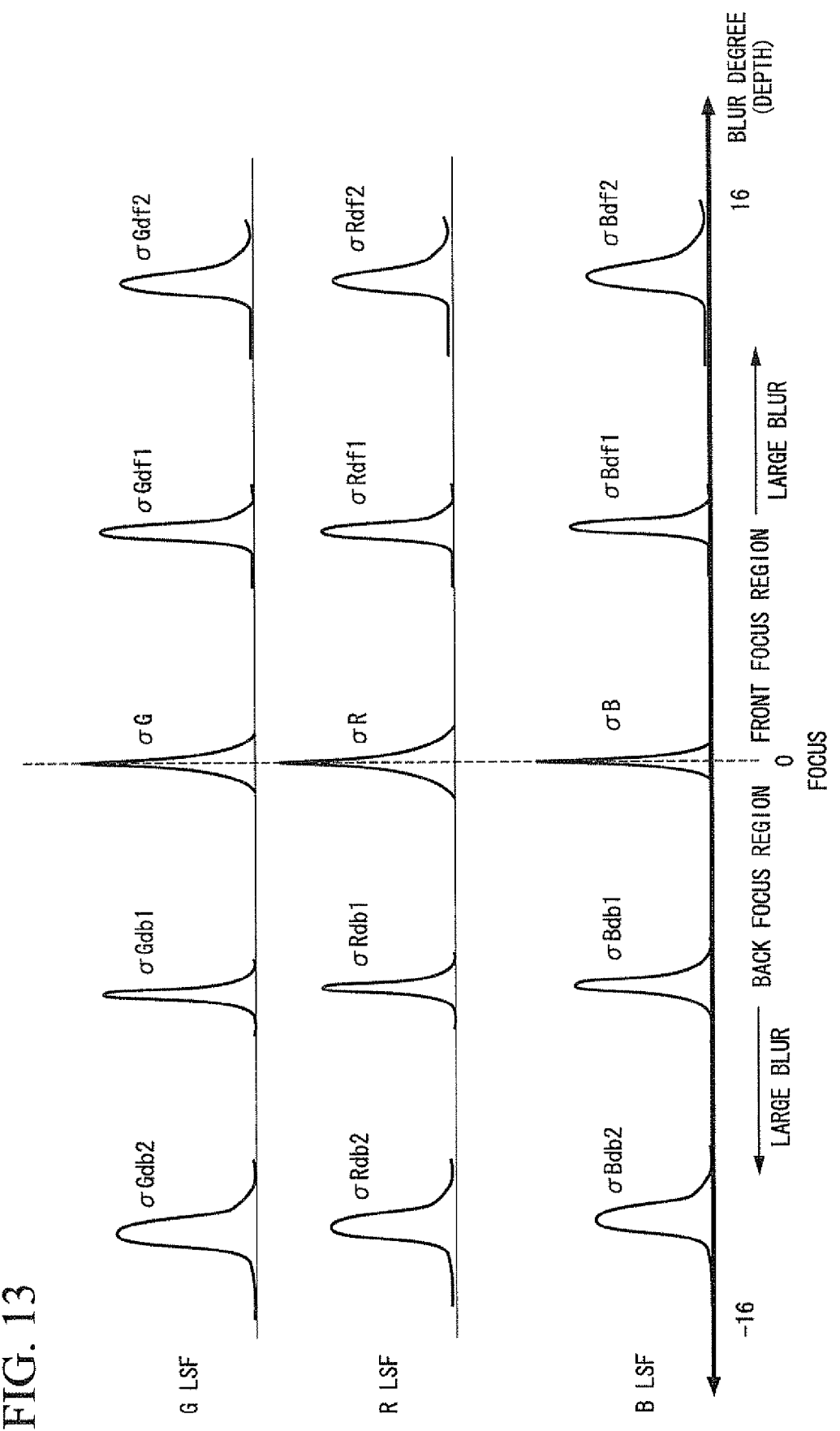
FIG. 13 is a diagram illustrating a relationship between a profile (data) of an LSF for each color channel (R, G, and B) and a blur degree.

FIG. 13 shows a relationship between a profile (data) of an LSF for each color (R, G, and B) and a blur degree. The transverse axis indicates a blur degree. In addition, profiles of the LSF are shown in an order of the G channel, the R channel, and the B channel from the above. In addition, FIG. 13 shows that the number of the subscript of the standard deviation is large in the LSF where an absolute value (defocus amount) of the blur degree is large.

In addition, the profile of the LSF in a focalized state is shown at the center position "0" of the transverse axis. Further, the right side from the center position "0" of the transverse axis is a region (front focus region) where the edge is in a front focus state, and the more distant from the center position "0", the larger the absolute value of the blur degree. On the other hand, the left side from the center position "0" of the transverse axis is a region (back focus region) where the edge is in a back focus state, and the more distant from the center position "0", the larger the absolute value of the blur degree.

Further, the profile of the LSF for each color channel is created before the imaging apparatus 100 images a subject and is stored in advance in the storage unit 160 for each blur degree. Here, the profile of the LSF for each color channel is expressed by, for example, a standard deviation, and is stored in the storage unit 160 in advance. In addition, the profile of the LSF may be expressed by a full width at half maximum or a peak value and be stored in the storage unit 160 in advance.

In addition, the "blur degree" of the transverse axis may be expressed by a subject distance (depth). Further, the profile of the LSF for each color channel may be correlated with the "blur degree" as well as information indicating zoom magnification, a subject distance, and a position for an angle of view, information indicating a horizontal (H) direction or a vertical (V) direction in a captured image, information indicating a noise reduction processing method, or information indicating an edge enhancing method, and be stored in storage unit 160 in advance.

Figure 14:
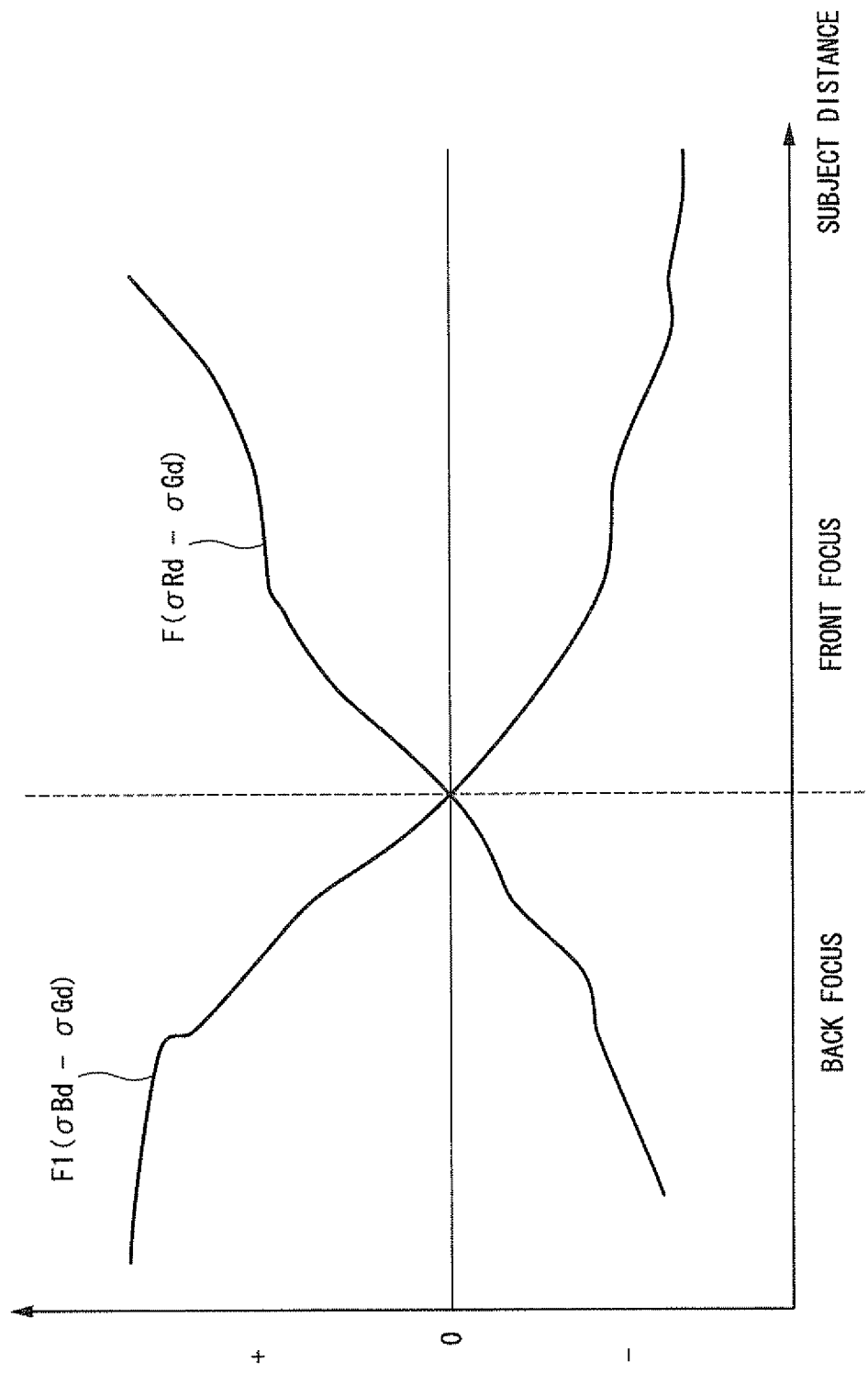
FIG. 14 is a diagram illustrating a relationship between a function value having a difference between standard variations of the LSF and a subject distance.

FIG. 14 shows a relationship (relative distance, distance function) between a function value having a difference between standard variations of the LSF and a subject distance. Here, the longitudinal axis indicates a difference in standard deviations of the LSF. In addition, the transverse axis indicates a subject distance. Further, the subject distance (Depth) is indicated by Expression 10.

$$\text{Depth}=G(F(\sigma Rd-\sigma Gd)-F1(\sigma Bd-\sigma Gd)) \quad \text{Expression 10}$$

Here, σRd is a standard deviation of the LSF of the R channel. σGd is a standard deviation of the LSF of the G channel. σBd is a standard deviation of the LSF of the B channel.

In addition, F(σRd–σGd) is a function having the difference "σRd–Gd" between the standard deviations as a parameter, and has a negative value in a back focus state and has a positive value in a front focus state. Further, F1(σBd–σGd) is a function having the difference "σBd–σGd" between the standard deviations as a parameter, and is a function having a positive value in a back focus state and having a negative value in a front focus state.

Furthermore, the function G is a function having "F(σRd–σGd)–F1(σBd–σGd)" as a parameter, and is a function which select at least one of a value of the function F and a value of the function F1. In addition, the function G is a function used to calculate the subject distance (Depth) by selecting a value of the function F in a front focus state and selecting a value of the function F1 in a back focus state.

In addition, the LSF may be calculated for only one color channel (monochrome). In this case, the focus adjusting device 191 may detect a focalized state and an unfocused state by matching profiles of an imaged LSF of a color channel and the LSF of a single color channel. For example, in a case where the imaged LSF conforms (matches) to a profile of an LSF indicating the blur degree "0", the focus adjusting device 191 may determine an edge as being in a focalized state.

As such, the focus adjusting device 191 (refer to FIG. 1) can detect a focalized state or an unfocused state based on a standard deviation or a full width at half maximum of the evaluation value LSF. In addition, the focus adjusting device 191 can detect a front focus state or a back focus state by comparing a standard deviation or a full width at half maximum of the evaluation value LSF for each color channel.

The above description relates to the evaluation values for detecting a direction index and a defocus amount.

Next, the description of the configuration of the focus adjusting device 191 returns. The focus adjusting device 191 (refer to FIG. 1) includes an edge detection unit 192, a distribution detection unit 193, and a control unit 194. The edge detection unit 192 detects edges of a subject image for each color component (R channel, G channel, and B channel) forming the image which is output by the imaging unit 110.

Figure 15A:
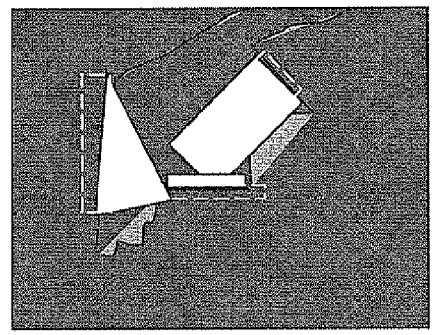
FIG. 15A shows an example of a part (partial image) of the image captured by the imaging unit.

FIGS. 15A, 15B, 15C and 15D show examples of the captured image, the edge images extracted from the captured image, and the logical product result of two edge images. FIG. 15A shows an example of a part (partial image) of the image captured by the imaging unit 110. in FIG. 15A, the frames denoted by the broken lines indicate detection regions for the edge detection unit 192 detecting edges. In addition, the detection regions may be regions which are spread only toward one side of an edge. Further, a position of the detection region in the partial region may be set in advance.

Figure 15B:
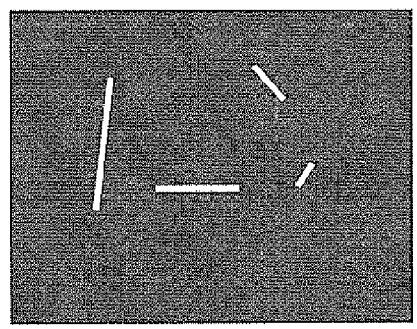
FIG. 15B shows an edge image of the R channel extracted from the captured image.
Figure 15C:
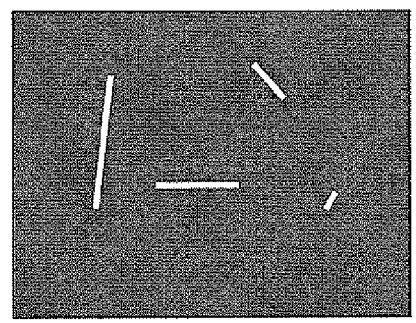
FIG. 15C shows an edge image of the G channel extracted from the captured image.
Figure 15D:
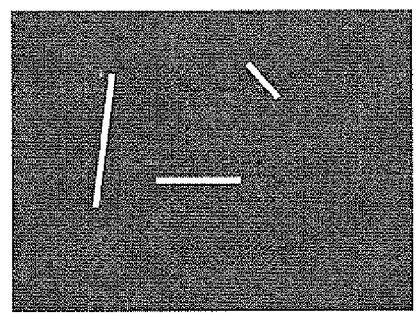
FIG. 15D is an image indicating a calculated result of logical product (AND) of the edge image of the R channel and the edge image of the G channel.

The edge detection unit 192 (refer to FIG. 1) extracts (detects) an edge image (a mask image which masks parts other than the edges) of the subject image which is captured in the detection regions from the partial image for each color component. FIG. 15B shows an extracted edge image of the R channel. FIG. 15C shows an extracted edge image of the G channel. FIG. 15D is an image indicating a calculated result of logical product (AND) of the edge image of the R channel and the edge image of the G channel. A procedure of extracting (generating) such images will be described below.

Figure 16:
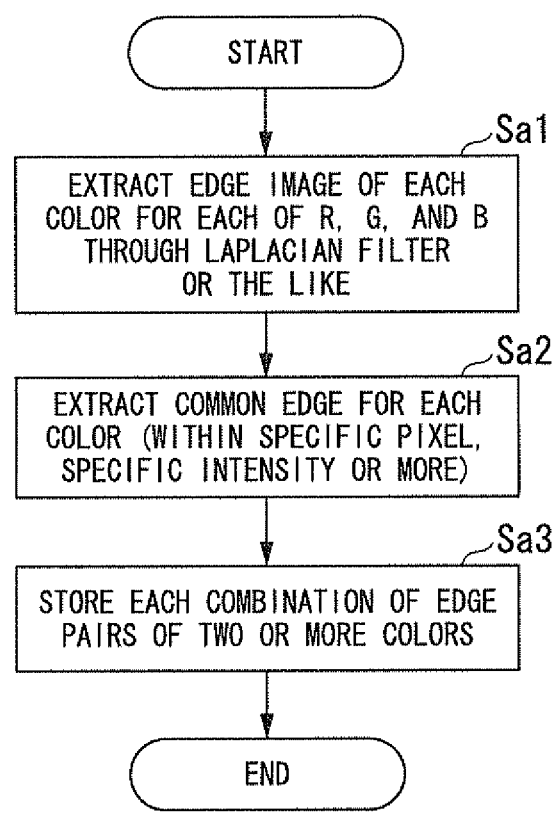
FIG. 16 is a flowchart illustrating an operation of an edge detection unit 192.

FIG. 16 is a flowchart illustrating an operation of an edge detection unit 192. The edge detection unit 192 extracts (generates) an edge image for each color channel through a Laplacian filter or the like, from a coarse image (for example, a QVGA resolution) captured by the imaging unit 110 (step Sa1).

Figure 17:
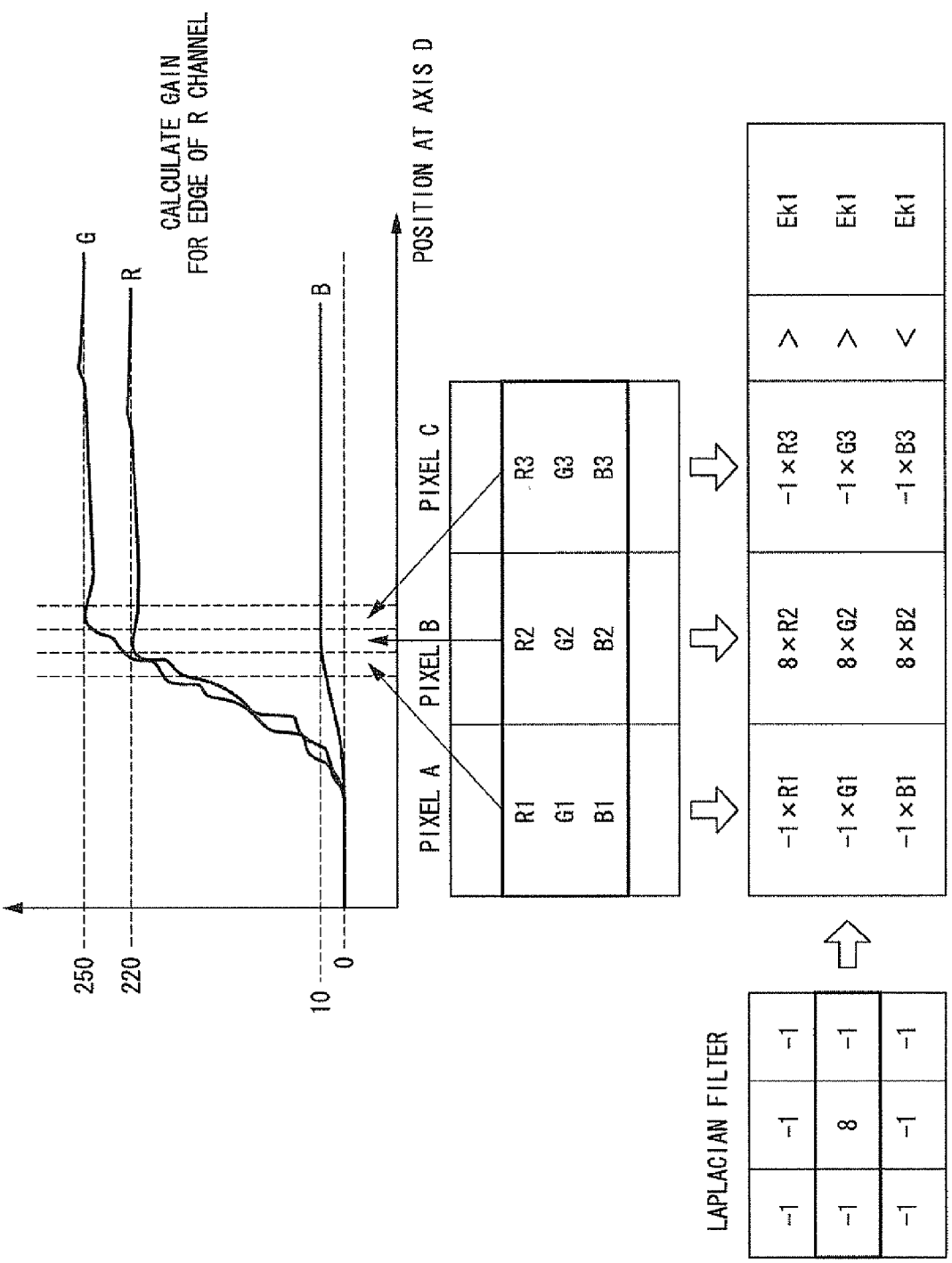
FIG. 17 is an example of the diagram illustrating a color component amount in the vicinity of the edge position 13 and is a diagram illustrating a calculation example of using a Laplacian filter.

The procedure of extracting the edge image for each color channel in step Sa1 will be described more in detail. FIG. 17 is an example of the grayscale cross-sectional view of a color component amount in the vicinity of the edge position 13 and is a diagram illustrating a calculation example of using a Laplacian filter. As an example, a case of extracting (generating) an edge extending in the vertical direction of the image will be described.

Here, it is assumed that pixels are arranged in an order of a pixel A, a pixel B, and a pixel C in the horizontal direction perpendicular to the edge. In addition, in the respective pixels, it is assumed that the pixel A is formed by "a color component amount R1=value "200", a color component amount G1=value "220", and a color component amount B1=value "10", the pixel B is formed by "a color component amount R2=value "220", a color component amount G2=value "230", and a color component amount B2=value "10", and the pixel C is formed by "a color component amount R3=value "220", a color component amount G3=value "250", and a color component amount B3=value "10". In addition, a threshold value Ek1 is set to a value "100". Further, these values are an example.

The edge detection unit 192 adds a value obtained by multiplying each color component amount by a coefficient of the Laplacian filter to each color component. In addition, the edge detection unit 192 compares the addition result with the preset threshold value Ek1 for each color component.

Specifically, the edge detection unit 192 compares the addition result "(−1)×R1+8×R2+(−1)×R3" for the R channel with the threshold value Ek1. Since the addition result for the R channel is greater than the threshold value Ek1, the edge detection unit 192 uses the edge of the R channel as an effective edge and generates an edge image of the R channel.

Specifically, the edge detection unit 192 compares the addition result "(−1)×G1+8×G2+(−1)×G3" for the G channel with the threshold value Ek1. Since the addition result for the G channel is greater than the threshold value Ek1, the edge detection unit 192 uses the edge of the G channel as an effective edge and generates an edge image of the G channel. Similarly, the edge detection unit 192 compares the addition result "(−1)×B1+8×B2+(−1)×B3" for the B channel with the threshold value Ek1. Since the addition result for the B channel is equal to or smaller than the threshold value Ek1, the edge detection unit 192 does not use the edge of the B channel as an effective edge and does not generate an edge image of the 13 channel.

In addition, the edge detection unit 192 sets the color component amount of the R channel in the edge image to the same level as the color component amount of the G channel. For example, the edge detection unit 192 uses a value obtained by dividing the color component amount of the G channel by the color component amount of the R channel, as a gain (correction magnification). In addition, the edge detection unit 192 multiplies the color component amount of the R channel by the gain. In this way, the edge detection unit 192 generates edge images (refer to FIGS. 15B and 15C).

Returning to FIG. 16, the description of the operation of the edge detection unit 192 is continued. The edge detection unit 192 extracts edges (edge pair) of two or more colors which are correlated for a position. Specifically, the edge detection unit 192 extracts a color component amount of the edge of the R channel and a color component amount of the edge of the G channel, for the same pixel. In addition, the edge detection unit 192 designates a color component amount logical product (AND) of the edge pair as a common edge image (step Sa2).

The edge detection unit 192 may extract a logical product of color component amounts of edges (edge pair, color pair) of the R channel and the G channel adjacent within "±1 pixel" as a common edge, even if the edges are in the same pixel (generation of a thick line). In addition the edge detection unit 192 may extract a common edge based on a logical product of color component amounts of edges equal to or more than a preset length L.

In addition, the edge detection unit 192 stores common edges of the R channel and the G channel forming the common edges in the storage unit 160 (step Sa3). In this way, the edge detection unit 192 generates an edge image (refer to FIG. 15D) where a common edge between the edge of the R channel and the edge of the G channel.

The imaging unit 110 divides the captured image into lattice-shaped blocks. In addition, the distribution detection unit 193 detects a focalized state and an unfocused state (a direction index and a defocus amount) for each of the divided blocks.

Figure 18:
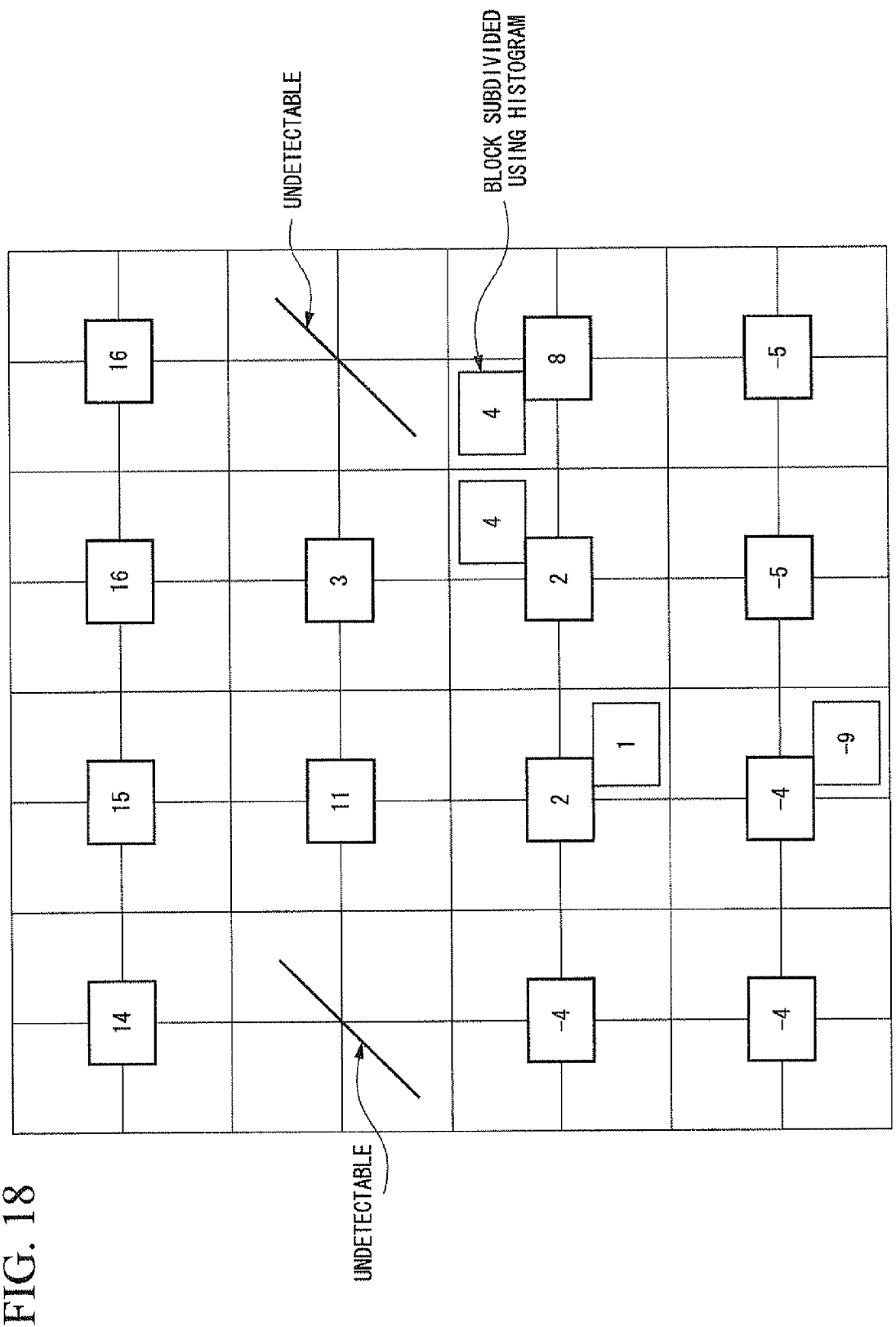
FIG. 18 is a diagram illustrating an example of the depth map.

FIG. 18 shows an example of the depth map. Here, the depth map is a map which shows distributions of a focalized state and an unfocused state (blur degree) in the captured image with the block (partial image) units.

In the following, as an example, a description will be made assuming that an image captured by the imaging unit 110 is divided into "4×4" blocks, and an edge image in one block of them is the edge image exemplified in FIG. 15D.

The distribution detection unit 193 detects distributions of a focalized state and an unfocused state of the common edge based on at least one of an Ed, a Wd or an LSF of the common edge extracted in the edge image. The distribution detection unit 193 detects a focalized state and an unfocused state (blur degree) of the common edges as follows based on an Ed of the three common edges extracted in the edge image of FIG. 15D.

The lengths of the three common edges extracted in the edge image of FIG. 15D are respectively indicated by L1, L2, and L3. First, the distribution detection unit 193 calculates Expression 11.

$$\Sigma(L((\Sigma(R/G)/\Delta) = L1((\Sigma(R1/G1))/\Delta) + L2((\Sigma(R2/G2))/\Delta) + L3((\Sigma(R3/G3))/\Delta)$$

Expression 11

Here, "$\Delta$" is a length of a section perpendicular to the edge. For example, in a case of the grayscale cross-sectional view exemplified in FIG. 9A, "$\Delta$" is the length of the section $\Delta 1$ or $\Delta 2$. In addition, the distribution detection unit 193 sets a values obtained by dividing Expression 11 "$\Sigma(L((E(R/G)/\Delta)$" by "L1+L2+L3" as the EdRG.

In addition, as described in the evaluation value Ed, in a case where Expression 1 is satisfied, the distribution detection unit 193 determines that the common edges are in a back focus state. On the other hand, in a case where Expression 2 is satisfied, the distribution detection unit 193 determines that the common edges are in a front focus state.

In the depth map exemplified in FIG. 18, the value surrounded by the rectangular frame indicates a "blur degree" in the block. In addition, the larger the absolute value of the blur degree, the larger the defocus amount, which indicates an unfocused state. In addition, the block having a negative value indicates that an edge imaged in the block is in a back focus state. Conversely, the block having a positive value indicates that an edge imaged in the block is in a front focus state.

The distribution detection unit 193 may subdivide one of the blocks divided into "4×4", into small blocks (segment) of "2×2". In addition, the distribution detection unit 193 may detect a focalized state and an unfocused state of the common edges for the small blocks based on a histogram of the blur degree. For example, the distribution detection unit 193 may interpolate a "blur degree" of the small block between a value "2" and a value "8" using the histogram so as to generate a value "4". The interpolated value is an example. In addition, in a case where an effective edge of which a color component amount (power) is sufficient is not detected, an undetectable block where a direction index and a defocus amount cannot be detected may be left in the depth map.

In this way, the distribution detection unit 193 detects distributions of a focalized state and an unfocused state of the common edges based on the Ed, thereby creating a depth map. Similarly, the distribution detection unit 193 may detect a focalized state and an unfocused state of the common edges based on the above-described Wd, thereby creating a depth map.

In addition, the distribution detection unit 193 may detect a focalized state and an unfocused state of the common edges based on the above-described LSF, thereby creating the depth map. Specifically, the distribution detection unit 193 divides an image captured in the imaging unit 110 into lattice-shaped blocks, and extracts an edge image for each block (refer to FIG. 15D). In addition, the distribution detection unit 193 calculates an LSF of an edge extracted in the edge image according to the procedure described in the evaluation value LSF. Further, the distribution detection unit 193 detects a "blur degree" for each block according to the procedure described in the evaluation value LSF based on a profile of the LSF and an imaged LSF of the edge, thereby creating a depth map.

In addition, the distribution detection unit 193 may detect distributions of a localized state and an unfocused state of the common edges by combining the evaluation values Ed, Wd and LSF with each other. For example, the distribution detection unit 193 may detect distributions of a focalized state and an unfocused state of the common edges based on the Ed, and then supplementarily detect distributions of a focalized state and an unfocused state of the common edges based on the LSF for a block where an effective edge is not detected.

The control unit 194 selects blocks which capture the subject image from the distributions based on the distributions of a focalized state and an unfocused state detected by the distribution detection unit 193. In addition, the control unit 194 moves the AF lens 112 so as to focus on the edges of the subject image. Further, the control unit 194 determines whether or not a photographing instruction for storing an image captured by the imaging unit 110 in the storage medium 200 is output from the operating unit 180 to the CPU 190. Furthermore, the control unit 194 determines whether or not a focus instruction for focusing on a subject image is output from the operating unit 180 to the CPU 190. The control unit 194 changes procedures of the focus drive based on the determination as described later.

Figure 19:
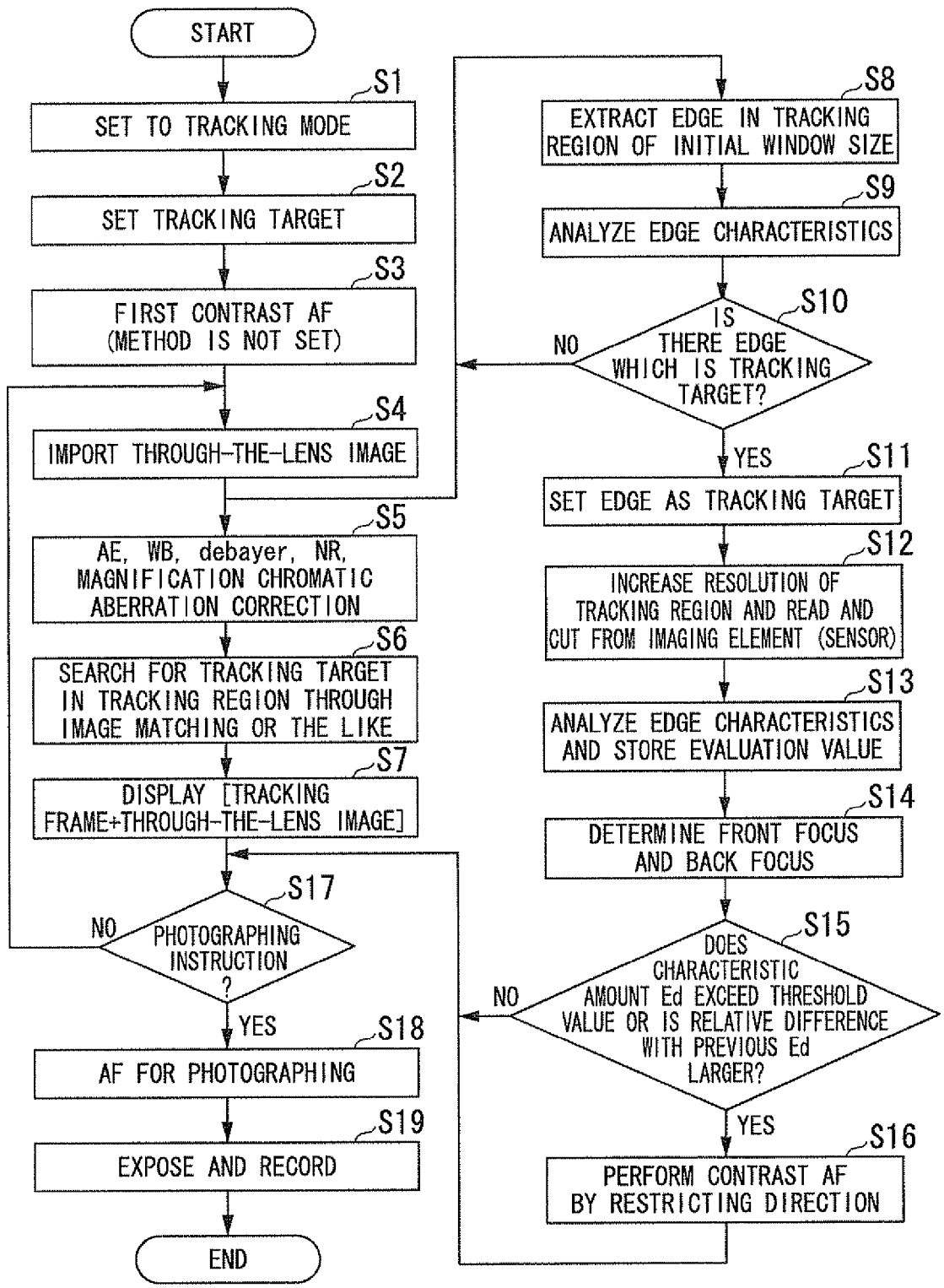
FIG. 19 is a flowchart illustrating a procedure of the focus drive of the focus adjusting device 191 in a tracking operation of tracking a subject.

Next, an operation of the imaging apparatus 100 will be described mainly based on an operation of the focus adjusting device 191. FIG. 19 is a flowchart illustrating a procedure of the focus drive of the focus adjusting device 191 in a tracking operation of tracking a subject. First, the CPU 190 of the imaging apparatus 100 sets the focus adjusting device 191 in a tracking mode so as to execute a tracking operation of tracking a subject image (step S1). In addition, the CPU 190 designates (sets) the subject image which is a tracking target in the focus adjusting device 191 (step S2). These settings may be executed based on an operation input received by the operating unit 180.

In addition, the control unit 194 of the focus adjusting device 191 executes a first focus drive (step S3). A focusing method in the focus drive may be appropriately selected. For example, the focusing method may be a contrast AF (Auto Focus) method, or may be other focusing methods (phase difference detection method and the like). The imaging element 119 further converts an optical image formed on the photoelectric conversion surface into an electric signal according to the focusing method. In addition, the imaging element 119 outputs the electric signal obtained here to the A/D conversion unit 120 as a through-the-lens image (step S4). A resolution of the through-the-lens image output from the imaging element 119 may be reduced by decimating a portion of the data.

Next, the imaging apparatus 100 and the focus adjusting device 191 process steps S5 to S7 and steps S8 to S16 described below in parallel. In addition, the imaging apparatus 100 and the focus adjusting device 191 may repeatedly execute steps S4 to S17.

The CPU 190 controls the imaging unit 110 so as to execute an automatic exposure (AE) process and a debayer (color interpolation) process. In addition, the image processing unit 140 acquires the through-the-lens image and executes an image process (step S5). For example, the image processing unit 140 executes a white balance (WB) adjustment process, a noise reduction (NR) process, a magnification chromatic aberration correction process, and the like, as image processes, for the acquired through-the-lens image.

In addition, the image processing unit 140 searches for the tracking target imaged in a tracking region of the acquired through-the-lens image through an image matching process or the like (step S6). In addition, the image processing unit 140 superimposes a tracking range indicating the tracking region on the through-the-lens image so as to be displayed on the display unit 150 (step S7).

Meanwhile, the edge detection unit 192 of the focus adjusting device 191 extracts edges imaged in a tracking region of an initial window size set in advance (refer to each figure of FIGS. 15A, 15B, 15C, and 15D) (step S8). In addition, the edge detection unit 192 analyzes edge characteristics according to the procedure described with reference to FIG. 16 (step S9).

Further, the edge detection unit 192 determines whether or not there are edges which are tracking targets (step S10). If there is no edge (step S10—NO), the process of the edge detection unit 192 returns to step S8. On the other hand, if there is an edge (step S10—YES), the edge detection unit 192 sets the edge as a tracking target (step S11). Here, the edge detection unit 192 may set an edge of which power is strong (a color component amount is large) as a tracking target.

In addition, the CPU 190 controls the imaging unit 110 so as to increase the resolution of the through-the-lens image output from the imaging element 119. Here, there are cases where the resolution of the through-the-lens image is increased as a result of decimation of a portion of data of the through-the-lens image. In addition, the CPU 190 controls the imaging unit 110 such that a portion of the optical image formed on the photoelectric conversion surface of the imaging element 119 is cut, and an image thereof is converted into an electric signal which is output to the A/D conversion unit 120 from the imaging element 119 (step S12).

Figure 20:
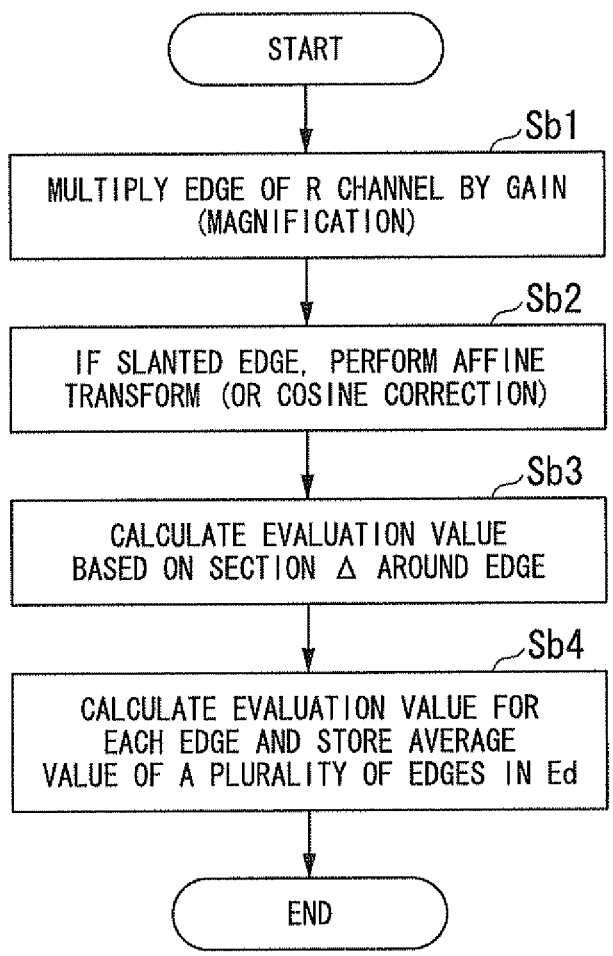
FIG. 20 is a flowchart illustrating an analysis procedure of the edge characteristics.

In addition, the edge detection unit 192 analyzes edge characteristics and stores evaluation values in the storage unit 160 (step S13). In step S13, the edge detection unit 192 executes a procedure shown in FIG. 20. FIG. 20 is a flowchart illustrating an analysis procedure of the edge characteristics. The edge detection unit 192 calculates a gain (magnification) based on an edge image of the R channel and an edge image of the G channel, and multiplies the edge of the R channel by the gain (refer to FIG. 17 and the like) (step Sb1).

In addition, the edge detection unit 192 transforms an edge extending in a tilted manner with respect to the image so as to be horizontal with respect to the image by executing affine transform or cosine correction (step Sb2). In addition, the distribution detection unit 193 of the focus adjusting device 191 calculates an evaluation value for each lattice-shaped block in the image captured by the imaging unit 110 based on the section Δ in the vicinity of the edge (for example, refer to Expression 1).

In addition, the distribution detection unit 193 calculates each evaluation value for each edge (refer to FIG. 15D) extracted by the edge detection unit 192, and sets a value obtained by averaging the calculated evaluation values with the length of the edge, as an Ed (for example, refer to Expression 11) (step Sb4). Here, the distribution detection unit 193 calculates at least one of the Ed, the Wd, and the LSF as evaluation values. In addition, the distribution detection unit 193 stores the evaluation values, edge pairs (color pair) for each color channel, color component amounts (color intensity), and gains, as the edge characteristics, in the storage unit 160. The distribution detection unit 193 creates a depth map (refer to FIG. 18) in the manner described above.

Returning to FIG. 19, the description of the procedure of the focus drive of the focus adjusting device 191 is continued. The distribution detection unit 193 determines in which one of a localized state, a front focus state, or a back focus state the edge is, based on an evaluation value of the block capturing the edge of the subject image which is set as a tracking target in step S2 (for example, refer to Expressions 1 to 4) (step S14).

In addition, the distribution detection unit 193 determines whether or not the evaluation value Ed exceeds a predefined first threshold value. Further, the distribution detection unit 193 determines whether or not a difference between the previous Ed and the present Ed exceeds a predefined second threshold value (step S15).

If the evaluation value Ed exceeds the predefined first threshold value, or the difference between the previous Ed and the present Ed exceeds the predefined second threshold value (step S15—YES), it can be determined that a defocus amount is increased. Therefore, the control unit 194 restricts a movement direction of the AF lens 112 and executes contrast scanning.

Figure 21:
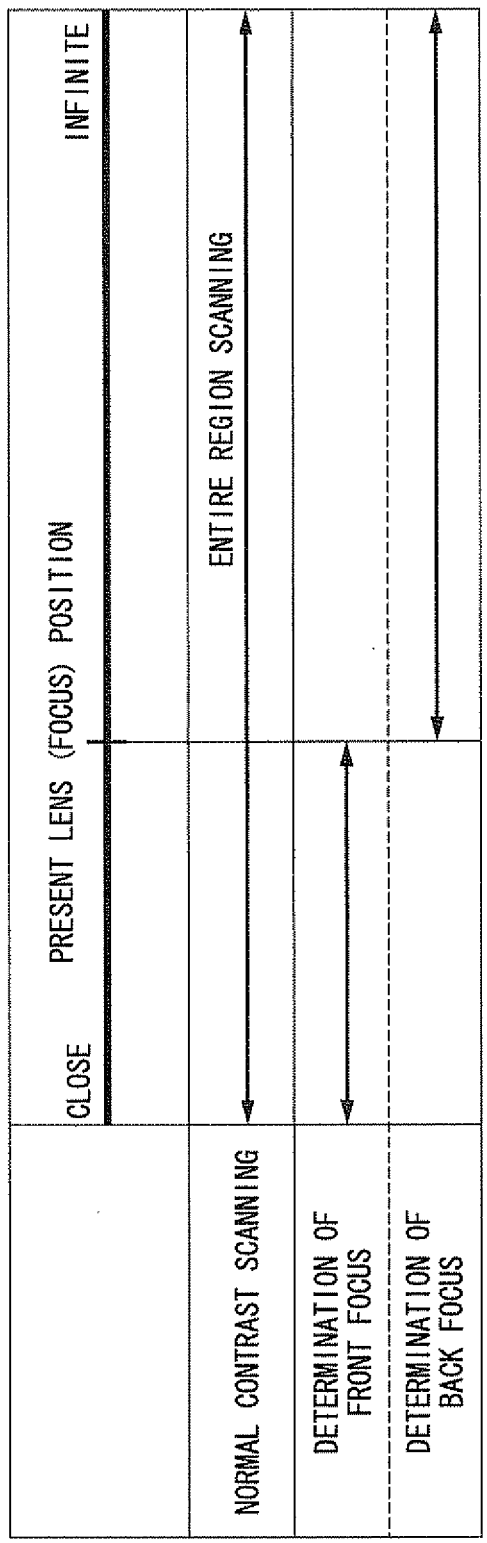
FIG. 21 is a diagram illustrating a scanning region when a front focus state is determined and a scanning region when a back focus state is determined.

Next, a procedure where the control unit 194 restricts a movement direction of the AF lens 112 will be described. FIG. 21 shows a scanning region when a front focus state is determined and a scanning region when a back focus state is determined. The middle part of FIG. 21 shows that, in "normal contrast scanning", the AF lens 112 moves while performing contrast scanning for the entire range of a predefined movable range (close to infinite) inside the lens barrel 111. The "normal contrast scanning" is performed regardless of a determination result of a front focus state and a back focus state.

In contrast to the "normal contrast scanning" shown in the middle part of FIG. 21, the lower part of FIG. 21 shows a movement in contrast scanning performed based on a determination result of a front focus state and a back focus state. According to the lower part of FIG. 21, the AF lens 112 moves while performing contrast scanning for a portion of the region of the predefined movable range (close to infinite) inside the lens barrel 111.

If it is determined that the edge of the subject image set as a tracking target is in a front focus state, the control unit 194 restricts a movement direction of the AF lens 112 to a region on the close side from the present position of the AF lens 112 and performs contrast scanning. On the other hand, If it is determined that the edge of the subject image set as a tracking target is in a back focus state, the control unit 194 restricts a movement direction of the AF lens 112 to a region on the infinite side from the present position of the AF lens 112 and performs contrast scanning.

As such, since a movement direction of the AF lens 112 is restricted, the focus adjusting device 191 enables the subject image to be rapidly focused as compared with the normal contrast scanning.

Returning to FIG. 19, the description of the procedure of the focus drive of the focus adjusting device 191 is continued. The control unit 194 moves the AF lens 112 to a focus position which is detected through the contrast scanning performed based on the determination result of a front focus state and a back focus state in order to focus on the edge of the subject image (step S16).

In step S15, in a case where the evaluation value Ed does not exceed the predefined first threshold value and the difference between the previous Ed and the present Ed is not increased more than the predefined second threshold value (step S15—NO), the process of the control unit 194 proceeds to step S17. In addition, the process of the control unit 194 executes step S16 and then proceeds to step S17.

The control unit 194 determines whether or not a photographing instruction for storing an image captured by the imaging unit 110 in the storage medium 200 is output from the operating unit 180 to the CPU 190 (step S17). For example, a user operates the shutter button of the operating unit 180 and thereby the photographing instruction is output to the CPU 190 from the operating unit 180.

In a case where the photographing instruction is not output to the CPU 190 from the operating unit 180 (step S17—NO), the process of the control unit 194 returns to step S4. On the other hand, in a case where the photographing instruction is output to the CPU 190 from the operating unit 180 (step S17—YES), the process of the control unit 194 proceeds to step S18.

Figure 22A:
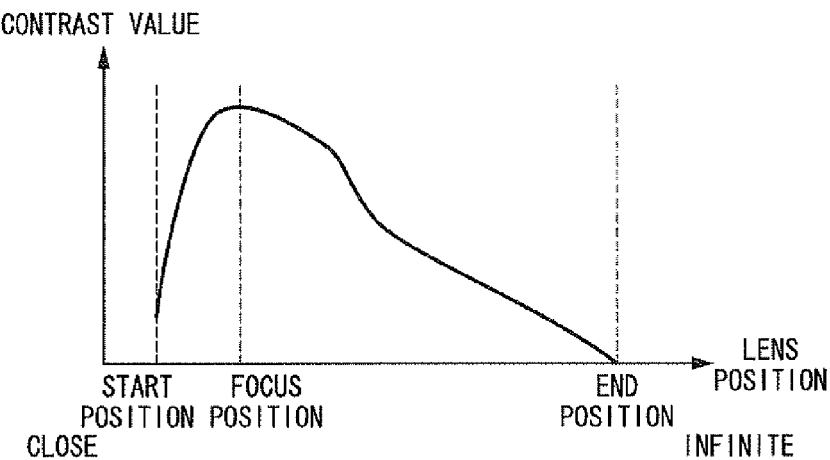
FIG. 22A is a diagram illustrating a movement of a lens position in hill-climbing contrast scanning during AF for photographing, and shows an example of the relationship between a position of the AF lens 112 and a contrast value in the contrast scanning.
Figure 22B:
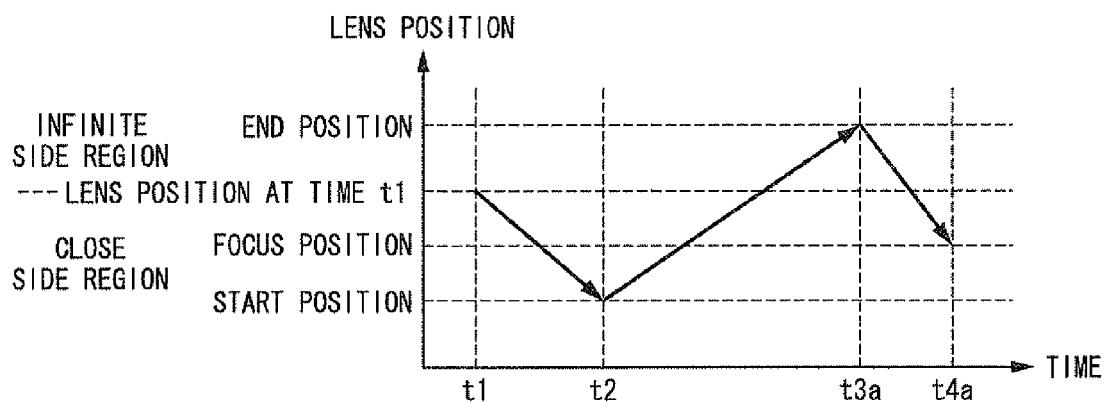
FIG. 22B shows a movement of a position of the AF lens 112 in normal contrast scanning (refer to the middle part of FIG. 21).
Figure 22C:
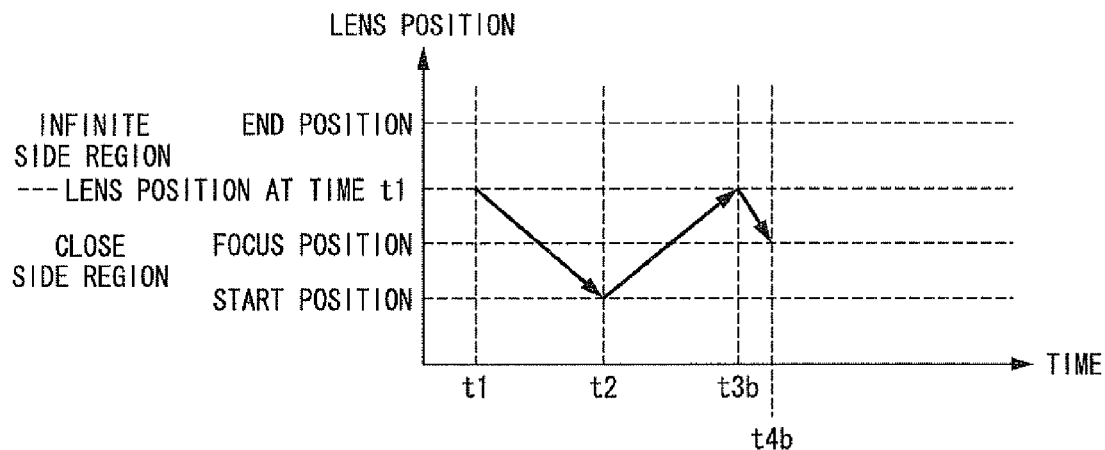
FIG. 22C shows a movement of a position of the AF lens 112 in contrast scanning (refer to the lower part of FIG. 21) based on determination of a front focus state and a back focus state depending on an evaluation value.

Next, the control unit 194 executes AF for photographing (step S18). FIGS. 22A, 22B and 22C show a move of a lens position in hill-climbing contrast scanning during AF for photographing. In addition, FIG. 22A shows an example of the relationship between a position of the AF lens 112 and a contrast value in the contrast scanning. Here, a region on the close side from the present position of the lens is referred to as a close side region. A region on the infinite side from the present position of the lens is referred to as an infinite side region.

In a case where the AF lens 112 is moved from a start position (for example, a position in the close side region) to an end position (for example, a position in the infinite side region) in the predefined lens movable range inside the lens barrel 111 under the control of the control unit 194, a lens position where the contrast value shows a peak value is set as a focus position. If the AF lens 112 is located at the focus position, the edge of the subject image is in a focalized state.

FIG. 22B shows a movement of a position of the AF lens 112 in the normal contrast scanning (refer to the middle part of FIG. 21). In the normal contrast scanning, the control unit 194 moves the AF lens 112 while performing contrast scanning for the entire region of the predefined lens movable lens inside the lens barrel 111.

The control unit 194 moves the AF lens 112 from a lens position at the time point t1 to the start position of the contrast scanning during the time t1 to t2 (initial position driving). In addition, the control unit 194 moves the AF lens 112 from the start position to the end position during the time t2 to t3 while performing the contrast scanning (scanning driving). In addition, the control unit 194 moves the AF lens 112 to the focus position where a contrast value shows a peak during the time t3a to t4a (focus position driving).

As such, in the normal contrast scanning, the control unit 194 performs contrast scanning for the entire region of the lens movable range. For this reason, it takes time to move the AF lens 112 to a focus position.

On the other hand, FIG. 22C shows a movement of a position of the AF lens 112 in the contrast scanning (refer to the lower part of FIG. 21) based on determination of a front focus state and a back focus state depending on an evaluation value. The control unit 194 moves the AF lens 112 while performing contrast scanning for a partial region of the predefined lens movable lens inside the lens barrel 111 based on determination of a front focus state and a back focus state.

In addition, the distribution detection unit 193 detects distributions of a focalized state and an unfocused state of the common edges. Here, it is assumed that the edge of the subject image which is a tracking target is in a front focus state, and the distribution detection unit 193 performs determination until the time point t1. The control unit 194 moves the AF lens 112 from a lens position at the time point t1 to the start position of the contrast scanning during the time t1 to t2 (initial position driving).

Since it is determined that the edge of the subject image is in a front focus state, the control unit 194 predicts that a focus position is in the close side region. In addition, the control unit 194 moves the AF lens 112 from the start position to the "lens position at the time point t1" during the time t2 to tab while performing the contrast scanning (scanning driving). In addition, the control unit 194 moves the AF lens 112 to the focus position where a contrast value shows a peak during the time t3a to t4b (focus position driving).

Here, the control unit 194 may finish the focus drive at a time point when the evaluation value Ed converges in a predefined range in the driving scanning. In addition, the control unit 194 may detects a front focus state based on the LSF as described above and finish the focus drive in the scanning driving.

Further, the control unit 194 passes a position where a contrast value shows a peak while performing contrast scanning in the scanning driving, and thereby calculates a focus position through interpolation. In a case where a focus position is calculated through the interpolation, there is high possibility that a position may be more accurately detected than in a case where it is not calculated through the interpolation. Further, the control unit 194 moves the AF lens 112 to the focus position calculated through the interpolation (focus position driving).

Returning to FIG. 19, the description of the focus drive is continued. The CPU 190 controls the imaging unit 110 so as to exposure the edge which is in a focalized state through AF for photographing. In addition, the CPU 190 stores (records) the image captured by the imaging unit 110 in the storage medium 200 via the communication unit 170 (step S19).

As described above, the focus adjusting device 191 includes the edge detection unit 192 which detects an edge of a subject image for each color component forming an image including the subject image which is incident from the lens barrel 111 having the AF lens 112 for performing focus adjustment. In addition, the focus adjusting device 191 further includes the distribution detection unit 193 which detects distributions of a focalized state and an unfocused state in an image based on the edge for each color component detected by the edge detection unit 192. Further, the focus adjusting device 191 further includes the control unit 194 which moves the AF lens 112 so as to focus on the subject image based on the distributions (depth map) detected by the distribution detection unit 193.

Thereby, the control unit 194 moves the AF lens 112 only in the close side region in the contrast scanning based on the determination that the common edges are in a front focus state. As a result, the focus drive finishes in a short time as compared with a case of performing the normal contrast scanning. Similarly, the control unit 194 moves the AF lens 112 only in the infinite side region in the contrast scanning based on the determination that the common edges are in a back focus state. As a result, the focus drive finishes in a short time as compared with a case of performing the normal contrast scanning.

Therefore, the focus adjusting device 191 enables a subject image which has never been focused to be rapidly focused.

In addition, the distribution detection unit 193 detects distributions of a focalized state and an unfocused state based on a gradient of a color component amount of the edge which is detected for each color component by the edge detection unit 192. Thereby, the focus adjusting device 191 enables the subject image to be rapidly focused based on the gradient of the color component amount of the edge.

In addition, the distribution detection unit 193 detects a direction index indicating focalization on a close point side from a subject or a distant point side from the subject based on a ratio of or a difference between color component amounts of the edges which are edges for each color component detected by the edge detection unit 192. In addition, the distribution detection unit 193 also detects a defocus amount. Thereby, the focus adjusting device 191 enables the subject image to be rapidly focused without increasing the calculation load based on the ratio of or the difference between the color component amounts of the edges.

Further, the distribution detection unit 193 detects a defocus amount based on a distance between peaks of the ratio of the difference between the color component amounts of the edges which are detected for color component by the edge detection unit 192. Thereby, the focus adjusting device 191 enables the subject image to be rapidly focused without increasing the calculation load based on the distance between peaks of the ratio of or the difference between the color component amounts of the edges.

(As to Case of Executing Focus Drive Based on Evaluation Value LSF)

Figure 23:
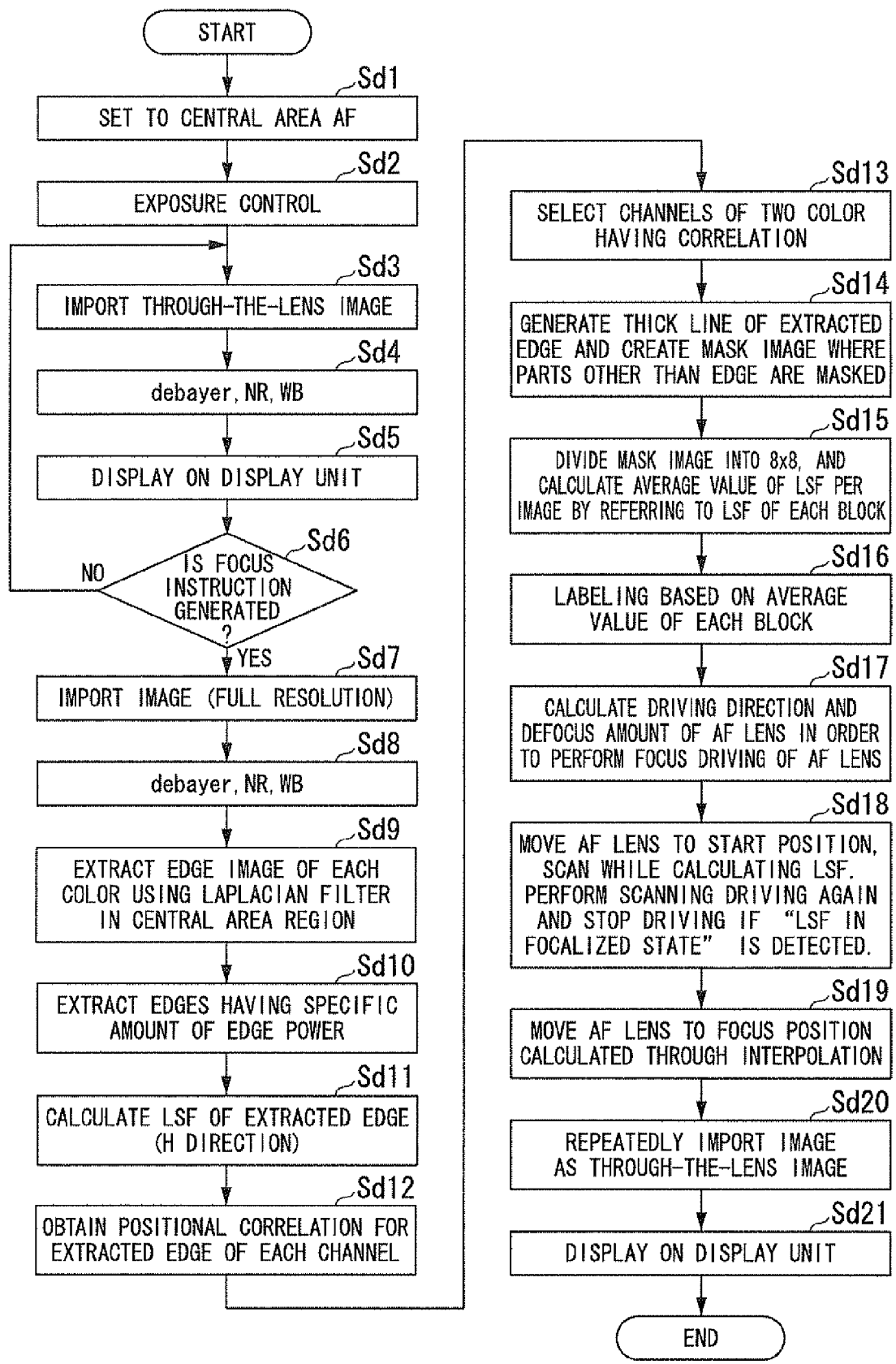
FIG. 23 is a flowchart illustrating a procedure of the focus drive based on the LSF.

FIG. 23 is a flowchart illustrating a procedure of the focus drive based on the LSF. The CPU 190 of the imaging apparatus 100 sets a region (central area region) at the center of the through-the-lens image as a region where an edge is focused (AF) (step Sd1). This setting may be executed based on an operation input of a user received by the operating unit 180.

The CPU 190 controls the imaging unit 110 so as to perform exposure control (step Sd2). In addition, the image processing unit 140 acquires a through-the-lens image (step Sd3). Further, the CPU 190 controls the imaging unit 110 so as to execute a debayer (color interpolation) process.

In addition, the image processing unit 140 executes image processes for the acquired through-the-lens image. For example, the image processing unit 140 executes a white balance (WB) adjustment process, a noise reduction (NR) process, a magnification chromatic aberration correction process, and the like, as the image processes, for the acquired through-the-lens image (step Sd4). Here, the through-the-lens image acquired by the image processing unit 140 may be an image of which a resolution is reduced by decimating an electric signal output by the imaging element 119. In this way, an amount of the image processes executed by the image processing unit 140 can be reduced. In addition, the image processing unit 140 displays the through-the-lens image having undergone the image processes on the display unit 150 (step Sd5).

The CPU 190 determines whether or not a focus instruction is input to the CPU 190 (step Sd6). If the focus instruction is not input (step Sd6—NO), the process of the CPU 190 returns to step Sd3. If the focus instruction is input (step Sd6—YES), the process of the CPU 190 proceeds to step Sd7.

The image processing unit 140 acquires the through-the-lens image at the full resolution (step Sd7). In addition, the CPU 190 controls the imaging unit 110 so as to execute a debayer (color interpolation) process. In addition, the image processing unit 140 executes image processes for the acquired through-the-lens image. For example, the image processing unit 140 executes a white balance adjustment process and a noise reduction process for the acquired through-the-lens image (step Sd8).

The edge detection unit 192 extracts an edge image for each color channel through a Laplacian filter in the central area region (step Sb9). In addition, the edge detection unit 192 extracts effective edges of which a color component amount (edge power) is equal to or more than a specific amount (step Sb10). Further, the edge detection unit 192 calculates an LSF of the extracted edges with respect to the horizontal direction of the image (step Sd11).

The edge detection unit 192 detects a positional correlation for the edges of each color channel (step Sb12). The edge detection unit 192 selects edges of channels of two or more colors having the positional correlation so as to extract an edge image (step Sb13). Here, a case where an edge of the R channel and an edge of the G channel will be described as an example. The edge detection unit 192 performs thick line generation for the edge of the extracted edge image and creates a mask image (refer to FIG. 15D) where parts other than the edge are masked (step Sd14).

The distribution detection unit 193 divides the mask image into blocks of "8×8". In addition, the distribution detection unit 193 calculates an average value of the LSF around one pixel by referring to the LSF of each block (step Sd15). In addition, the distribution detection unit 193 may execute labeling of the subject image based on the calculated average value. If there is a plurality of labels in the central area region, the distribution detection unit 193 determines that a plurality of subject distances is in the central area region (step Sd16).

The control unit 194 calculates a driving direction and a defocus amount (a start position of contrast scanning) of the AF lens 112 based on the edge of the R channel and the edge of the G channel (step Sd17). The control unit 194 moves the AF lens 112 to the start position (for example, if in a front focus state, a position in the close side region). In addition, the control unit 194 executes the contrast scanning while calculating an LSF. The control unit 194 temporarily passes a position (refer to FIG. 13) where the LSF indicates a focalized state while performing the contrast scanning, and then stops the scanning driving (step Sd18).

In addition, the control unit 194 calculates a focus position through interpolation, and moves the AF lens 112 to the calculated focus position (step Sd19). In addition, the image processing unit 140 repeatedly acquires a through-the-lens image (step Sd20). Further, the image processing unit 140 displays the through-the-lens image on the display unit 150 (step Sd21). The control unit 194 may set a region wider than the central area region as a region (AF region) where an edge is focused.

As described above, the distribution detection unit 193 detects a direction index indicating focalization on a close point side from a subject or a distant point side from the subject based on a line spread function (LSF) corresponding to the edges which are edges detected for each color component by the edge detection unit 192. In addition, the distribution detection unit 193 also detects a defocus amount. Thereby, the focus adjusting device 191 enables the subject image to be rapidly focused even in a case where the subject image is monochrome, a case where the area of the subject image is small, or a spatial frequency of the subject image is low (content resistance).

In addition, the distribution detection unit 193 detects a defocus amount based on a standard deviation or a full width at half maximum of a line spread function (LSF) corresponding to the edges which are detected for each color component by the edge detection unit 192. Thereby, the focus adjusting device 191 enables the subject image to be rapidly focused based on the standard deviation or the full width at half maximum of the edges.

The focus adjusting device 191 includes the edge detection unit 192 which detects an edge of a subject image for each color component forming an image including the subject image which is incident from the lens barrel 111 having the AF lens 112 for performing focus adjustment. In addition, the focus adjusting device 191 further includes the distribution detection unit 193 which calculates a line spread function (LSF) of the edge detected for each color component by the edge detection unit 192. Further, the focus adjusting device 191 further includes the control unit 194 which moves the AF lens 112 so as to focus on the subject image based on the line spread function.

Thereby, the focus adjusting device 191 enables a subject image to be rapidly focused even in a case where the subject image is monochrome, a case where the area of the subject image is small, or a spatial frequency of the subject image is low.

Second Embodiment

The second embodiment of the present invention will be described with reference to the drawings. The second embodiment is different from the first embodiment in that the distribution detection unit 193 predicts a focus position (defocus amount) based on a "defocus-driving pulse table" described later. Hereinafter, only differences between the second embodiment and the first embodiment will be described.

FIG. 24 shows an example of the "defocus-driving pulse table". As items (references) of the defocus-driving pulse table, there are a lens position, an evaluation value, the number of steps of driving pulses in a front focus state (hereinafter, referred to as "the number of steps in a front focus state"), and the number of steps of driving pulses in a back focus state (hereinafter, referred to as "the number of steps in a back focus state"). Here, the evaluation value may be any defocus amount based on the Ed, the Wd, and the LSF.

In addition, the number of steps of driving pulses is driving pulses which are output to the lens driving unit 116 by the barrel control unit 118 in response to a driving control signal. The number of steps of driving pulses is set in advance based on a structure of the barrel control unit 118. In addition, the number of steps in a front focus state indicates the number of steps necessary to be moved from a present lens position in a front focus state to a focus position in a focalized state. Similarly, the number of steps in a back focus state indicates the number of steps necessary to be moved from a present lens position in a back focus state to a focus position in a focalized state. Further, the defocus-driving pulse table may be stored in the storage unit 160.

The distribution detection unit 193 periodically an evaluation value (defocus amount). In addition, the distribution detection unit 193 registers the detected evaluation value and a lens position when detected in the item of the "evaluation value" of the defocus-driving pulse table. In addition, the distribution detection unit 193 registers the "number of steps in a front focus state" and the "number of steps in a back focus state" in the defocus-driving pulse table. The "number of steps in a front focus state" and the "number of steps in a back focus state" are set in advance based on a structure of the barrel control unit 118. The distribution detection unit 193 repeatedly performs the registration operation and thereby creates history.

Next, a description will be made of a procedure where the control unit 194 restricts a movement direction of the AF lens 112 and a contrast scanning region based on the defocus-driving pulse table.

Figure 25:
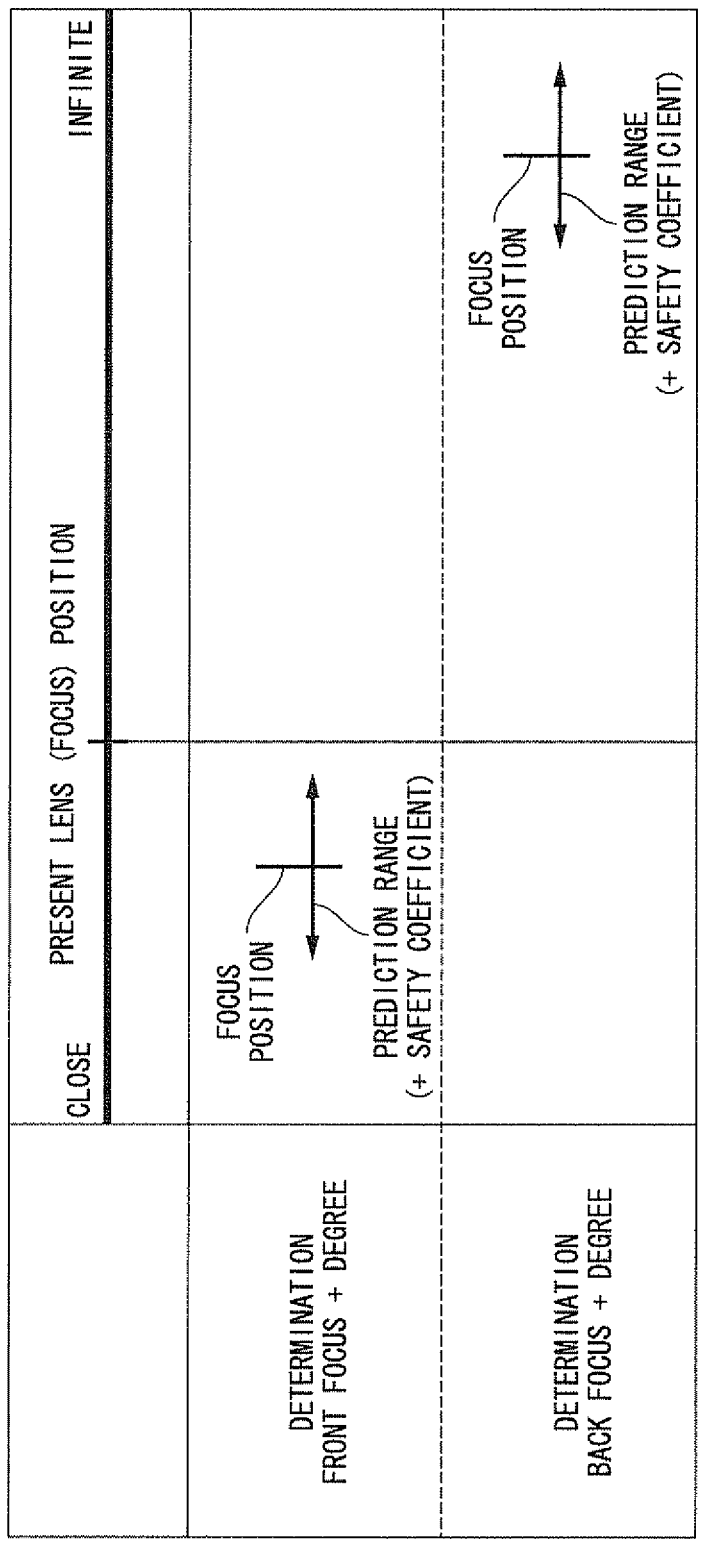
FIG. 25 is a diagram illustrating a contrast scanning region when front focus and a degree thereof are determined and a contrast scanning region when back focus and a degree thereof are determined.

FIG. 25 shows a contrast scanning region when front focus and a degree thereof are determined. In addition, FIG. 25 also shows a contrast scanning region when back focus and a degree thereof are determined. In a case where it is determined that an edge of a subject image set as a tracking target is in a front focus state, the control unit 194 sets a prediction range of a focus position in the close side region based on the defocus-driving pulse table (refer to FIG. 24).

For example, it is assumed that the lens position (focus position) output from the barrel control unit 118 is a value "1", the evaluation value (defocus amount) detected by the distribution detection unit 193 is a value "1", and the direction index detected by the distribution detection unit 193 indicates a front focus state.

In this case, the control unit 194 refers to whether or not the number of steps in front focus corresponding to the lens position "1" and the evaluation value "1" is registered in the defocus-driving pulse table (refer to FIG. 24). In the example shown in FIG. 24, "the number of steps in front focus" corresponding to the lens position "1" and the evaluation value "1" is registered. Therefore, the control unit 194 acquires the number "23" of steps in front focus from the defocus-driving pulse table.

Thereby, the control unit 194 predicts that there is a focus position at a position where the AF lens 112 is moved in a close direction from the present lens position by a movement amount corresponding to the number "23" of steps of driving pulses. In addition, the control unit 194 sets a prediction range of a predetermined length with respect to the predicted position. Further, the control unit 194 performs contrast scanning in the restricted prediction range. In addition, a safety coefficient is added to the length of the prediction range which may be further lengthened.

Similarly, in a case as well where it is determined that the edge of the subject image set as a tracking target is in a "back focus state", the control unit 194 sets a prediction range of a focus position with respect to the focus position which is in the infinite side region based on the defocus-driving pulse table (refer to FIG. 24). Further, the control unit 194 performs contrast scanning in the restricted prediction range.

Figure 26:
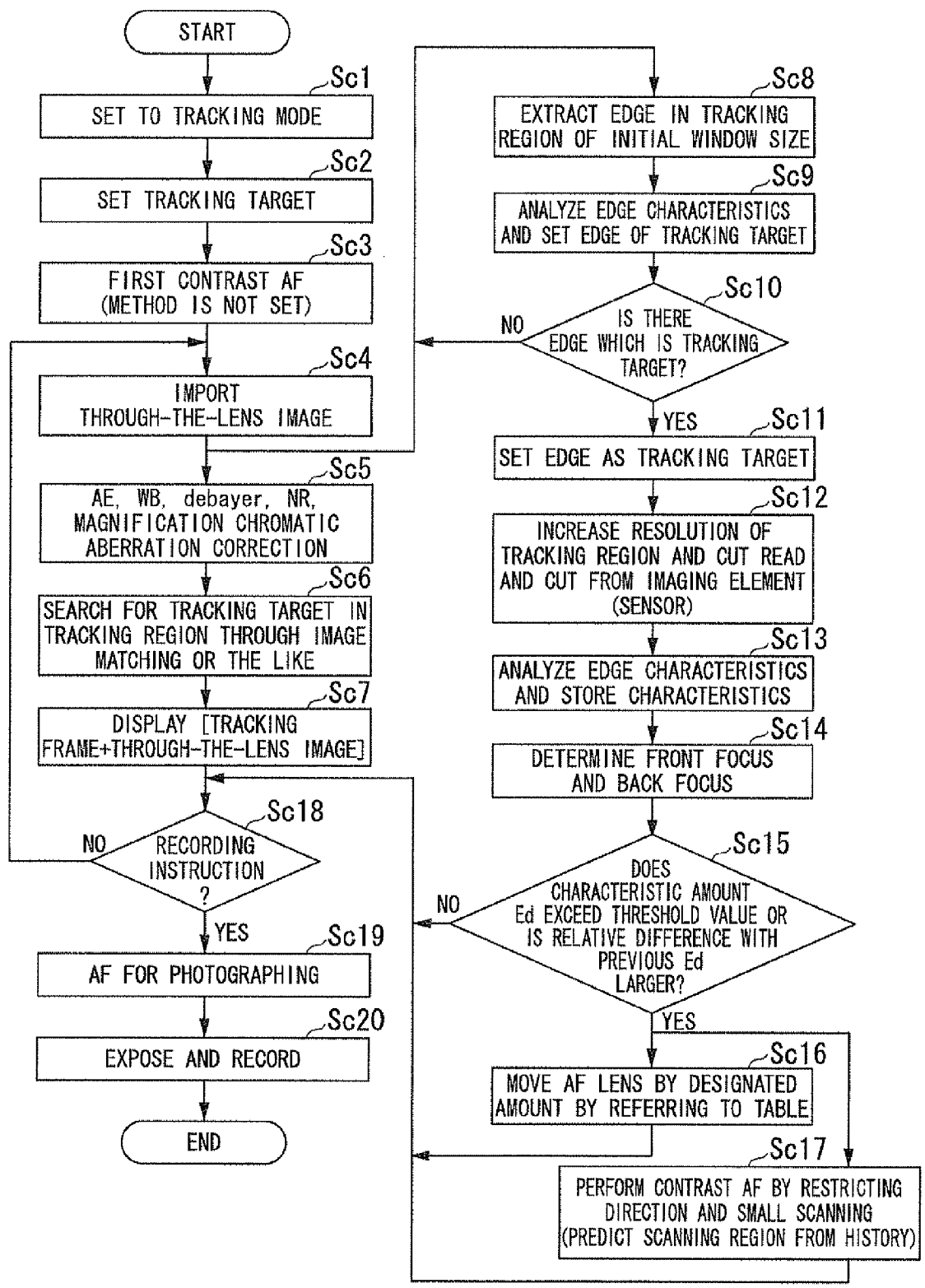
FIG. 26 is a flowchart illustrating a procedure of the focus drive of the focus adjusting device 191 in a tracking operation of tracking a subject.

FIG. 26 is a flowchart illustrating a procedure of the focus drive of the focus adjusting device 191 in a tracking operation of tracking a subject. Steps Sc1 to Sc15 of FIG. 26 are the same as steps S1 to S15 of FIG. 19. Steps Sc18 to Sc20 of FIG. 26 are the same as steps S17 to S19 of FIG. 19. In addition, steps Sc16 and Sc17 of FIG. 26 indicate parallel processes.

If the evaluation value Ed exceeds the predefined first threshold value, or the difference between the previous Ed and the present Ed exceeds the predefined second threshold value (step Sc15—YES), the control unit 194 restricts a movement direction of the AF lens 112. In addition, the control unit 194 further sets a prediction range of a focus position by using FIG. 24 and referring to the defocus-driving pulse table (step Sc16).

The control unit 194 restricts a movement direction of the AF lens 112, further restricts it to the prediction range of a focus position, and performs contrast scanning (small scanning). In addition, the control unit 194 moves the AF lens 112 to the focus position so as to focus on the edge of the subject image (step Sc17). Further, the process of the control unit 194 proceeds to step Sc18. The subsequent steps are the same as in the first embodiment.

As such, a range where the contrast scanning is performed is restricted to a prediction range of a focus position. As a result, the focus adjusting device 191 enables a subject image to be more rapidly focused than in the normal contrast scanning.

Figure 27:
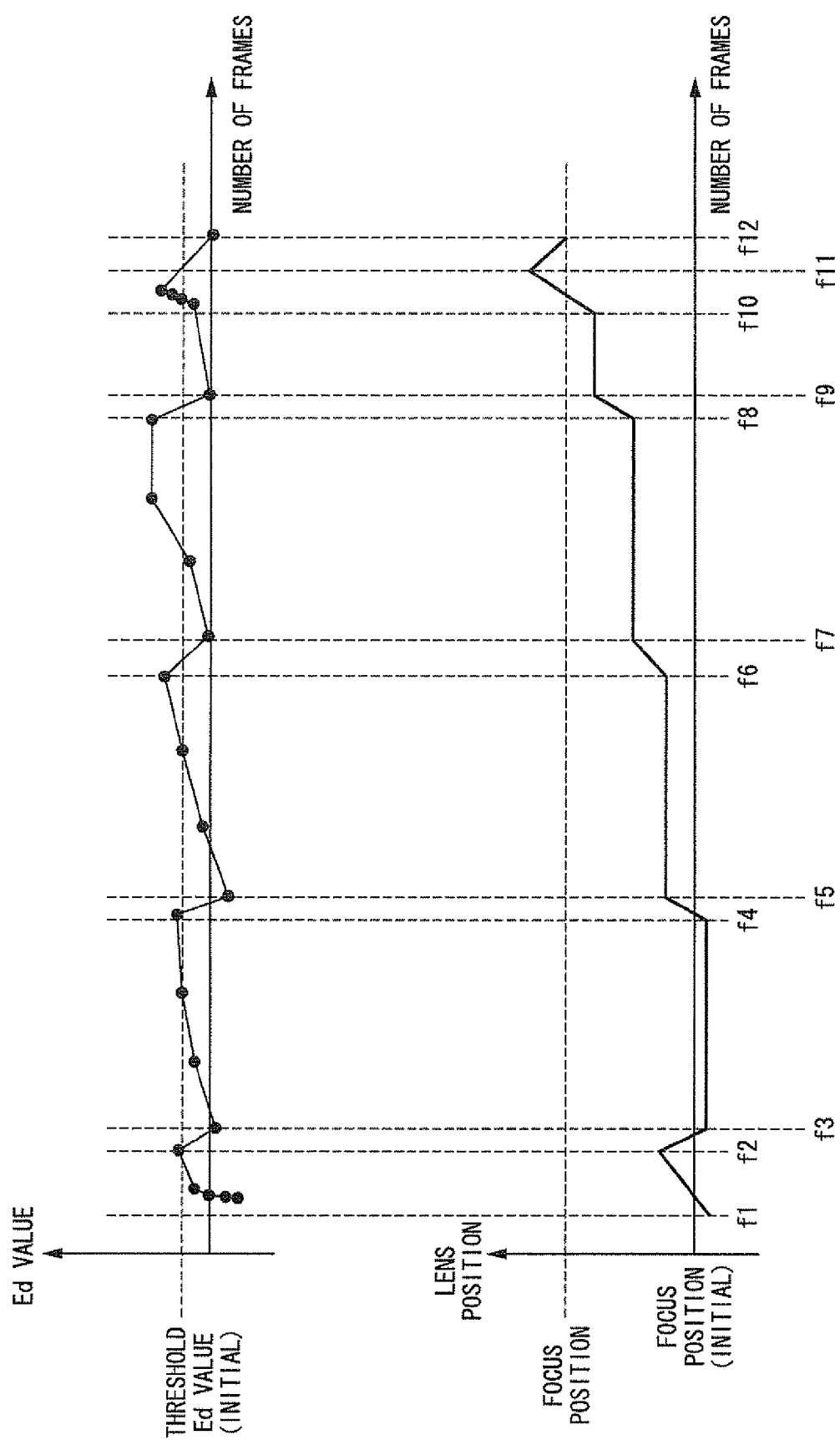
FIG. 27 is a diagram illustrating an example of the focus drive in the contrast scanning based on the "defocus-driving pulse table".

FIG. 27 shows an example of the focus drive in the contrast scanning based on the "defocus-driving pulse table". Hereinafter, a case where the control unit 194 executes the focus drive based on the evaluation value Ed will be described as an example. Each transverse axis of FIG. 27 indicates the number of frames of a through-the-lens image captured by the imaging unit 110. The longitudinal axis of the upper part of FIG. 27 indicates an Ed of a common edge. Here, an Ed at the number f1 of frames is referred to as an "Ed value (initial)". In addition, the longitudinal axis of the lower part of FIG. 27 indicates a lens position.

In a case where a specific time has elapsed from the contrast scanning, or a photographing instruction is output to the CPU 190 from the operating unit 180, the control unit 194 performs contrast scanning so as to focus on the edge of the subject image. In addition, the distribution detection unit 193 calculates an Ed at a specific period. Further, the distribution detection unit 193 increases the rate of calculating the Ed if it is determined that a motion per unit time of the subject image is fast based on a motion vector of the subject image included in the through-the-lens image. In addition, the distribution detection unit 193 may increase the rate of calculating the Ed if it is determined that a relative difference between the evaluation value Ed calculated previously and the evaluation value Ed calculated this time is large.

First, it is assumed that the control unit 194 performs contrast scanning at the number f1 to f2 of frames and enables the AF lens 112 to perform scanning driving. Here, the distribution detection unit 193 increases a rate of calculating the Ed if it is determined that a motion per unit time of the subject image is fast during the scanning driving.

In addition, the control unit 194 drives the AF lens 112 to the focus position at the number f2 to f3 of frames so as to focus on the common edge of the subject image. Thereby, the common edge of the subject image is in a focalized state at the number f3 to f4 of frames. Here, in a case where the subject distance varies, the focus position at the number f3 to f4 of frames may be different from the focus position (initial).

Next, it is assumed that the Ed exceeds a predefined threshold value at the number f4 of frames due to the variation in the subject distance. Thereby, the control unit 194 restricts a movement direction and a movement amount of the AF lens 112 based on the defocus-driving pulse table.

For example, it is assumed that the lens position (focus position) output from the barrel control unit 118 is a value "1", the evaluation value (defocus amount) detected by the distribution detection unit 193 is a value "1", and the direction index detected by the distribution detection unit 193 indicates a front focus state.

In this case, the control unit 194 refers to whether or not "the number of steps in front focus" corresponding to the lens position "1" and the evaluation value "1" is registered in the defocus-driving pulse table (refer to FIG. 24). In addition, in the example shown in FIG. 24, "the number of steps in front focus" corresponding to the lens position "1" and the evaluation value "1" is registered, and, therefore, the control unit 194 acquires the number "23" of steps in front focus from the defocus-driving pulse table.

Thereby, the control unit 194 predicts that there is a focus position at a position where the AF lens 112 is moved in a close direction from the present lens position by a movement amount corresponding to the number "23" of steps of driving pulses. In addition, the control unit 194 outputs a photoelectric conversion surface to the barrel control unit 118. Further, the control unit 194 drives the AF lens 112 in the close direction by a movement amount corresponding to the number "23" of steps of driving pulses. Thereby, it is assumed that the control unit 194 enables the edge to be focused at the number f5 of frames.

In addition, it is assumed that the control unit 194 repeatedly performs the same operation as at the number f3 to f5 of frames at "the number f5 to f7 of frames" and "the number of f1 to f9 of frames". Further, it is assumed that a user operates the oscillating weight 160 and thereby a focus instruction or a photographing instruction is input to the CPU 190 at the number f10 of frames.

Figure 28:
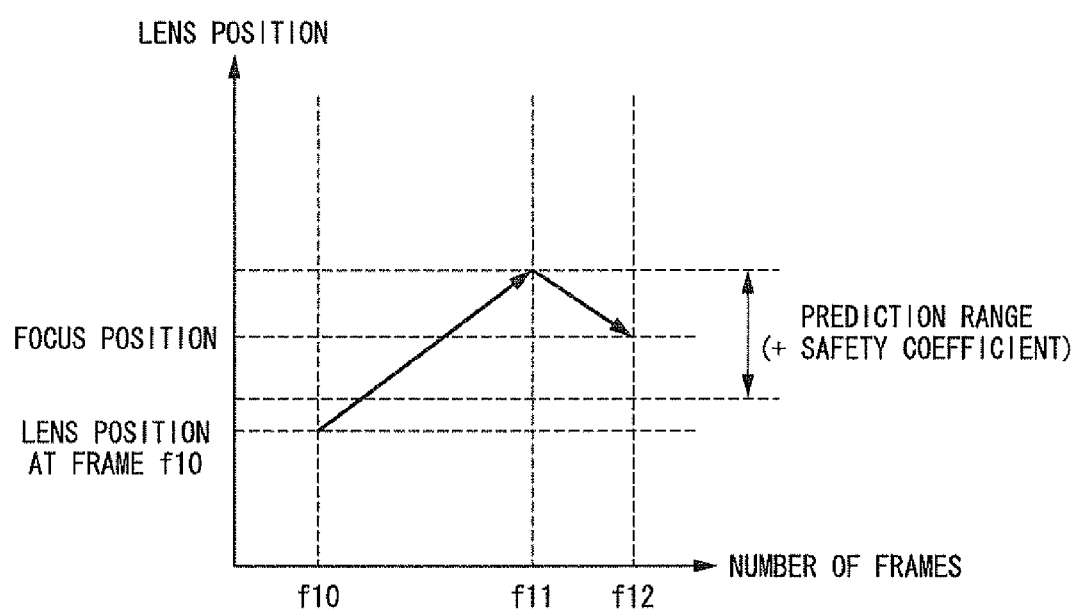
FIG. 28 is an enlarged view of an example of the focus drive in the contrast scanning based on the "defocus-driving pulse table".

FIG. 28 is an enlarged view of the number f10 to first substrate 12 of frame part in the example of the focus drive shown in FIG. 27. Here, the longitudinal axis indicates a lens position. In addition, the transverse axis indicates the number of frames. The control unit 194 sets a prediction range of a focus position with respect to the focus position based on the defocus-driving pulse table (refer to FIG. 24) at the number f10 of frames. In addition, the control unit 194 performs contrast scanning for the prediction range. Further, the control unit 194 temporarily passes the focus position where a contrast value shows a peak, and calculates the evaluation value Ed through interpolation at the number f11 of frames.

In addition, at the number f11 to f12, the control unit 194 returns the AF lens 112 to the focus position calculated through the interpolation (focus position driving).

As described above, the focus adjusting device 191 includes the edge detection unit 192 which detects an edge of a subject image for each color component forming an image including the subject image which is incident from the lens barrel 111 having the AF lens 112 for performing focus adjustment. In addition, the focus adjusting device 191 further includes the distribution detection unit 193 which detects distributions of a localized state and an unfocused state in an image based on the edge detected for each color component by the edge detection unit 192. Further, the focus adjusting device 191 further includes the control unit 194 which creates the "defocus-driving pulse table" including history of the distributions detected by the distribution detection unit 193 and moves the AF lens 112 so as to focus on the subject image based on the history.

Thereby, the focus adjusting device 191 enables a subject image which has never been focused to be more rapidly focused than in a case where the defocus-driving pulse table is not referred to.

Third Embodiment

The third embodiment of the present invention will be described in detail with reference to the drawings. The third embodiment is different from the first and second embodiments in that the distribution detection unit 193 calculates a defocus amount by using difference data (auto-correlation) of pixel values due to pixel shift as an evaluation value. Hereinafter, only differences from the first and second embodiments will be described.

Figure 29:
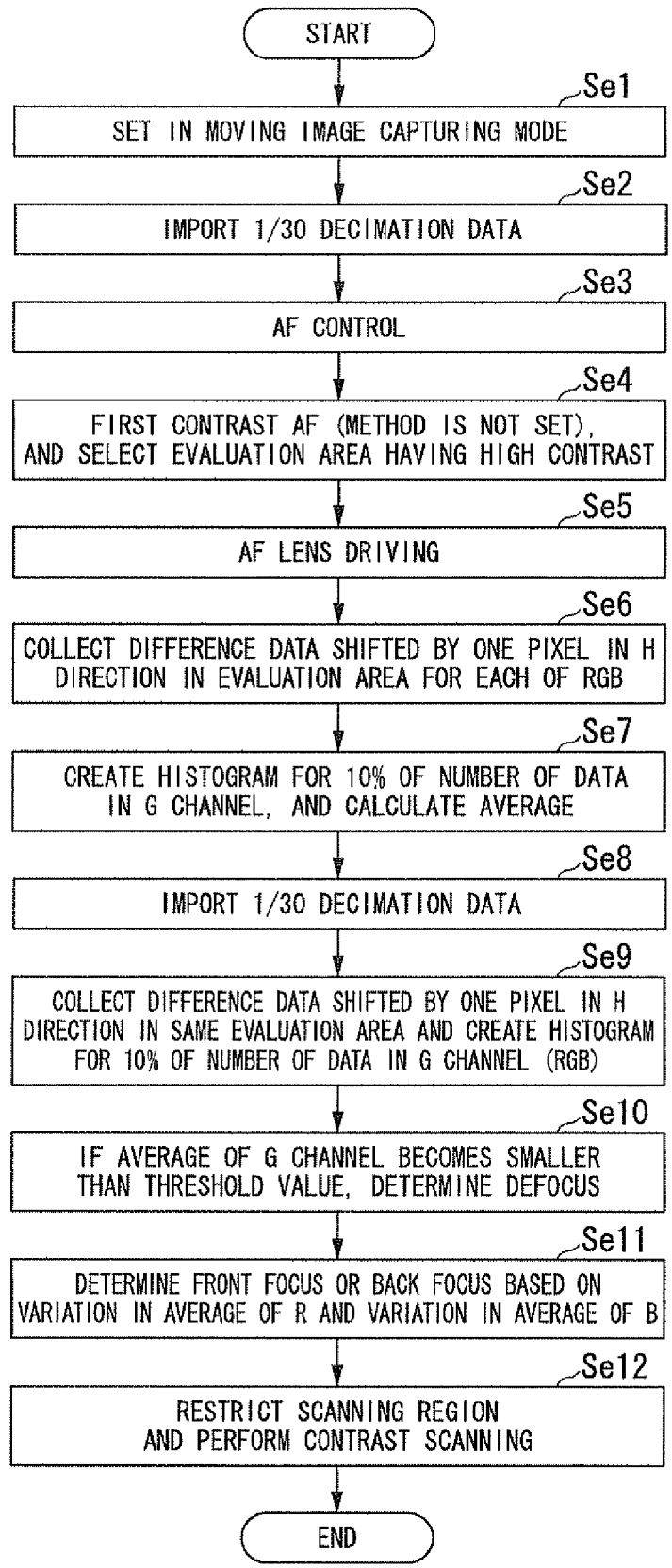
FIG. 29 is a flowchart illustrating an operation of the focus adjusting device 191 having a moving image capturing mode.

FIG. 29 is a flowchart illustrating an operation of the focus adjusting device 191 having a moving image capturing mode. The CPU 190 sets the imaging apparatus 100 in a moving image capturing mode (step Se1). Here, the CPU 190 may set the imaging apparatus 100 in a moving image capturing mode based on an operation input of a user received by the operating unit 180. Thereby, the CPU 190 controls the image processing unit 140 so as to perform an image process for an image captured by the imaging unit 110 as a moving image.

The image processing unit 140 acquires $1/30$ decimation data (step Se2). Here, the $1/30$ decimation data is a through-the-lens image which is output from the imaging element 119 every $1/30$ seconds, and is a through-the-lens image of which a resolution is reduced by decimating a portion thereof. In addition, the CPU 190 controls the imaging unit 110 so as to execute an automatic exposure (AE) process (step Se3).

The control unit 194 of the focus adjusting device 191 executes a first focus drive. A focusing method in the focus drive may be appropriately selected. For example, the focusing method may be a contrast AF method, or may be other focusing methods (phase difference detection method and the like). In addition, the edge detection unit 192 selects a region of which a contrast of a color component amount is high from the through-the-lens image as an evaluation area for evaluating an evaluation value (step Se4).

The control unit 194 performs contrast scanning so as to enable the AF lens 112 perform scanning driving (step Se5). In addition, the edge detection unit 192 shifts the through-the-lens image in the horizontal direction by one pixel in the evaluation area. Further, the edge detection unit 192 calculates (collects) difference data of pixel values (for example, color component amounts) between the through-the-lens image shifted by one pixel in the horizontal direction and the original through-the-lens image for each color channel (step Se6).

The distribution detection unit 193 creates a histogram of the difference data for 10% of the number of the difference data of the G channel and calculates an average value of the difference data (step Se7). Further, the distribution detection unit 193 may create a histogram of the difference data for all the number of the difference data of the G channel.

Figure 30A:
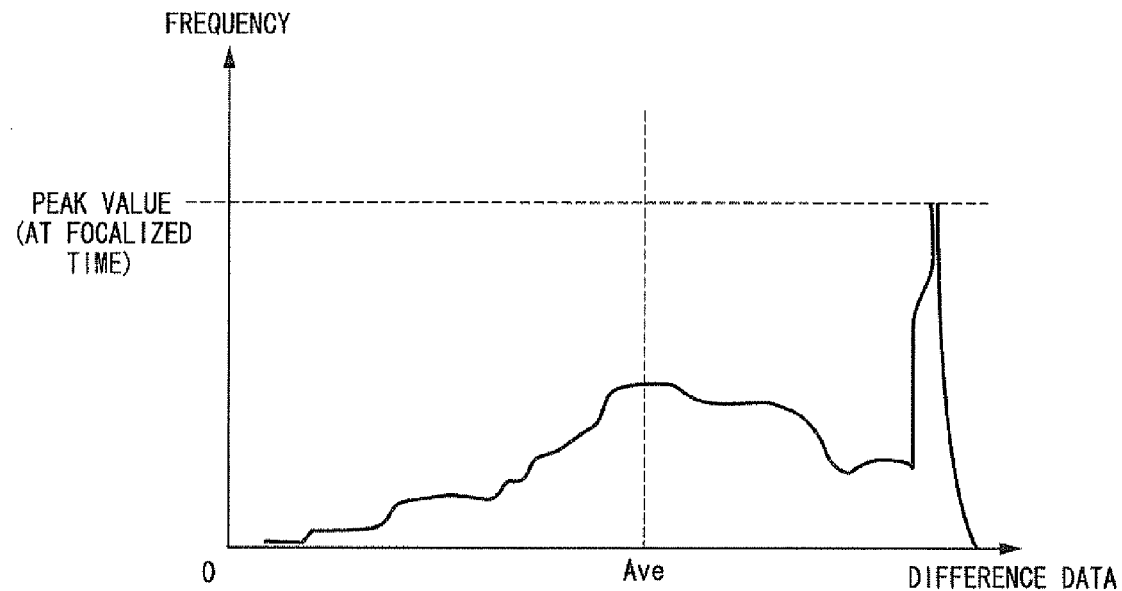
FIG. 30A is a diagram illustrating a histogram of difference data in a focalized state.
Figure 30B:
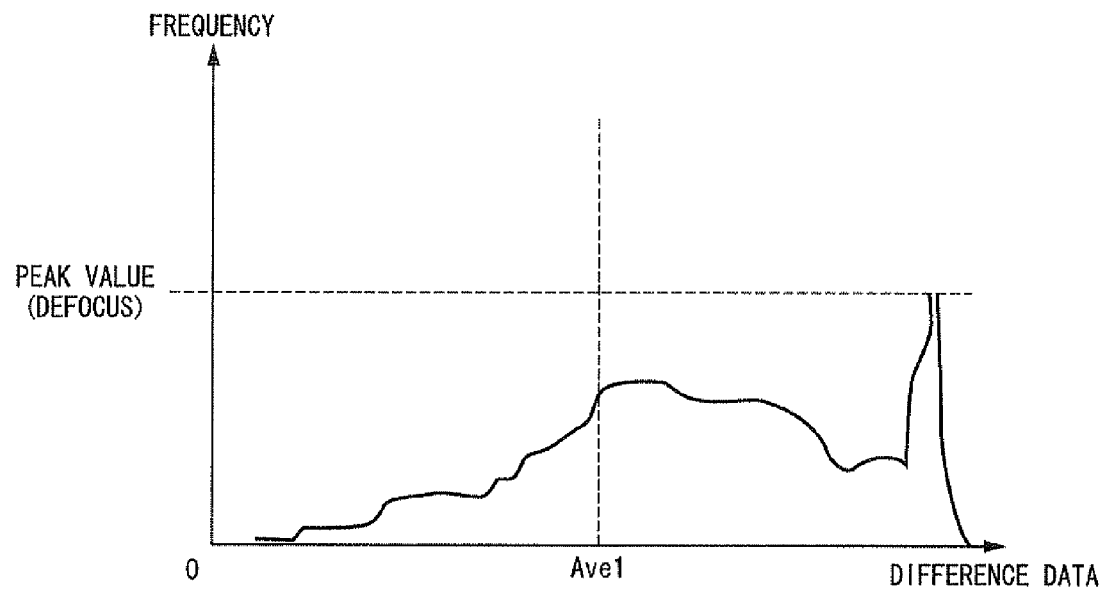
FIG. 30B is a diagram illustrating a histogram of difference data in an unfocused state.

FIG. 30A shows a histogram of difference data in a focalized state. FIG. 30B shows a histogram of difference data in an unfocused state. The transverse axis of FIGS. 30A and 30B indicates difference data. In addition, the longitudinal axis indicates a frequency of the difference data.

Since a defocus amount is large in an unfocused state, a difference (adjacent difference) between pixel values of adjacent pixels is smaller than an adjacent difference in a focalized state. For this reason, the histogram is shifted to a side where the difference data is small. Therefore, an average value "Ave" of the difference data in a focalized state shown in FIG. 13A and an average value "Ave1" in an unfocused state shown in FIG. 13B have a magnitude correlation of "Ave>Ave1". For this reason, in a case where the average value becomes smaller than a predefined threshold value, the distribution detection unit 193 determines that the through-the-lens image is in an unfocused state.

Returning to FIG. 29, the description of the operation of the focus adjusting device 191 is continued. The image processing unit 140 acquires new 1/30 decimation data (step Se8). In addition, the edge detection unit 192 shifts the through-the-lens image in the horizontal direction by one pixel in the evaluation area. Further, the edge detection unit 192 calculates (collects) difference data of pixel values (for example, color component amounts) between the through-the-lens image shifted by one pixel in the horizontal direction and the original through-the-lens image for each color channel (step Se6). The distribution detection unit 193 creates a histogram of the difference data for 10% of the number of the difference data and calculates an average value of the difference data (step Se9). Further, the distribution detection unit 193 may create a histogram of the difference data for all the number of the difference data.

In a case where the average value of the difference data of the G channel becomes smaller than a predefined threshold value, the distribution detection unit 193 determines that the through-the-lens image is in an unfocused (defocus) state (step Se10). In addition, the distribution detection unit 193 determines whether the edge of the subject image is in a front focus state or in a back focus state based on variations in the average value of the difference data of the R channel and the average value of the difference data of the B channel (step Se11).

For example, if a variation in the average value of the difference data of the R channel is larger than a variation in the average value of the difference data of the B channel, the distribution detection unit 193 may determine that the edge of the subject image is in a front focus state.

In addition, the control unit 194 restricts scanning region and performs contrast scanning (step Se12).

As described above, the focus adjusting device 191 shifts the image by one pixel in the horizontal direction, calculates difference data with the original image, and thereby restricts scanning region and performs contrast scanning. Thereby, the control unit 194 finishes the focus drive in a short time with a light process load as compared with a case of performing normal contrast scanning. Therefore, the focus adjusting device 191 enables a subject image which has never been focused to be rapidly focused.

As above, although the embodiments of the present invention have been described in detail with reference to the drawings, a detailed configuration is not limited to the embodiments. Appropriate modifications are possible within the scope without departing from the spirit of the present invention.

For example, in a case of performing contrast scanning for a subject image having spot light (dot light source), there are a plurality of peaks of a contrast value. For this reason, there are many cases where a focus position cannot be restricted. Therefore, the focus adjusting device 191 may improve a performance of contrast AF of the spot light subject based on the above-described evaluation values.

Figure 31:
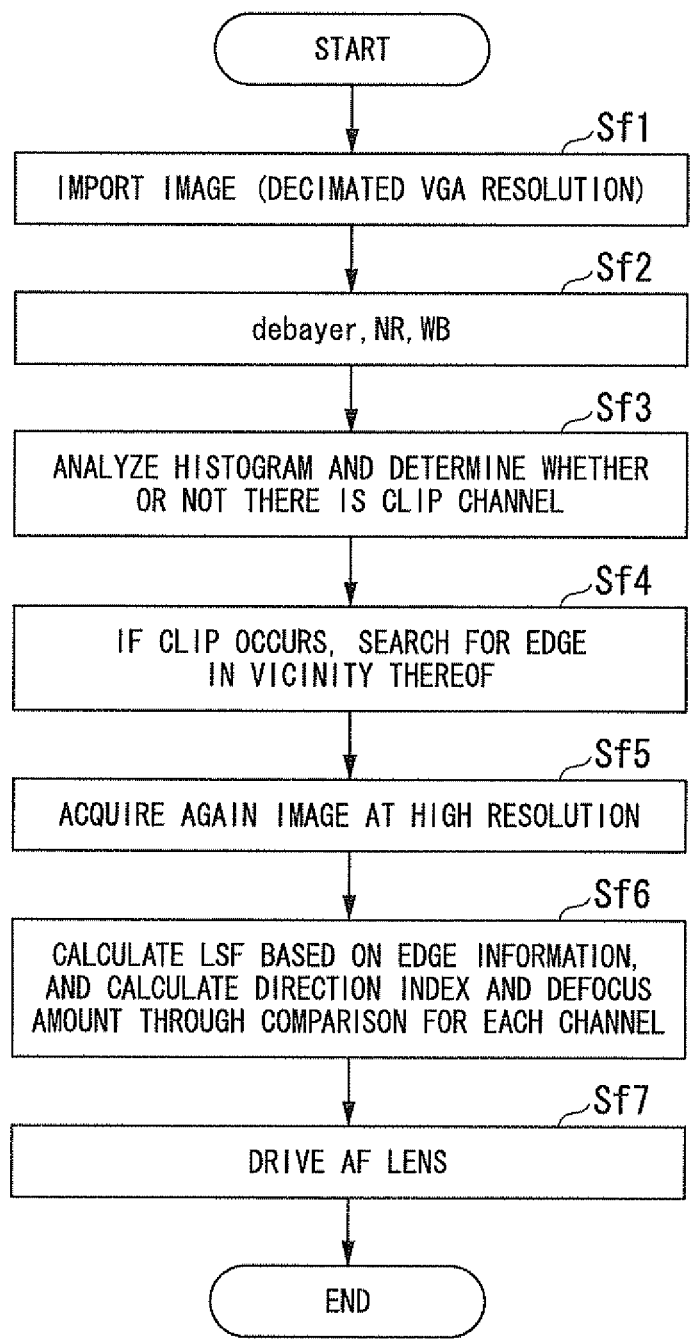
FIG. 31 is a flowchart illustrating an operation of the focus adjusting device 191 of determining spot light.

FIG. 31 is a flowchart illustrating an operation of the focus adjusting device 191 of determining spot light. The image processing unit 140 acquires a through-the-lens image (decimated VGA resolution) from the imaging unit 110 (step Sf1). Here, the period where the image processing unit 140 acquires a through-the-lens image may be a period (interval rate) shorter than a normal period. In addition, the CPU 190 controls the imaging unit 110 so as to execute a debayer (color interpolation) process. Further, the image processing unit 140 executes image processes for the acquired through-the-lens image. For example, the image processing unit 140 executes a white balance adjustment process and a noise reduction process for the acquired through-the-lens image (step Sf2).

The distribution detection unit 193 creates a histogram of a color component amount and determines whether or not a clip channel exists in the histogram (step Sf3). Here, the clip channel is a channel where a color component amount is saturated. In addition, the distribution detection unit 193 may create a histogram of a luminance value.

If there is the clip channel, the distribution detection unit 193 determines that there is spot light in the vicinity of a pixel where the clip (saturation) occurs and searches for an effective edge in the vicinity thereof (step Sf4). In addition, in order to search for the effective edge using a high resolution image (non-decimated image), the image processing unit 140 acquires the high resolution image from the imaging unit 110 (multi-scale window). The distribution detection unit 193 searches for the effective edge in the vicinity of the pixel where the clip (saturation) occurs in the high resolution image (step Sf5).

The distribution detection unit 193 calculates an LSF based on information of the edge and compares the LSF for each color channel as described above. In addition, the distribution detection unit 193 calculates a direction index and a defocus amount as described above (step Sf6). Further, the control unit 194 drives the AF lens 112 based on the direction index and the defocus amount (step Sf7).

As such, the focus adjusting device 191 searches for an effective edge in the vicinity of a pixel where clip (saturation) occurs. As a result, it is possible to improve a performance of contrast AF of a spot light subject. In addition, the imaging apparatus 100 may change imaging conditions (for example, a diaphragm value, an exposure value, and the like) based on a result of the focus adjusting device 191 detecting spot light (scene detection).

Figure 32:
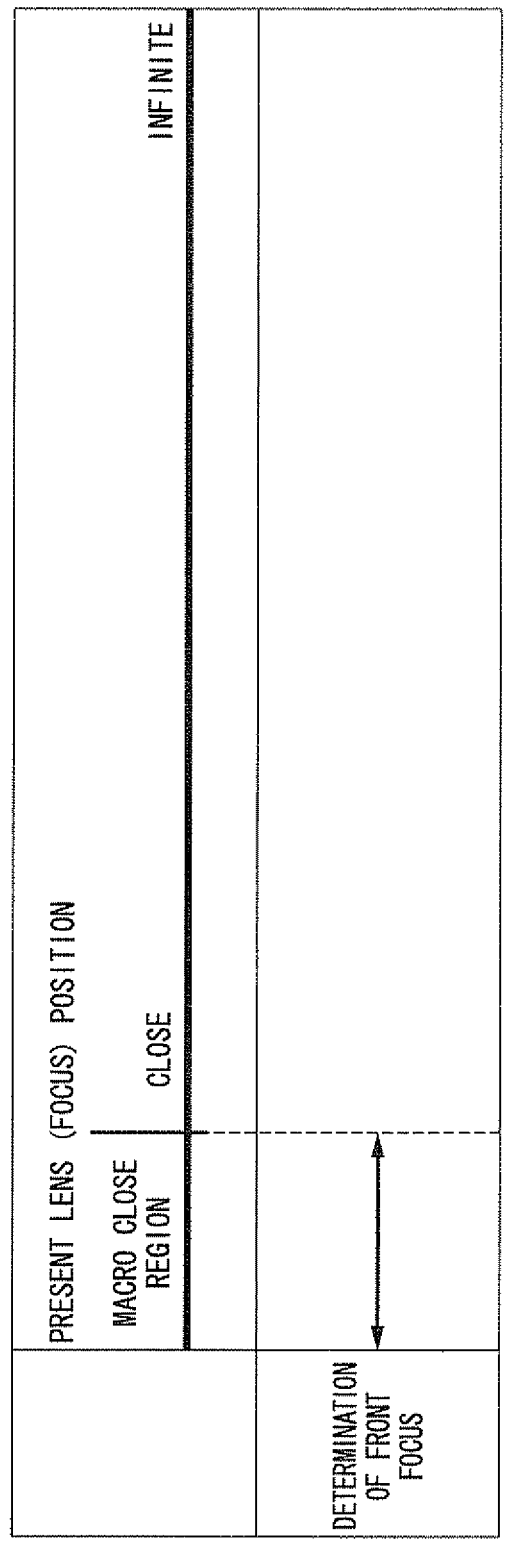
FIG. 32 is a diagram illustrating an operation of determining conversion into a macro imaging mode.

In addition, for example, the imaging apparatus 100 switches an imaging mode into a "macro (close-up) imaging mode" based on the direction index and the defocus amount calculated by the focus adjusting device 191. FIG. 32 is a diagram illustrating an operation of determining conversion into a macro imaging mode. It is assumed that in a case where a position of the AF lens 112 is at a closest location, the distribution detection unit 193 determines that the subject image is in a front focus state. In this case, the CPU 190 of the imaging apparatus 100 switches an imaging mode into a "macro (close-up) imaging mode" based on the direction index (front focus state) and the defocus amount calculated by the focus adjusting device 191. Thereby, the control unit 194 restricts a scanning range to a "macro (close-up) close region" which is located further on a close side than the close side in the normal contrast scanning and performs contrast scanning.

As such, the imaging apparatus 100 can switch an imaging mode into a "macro (close-up) imaging mode" without depending on an operation input of a user based on the direction index (front focus state) and the defocus amount calculated by the focus adjusting device 191.

In addition, for example, the color channel may be expressed in a color space expression form in addition to RGB. For example, the color channel may be expressed in a color space expression form using a color difference (YCbCr, YUV, or the like).

Further, for example, the distribution detection unit 193 may subdivide blocks based on a result of grouping a subject image with the same color, and label the subject image.

Furthermore, for example, the distribution detection unit 193 may change a resolution of an image if an effective edge is intended to be desired. In addition, the distribution detection unit 193 may execute a super-resolution process.

For example, each profile, each parameter, and each threshold value described above may be changed depending on a zoom position, an image height, and a focus range position.

In addition, for example, in a case where a variation in an evaluation value is determined as being small based on history of the evaluation value calculated at a specific period, the distribution detection unit 193 may regard a motion of a subject as being slow and lengthen the period for calculating the evaluation value. In this way, the distribution detection unit 193 can decrease a calculation load of calculating the evaluation value.

In addition, for example, an SFR (Spatial Frequency Response) may be used instead of the MTF.

(As to Method of Selecting Edge for Focus Adjustment from a Plurality of Edges)

In a case where there are a plurality of edges in an image, the focus adjusting device selects predefined N (where N is an integer of 1 or more) high-ranking edges from a plurality of edges according to a priority. In addition, the focus adjusting device 191 performs focus adjustment based on the selected edges (for example, refer to step S11 of FIG. 19). As such, in a case where there is a plurality of edges in an image, a method in which the focus adjusting device selects an edge for focus adjustment will be described below.

The distribution detection unit 193 (refer to FIG. 1) selects high-ranking edges in descending order of power (color component amount) from edges detected for each color component by the edge detection unit 192. In addition, the distribution detection unit 193 selects high-ranking edges in descending order of contrast of the color component from edges detected for each color component by the edge detection unit 192.

Here, in a case where edges of which contrasts of the color component are the same and signal to noise ratios (S/N ratio) are different are mixed, the distribution detection unit 193 selects high-ranking edges in descending order of signal to noise ratio of the color component. In addition, in a case where edges of which the signal to noise ratios are the same and contrasts of the color component are different are mixed, the distribution detection unit 193 selects high-ranking edges in descending order of signal to noise ratios of the color component.

Furthermore, in a case where signal to noise ratios of the color channel of edges are different, the distribution detection unit 193 selects at least one of an edge having a relatively low signal to noise and a relatively high contrast, and an edge having a relatively high signal to noise ratio and a relatively low contrast.

Figure 33A:
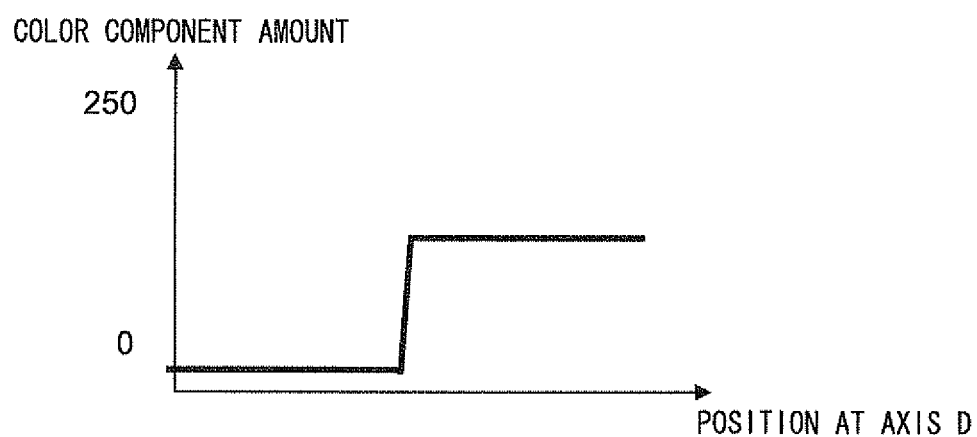
FIG. 33A is a diagram illustrating a priority of an edge selected in a case where edges of which signal to noise ratios of color components are different are mixed, and shows a case of an edge having a relatively high signal to noise ratio and a relatively low contrast.
Figure 33B:
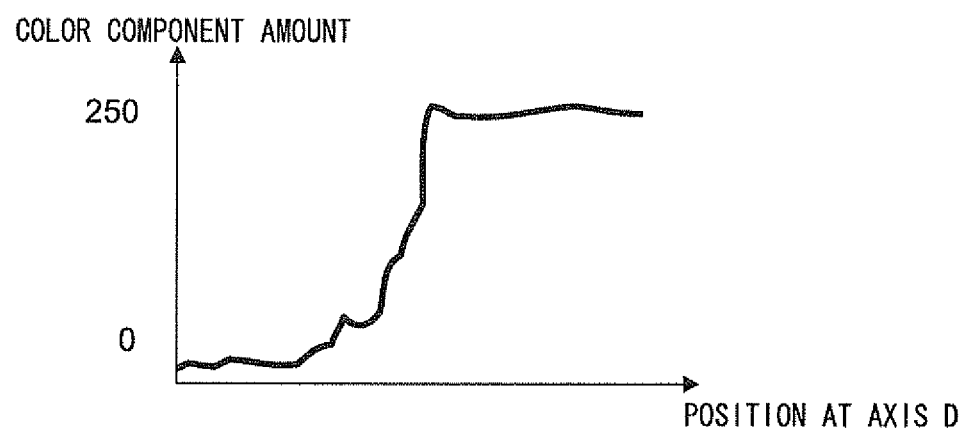
FIG. 33B is a diagram illustrating a priority of an edge selected in a case where edges of which signal to noise ratios of color components are different are mixed, and shows a case of an edge having a relatively low signal to noise ratio and a relatively high contrast.

FIGS. 33A and 33B are diagrams illustrating a priority of an edge selected in a case where edges having different signal to noise ratios of the color component are mixed. The longitudinal axis indicates a color component amount. In addition, the transverse axis indicates a position (refer to FIG. 7) at the axis D. FIG. 33A shows an edge having a relatively high signal to noise ratio and a relatively low contrast.

On the other hand, FIG. 33B shows an edge having a relatively low signal to noise ratio and a relatively high contrast. In a case where the signal to noise ratios of the color channel of edges are not the same, at least one of the edges is selected by the distribution detection unit 193.

The distribution detection unit 193 (refer to FIG. 1) selects an edge formed by the color channels of black and white. In addition, in a case where there is no edge formed by the color channels of white and black, the distribution detection unit 193 selects an edge which includes two or more primary colors and has a color component varying with the same phase from edges for each color component detected by the edge detection unit 192. If two primary colors are included in an edge, the distribution detection unit 193 selects an edge including the green component (G channel). In addition, if the green component is not included in an edge, the distribution detection unit 193 selects an edge including the blue component (B channel).

Figure 34A:
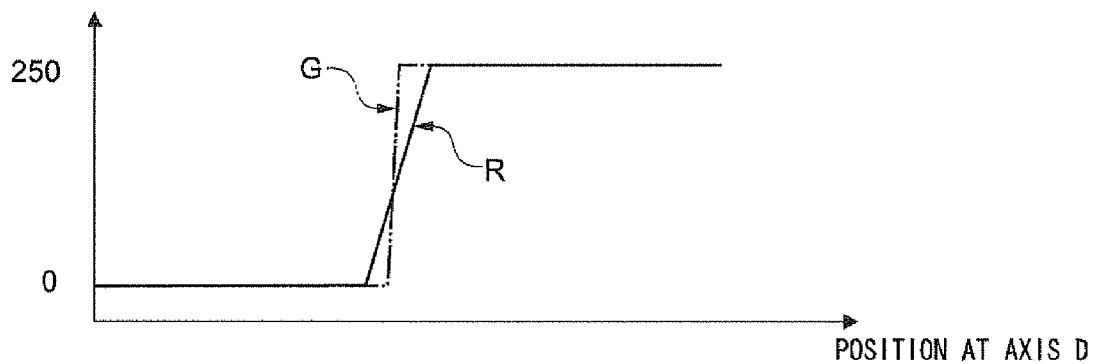
FIG. 34A is a diagram illustrating a priority of an edge selected when including two primary colors, and shows a case of an edge formed by the R channel and the G channel which vary with the same phase.
Figure 34B:
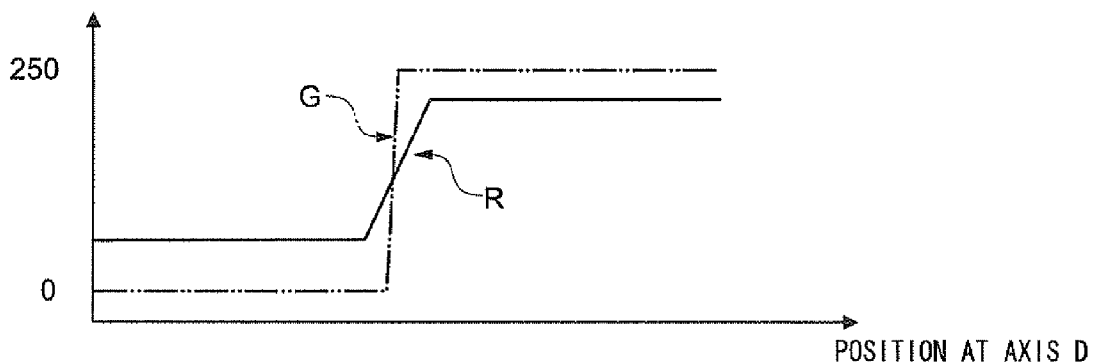
FIG. 34B is a diagram illustrating a priority of an edge selected when including two primary colors. The edge having a priority shown in FIG. 34B is formed by the R channel and the G channel varying with the same phase, wherein the contrast of the R channel is lower than the contrast of the R channel shown in FIG. 34A.
Figure 34C:
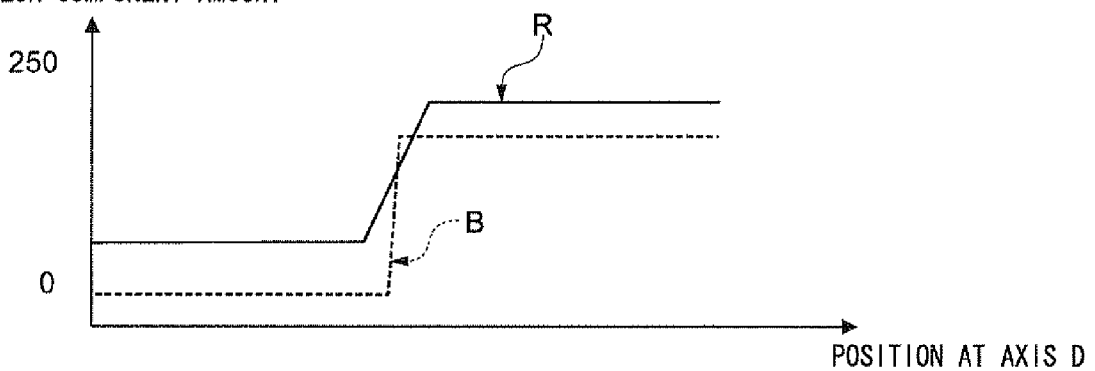
FIG. 34C is a diagram illustrating a priority of an edge selected when including two primary colors.

FIGS. 34A, 34B and 34C are diagrams illustrating a priority of an edge selected when including two primary colors. The longitudinal axis indicates a color component amount. In addition, the transverse axis indicates a position (refer to FIG. 7) at the axis D. FIG. 34A shows an edge formed by the R channel and the G channel which vary with the same phase. FIG. 34B shows an edge formed by the R channel and the G channel varying with the same phase, wherein a contrast of the R channel is lower than the contrast of the R channel shown in FIG. 34A. In addition, FIG. 34C shows an edge formed by the R channel and the B channel varying with the same phase.

Among these edges, an edge having the highest priority is the edge, shown in FIG. 34A, which includes the green component (G channel) and has a high contrast. Among these edges, an edge having the lowest priority is the edge, shown in FIG. 34C, which does not include the green component. The edge including the green component is detected by the imaging element 119 (refer to FIG. 1) with high accuracy.

Figure 35A:
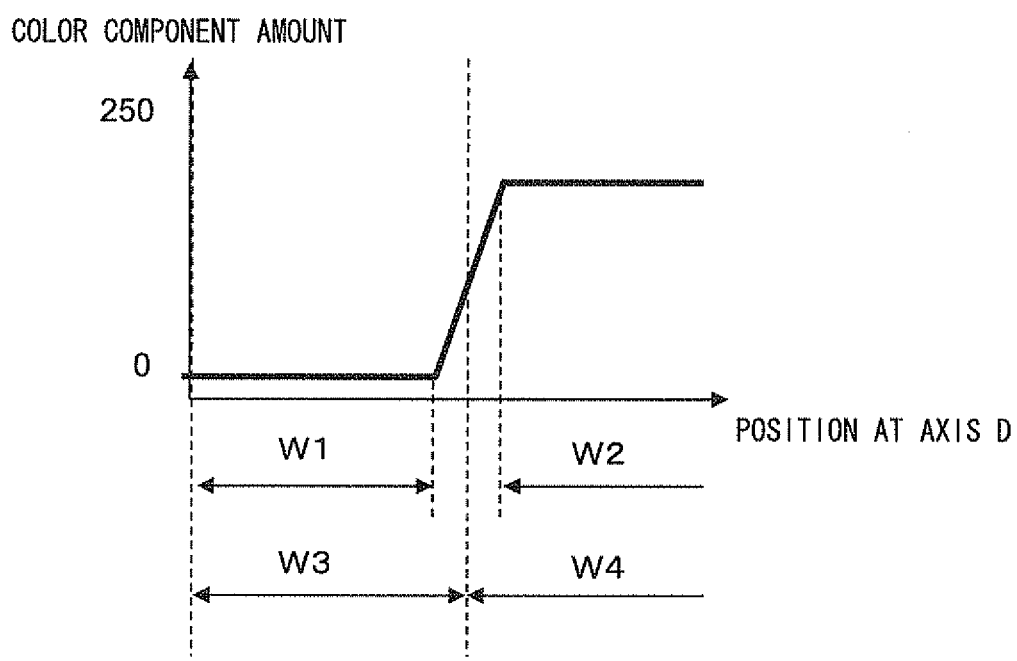
FIG. 35A shows a variation in a color component amount corresponding to a position crossing a single edge having a flat color component.
Figure 35B:
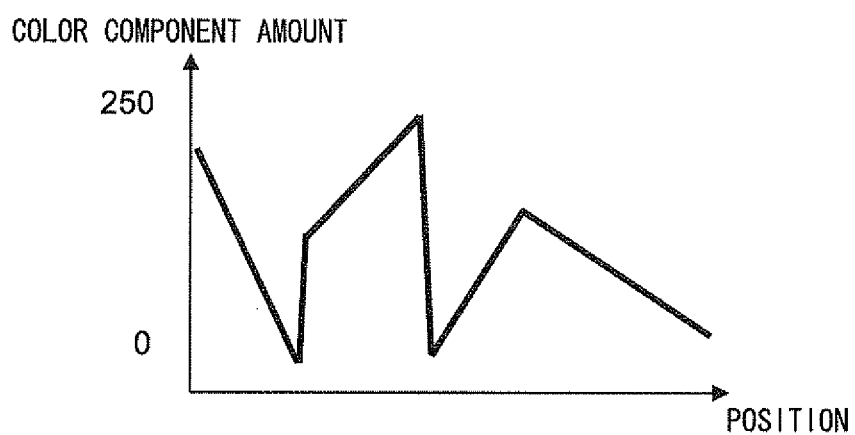
FIG. 35B shows a variation in a color component amount corresponding to positions crossing a plurality of edges.

The distribution detection unit 193 (refer to FIG. 1) selects an edge having a flat color component at a predefined width or more from the edges for color component detected by the edge detection unit 192. FIGS. 35A and 35B are diagrams illustrating a variation in a color component amount corresponding to a position crossing a single edge having a flat color component and a variation in a color component amount corresponding to positions crossing a plurality of edges. Each longitudinal axis of FIGS. 35A and 35B indicates a color component amount. In addition, the transverse axis of FIG. 35A indicates a position crossing a single edge, that is, a position (refer to FIG. 7) at the axis D. Further, the transverse axis of FIG. 35B indicates positions crossing a plurality of edges.

FIG. 35A shows a variation in a color component amount corresponding to a position crossing a single edge having a flat color component. In FIG. 35A, the edge has the color component which is flat at predefined widths W1 and W2 or more. Here, in relation to the width of the flat edge, instead of setting the widths W1 and W2, the widths W3 and W4 including a range where the color component has a gradient may be set. On the other hand, FIG. 35B shows a variation in a color component amount corresponding to positions crossing a plurality of edges. In FIG. 35B, a color component amount of each edge is not flat. Therefore, an edge having the highest priority among these edges is the edge, shown in FIG. 35A, having a flat color component at the predefined width or more.

The distribution detection unit 193 (refer to FIG. 1) selects an edge having a length or more defined according to the signal to noise ratio of the color component from edges which are detected for each color component by the edge detection unit 192. For example, the distribution detection unit 193 selects a longer edge as the signal to noise ratio of the color component is lower.

Figure 36:
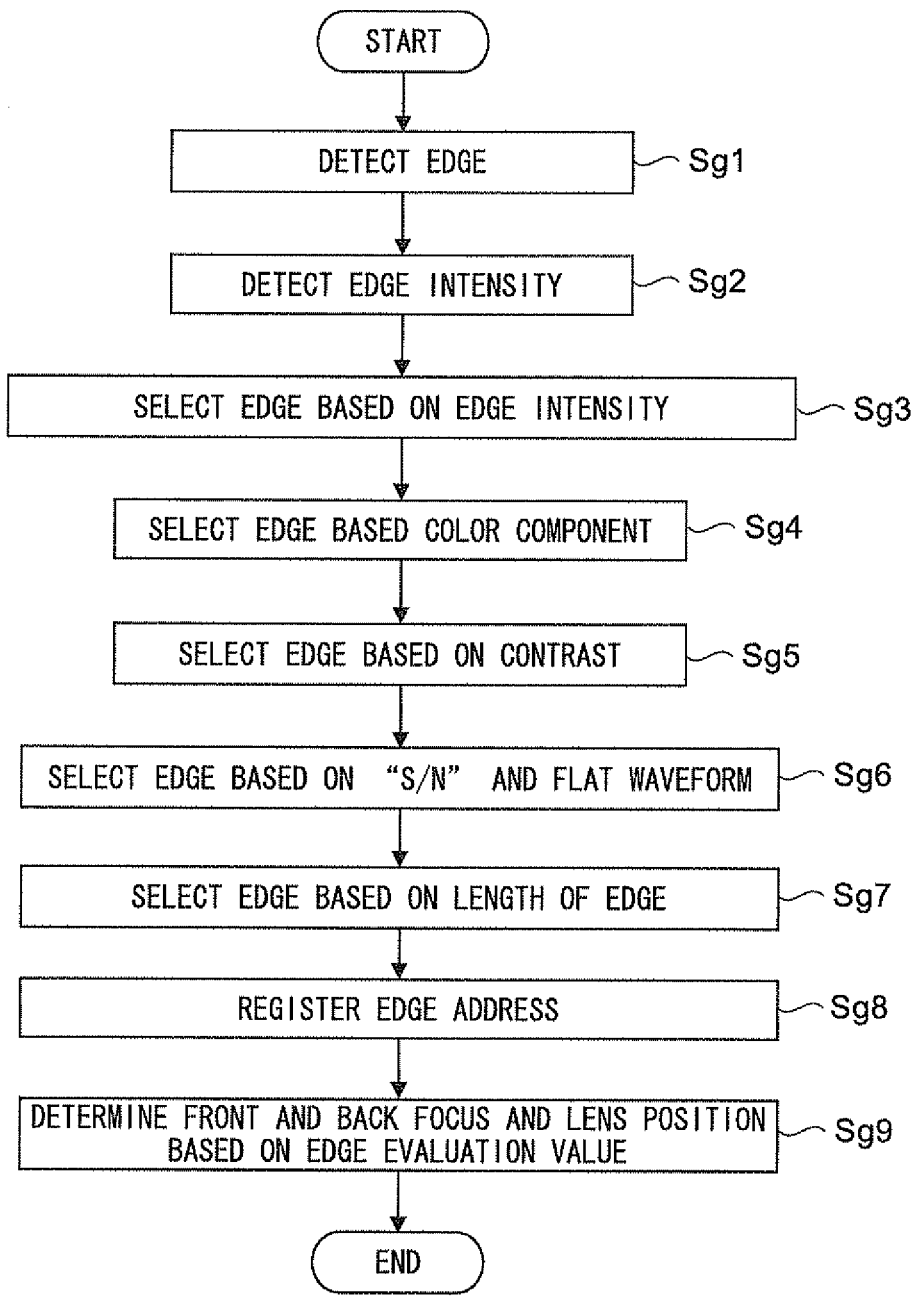
FIG. 36 is a flowchart illustrating a procedure of selecting a high-ranking edge according to the priority.

Next, a procedure of selecting a high-ranking edge according to a priority will be described. FIG. 36 is a flowchart illustrating a procedure of selecting a high-ranking edge according to the priority. The edge detection unit 192 detects a plurality of edges (step Sg1). The distribution detection unit 193 detects intensities (power, color component amount) of the edges detected by the edge detection unit 192 (step Sg2). The edge detection unit 192 selects N edges which has a high priority based on the detected intensities of the edges. For example, the edge detection unit 192 sets edges of which a color component amount is large as tracking targets (step Sg3).

The distribution detection unit 193 selects an edge having a high priority based on the color components forming the selected edges (refer to FIGS. 34A, 34B and 34C). For example, in a case where an edge includes two primary colors, the distribution detection unit 193 selects an edge including the green component (G channel) (step Sg4).

The distribution detection unit 193 selects an edge having a high priority based on a contrast of the selected edge (refer to FIG. 33). For example, the distribution detection unit 193 selects a high-ranking edge in descending order of a difference between color component amounts in adjacent pixels (adjacent difference) (step Sg5).

The distribution detection unit 193 selects an edge having a high priority based on a signal to noise ratio of the color component of the selected edge, and the width of a range of being flat in a waveform (refer to FIGS. 35A and 35B) (step Sg6).

The distribution detection unit 193 selects an edge having a length or more defined according to the signal to noise ratio of the color component. For example, the distribution detection unit 193 selects a longer edge as the signal to noise ratio of the color component is lower (step Sg7).

The distribution detection unit 193 registers an edge address which is identification information of an edge. In other words, the distribution detection unit 193 sets a high-ranking edge, which is finally selected, to a tracking target (step Sg8).

The control unit 194 determines whether the edge is in a front focus state or in a back focus state, and a position of the AF lens 112, based on the evaluation value of the edge. That is to say, the control unit 194 moves the AF lens 112 so as to focus on the edge of the subject image based on the distributions of a focalized state and an unfocused state detected by the distribution detection unit 193. Here, the control unit 194 restricts a movement direction of the AF lens 112 and performs contrast scanning (step Sg9).

In addition, the distribution detection unit 193 may select an edge having a high priority based on luminance of the edge instead of the color component of the edge.

In addition, a program for realizing the procedures described with reference to FIGS. 16, 19, 20, 23, 26, 29, 31 and 36 is recorded on a computer readable recording medium, and a computer system is executed to read the program recorded on the recording medium, thereby performing the execution processes. In addition, the "computer system" described here may include OS or hardware such as peripheral devices.

Here, the "computer system" includes home page providing circumstances (or display circumstances) if the WWW system is used. In addition, the "computer readable recording medium" refers to a flexible disk, a magneto-optical disc, a ROM, a writable nonvolatile memory such as a flash memory, a portable medium such as a CD-ROM, and a storage device such as a hard disk embedded in the computer system.

Further, the "computer readable recording medium" includes a recording medium which holds a program for a specific time, such as a volatile memory (for example, DRAM (Dynamic Random Access Memory)) inside the computer system which is a server or a client in a case where the program is transmitted via a network such as the Internet or a communication line such as a telephone line.

In addition, the program may be transmitted from the computer system where the program is stored in a storage device or the like to other computer systems via a transmission medium or using a transmission wave in the transmission medium. Here, the "transmission medium" transmitting the program refers to a medium having a feature of transmitting information such as a network (communication network) such as the Internet or a communication line (communication line) such as a telephone line.

In addition, the program may be a program for realizing a portion of the above-described effects. In addition, the program may be a so-called difference file (difference program) which can realize the above-described effects in combination with a program which has already recorded the above-described effects in the computer system.

REFERENCE SIGNS LIST 100 imaging apparatus
110 imaging unit
111 lens barrel
190 CPU
191 focus adjusting device
192 edge detection unit
193 distribution detection unit
194 control unit

The invention claimed is:

1. A focus adjusting device comprising:
an edge detection unit that detects edges of a subject image for each color component forming an image including the subject image;
a distribution detection unit that detects distributions of a focalized state and an unfocused state of the image based on the edges detected by the edge detection unit; and
a control unit that moves a lens based on the distributions detected by the distribution detection unit,
wherein the subject image is incident from an optical system having the lens, the control unit moves the lens, and thus the subject image is focused on, and
wherein the distribution detection unit detects the distributions based on a gradient of a color component amount of the edges detected by the edge detection unit.

2. The focus adjusting device according to claim 1, wherein the distribution detection unit detects a direction index indicating focalization on a close point side or a distant point side of a subject, and a defocus amount, based on a ratio of or a difference between color component amounts of the edges detected by the edge detection unit.

3. The focus adjusting device according to claim 2, wherein the distribution detection unit detects the defocus amount based on a distance between peaks of the ratios of or the difference between the color component amounts of the edges detected by the edge detection unit.

4. The focus adjusting device according to claim 1, wherein the distribution detection unit detects a direction index indicating focalization on a close point side or a distant point side of a subject, and a defocus amount, based on a line spread function corresponding to the edges detected by the edge detection unit.

5. The focus adjusting device according to claim 4, wherein the distribution detection unit detects the defocus amount, based on a standard deviation or a full width at half maximum of the line spread function corresponding to the edges detected by the edge detection unit.

6. The focus adjusting device according to claim 1, wherein the distribution detection unit selects a high-ranking edge in descending order of a color component amount from the edges detected by the edge detection unit, and detects the distributions of a focalized state and an unfocused state of the image based on the selected edge.

7. The focus adjusting device according to claim 1, wherein the distribution detection unit selects a high-ranking edge in descending order of a contrast of the color component from the edges detected by the edge detection unit, and detects the distributions of a focalized state and an unfocused state of the image based on the selected edge.

8. The focus adjusting device according to claim 7, wherein, when edges of which the contrasts of the color component are the same and edges of which a signal to noise ratios are different are mixed, the distribution detection unit selects a high-ranking edge in descending order of the signal to noise ratio of the color component, and detects the distributions of a focalized state and an unfocused state of the image based on the selected edge.

9. The focus adjusting device according to claim 7, wherein, when edges of which the signal to noise ratios of the color component are different are mixed, the distribution detection unit selects at least one of an edge having a relatively low signal to noise ratio and a relatively high contrast and an edge having a relatively high signal to noise ratio and a relatively low contrast, and detects the distributions of a focalized state and an unfocused state of the image based on the selected edge.

10. The focus adjusting device according to claim 1, wherein the distribution detection unit selects edges which include two or more primary colors and have the color component varying with the same phase from the edges detected by the edge detection unit, and detects the distributions of a focalized state and an unfocused state of the image based on the selected edges.

11. The focus adjusting device according to claim 10, wherein the distribution detection unit selects an edge including a green component when the edges include two primary colors.

12. The focus adjusting device according to claim 1, wherein the distribution detection unit selects an edge having a flat color component at a predefined width or more from the edges detected by the edge detection unit, and detects the distributions of a focalized state and an unfocused state of the image based on the selected edge.

13. The focus adjusting device according to claim 1, wherein the distribution detection unit selects an edge having a length or more defined according to a signal to noise ratio of the color component from edges for each color component detected by the edge detection unit, and detects the distributions of a focalized state and an unfocused state of the image based on the selected edges.

14. A computer system having a non-transitory computer readable medium, the non-transitory computer readable medium having recorded thereon a focus adjusting program, the focus adjusting program comprising:
a step of detecting edges of a subject image for each color component forming an image including the subject image which is incident from an optical system having a lens for performing focus adjustment;
a step of detecting distributions of a focalized state and an unfocused state of the image based on the edges; and
a step of moving the lens so as to focus on the subject image based on the distributions,
wherein the detecting of distributions detects the distributions based on a gradient of a color component amount of the detected edges.

* * * * *